US011924095B1

(12) United States Patent
Twitchell, Jr.

(10) Patent No.: US 11,924,095 B1
(45) Date of Patent: Mar. 5, 2024

(54) UTILIZING NETWORK ROUTING TO COMMUNICATE COVERT MESSAGE

(71) Applicant: CODE-X, INC., St. Petersburg, FL (US)

(72) Inventor: Robert W. Twitchell, Jr., St. Pete Beach, FL (US)

(73) Assignee: CODE-X, INC., St. Petersburg, FL (US)

( * ) Notice: Subject to any disclaimer, the term of this patent is extended or adjusted under 35 U.S.C. 154(b) by 0 days.

(21) Appl. No.: 18/091,275

(22) Filed: Dec. 29, 2022

(51) Int. Cl.
*H04L 45/00* (2022.01)
*H04L 9/40* (2022.01)
*H04L 45/24* (2022.01)

(52) U.S. Cl.
CPC ............ *H04L 45/566* (2013.01); *H04L 45/24* (2013.01); *H04L 63/029* (2013.01)

(58) Field of Classification Search
CPC ...... H04L 45/24; H04L 45/566; H04L 63/029
See application file for complete search history.

(56) References Cited

U.S. PATENT DOCUMENTS 9,998,434 B2 * 6/2018 Verzun .................. G06F 21/606

FOREIGN PATENT DOCUMENTS

| CN | 104917747 A | * | 9/2015 | ......... H04L 63/0435 |
| CN | 104917747 B | * | 7/2018 | ......... H04L 63/0435 |
| CN | 111327631 A | * | 6/2020 | ......... H04L 63/0428 |
| CN | 111327631 B | * | 4/2022 | ......... H04L 63/0428 |

* cited by examiner

*Primary Examiner* — George C Neurauter, Jr.
(74) *Attorney, Agent, or Firm* — TILLMAN WRIGHT, PLLC; Chad D. Tillman

(57) ABSTRACT

A method of transmitting a covert message over a network from an origin device to a destination device includes using selection a plurality of network paths, network channels, and network tunnels to signal to the destination device symbols. Sequences of the symbols are interpreted by the destination device as values in an n-base number system. The values are decoded by the destination device to obtain the covert message. Some preferred implementations use a binary number system and some use a hexadecimal number system. Some utilize network path selection and incorporate network watermarks, by which the network path that was selected for each received packet is determined. Network paths preferably are differentiated from one another by redirects that are storage servers in an overlay network. Network communications can be opened between the origin device and destination device for continuously communicating packets without signaling symbols when no covert message is being transmitted.

19 Claims, 80 Drawing Sheets covert message = "hidden"

| Letter | Binary Value |
|--------|--------------|
| h | 01101000 |
| i | 01101001 |
| d | 01100100 |
| d | 01100100 |
| e | 01100101 |
| n | 01101110 |

*FIG. 13*

| IP Packet | | | |
|---|---|---|---|
| IP Header | IP Payload | | |
| | TCP Segment | | |
| | TCP Header | TCP Payload | |
| | | SDN Header | Payload |
| ...<br>protocol=6<br>srcIP=152.12.54.1<br>destIP=243.15.11.7<br>... | ...<br>seq=5<br>... | ...<br>srcNodeID=320<br>destNodeID=330<br>priNodeID=342<br>path=320,342<br>... | |

FIG. 24

| IP Packet | | | | |
|---|---|---|---|---|
| IP Header | IP Payload | | | |
| | | TCP Segment | | |
| | TCP Header | | TCP Payload | |
| | | | SDN Header | Payload |
| ...<br>protocol=6<br>srcIP=152.12.54.1<br>destIP=243.15.11.7<br>... | ...<br>seq=6<br>... | | ...<br>srcNodeID=320<br>destNodeID=330<br>priNodeID=344<br>path=320,344<br>... | |

*FIG. 31*

```
private void addHiddenMessage(ref jPacketStream outStream, string hiddenMsg, jNode[] thePrimary)
{
    jBit[] theBits = hiddenMsg.ToBits();
    int counter = 0;
    foreach jPacket nextPacket in outStream {
        if (counter < theBits.Length) {
            nextPacket.priNodeID = thePrimary[theBits[counter]].ID;
            counter++;
        }
    }
}
```

*FIG. 40*

```
static void beforePacketSent(ref jPacket thePacket) { jMsg hiddenMsg = jMsg.checkForHiddenMsg(thePacket.dest);

if (hiddenMsg != null && hiddenMsg.counter < hiddenMsg.theBits.Length) {
        thePacket.priNodeID = hiddenMsg.thePrimary[hiddenMsg.theBits[hiddenMsg.counter]].ID;
        hiddenMsg.counterIncrement();
    }
}
```

FIG. 41

```
private route findRoute(int PrimaryID, List<route> routeTable) {

List<route> routeCandidates = new List<route>();
    foreach route r in routeTable {
        if (r.nodeList.contains(PrimaryID)) {
            routeCandidates.Add(r);
        }
    }
    if (routeCandidates.Length > 0) {
        int rand = genRandomInt(1, routeCandidates.Length); //generate random integer between 1 and specified value
        return routeCandidates[rand-1];
    }
    else {
        return null;
    }
}
```

*FIG. 47*

```
route[] setRoutes = new route[2];
setRoutes[0] = findRoute(thePrimary[0], theRouteTable);
setRoutes[1] = findRoute(thePrimary[1], theRouteTable);

int counter = 0;

foreach jPacket nextPacket in outStream {
    if (counter < theBits.Length) {
        nextPacket.routeID = setRoutes[theBits[counter]].ID;
        counter++;
    }
}
```

FIG. 48

```
private List<route> findRoutes(int PrimaryID, List<route> routeTable) {

List<route> routes = new List<route>();
    foreach route r in routeTable {
        if (r.nodeList.contains(PrimaryID)) {
            routes.Add(r);
        }
    }
    if (routeCandidates.Length > 0) {
        return routes;
    }
    else {
        return null;
    }
}
```

*FIG. 49*

```
List<route>[] setRoutes = new List<route>[2]; setRoutes[0]
 = findRoutes(thePrimary[0], theRouteTable); setRoutes[1]
 = findRoutes(thePrimary[1], theRouteTable);

int counter = 0;

foreach jPacket nextPacket in outStream {
    if (counter < theBits.Length) {
        int rand = genRandomInt(1, setRoutes[theBits[counter]].Length); //generate random integer between 1 and specified value
        nextPacket.routeID = setRoutes[theBits[counter]].getElementAt(rand);
        counter++;
    }
}
```

*FIG. 50* covert message = "hidden"

| Letter | Hex Value |
|--------|-----------|
| h | 68 |
| i | 69 |
| d | 64 |
| d | 64 |
| e | 65 |
| n | 6e |

*

| Hex Symbol | RouteID | Pathway |
|---|---|---|
| 0 | 371 | 872,874,876 |
| 1 | 101 | 872,874,876,878 |
| 2 | 372 | 874 |
| 3 | 373 | 872,876 |
| 4 | 374 | 876 |
| 5 | 376 | 874,876 |
| 6 | 375 | 872,874,878 |
| 7 | 377 | 874,878 |
| 8 | 378 | 876,878 |
| 9 | 384 | 872 |
| a | 380 | 872,878 |
| b | 381 | 872,876,878 |
| c | 382 | 874,872 |
| d | 383 | 872,874 |
| e | 379 | 878 |
| f | 385 | 878,876 |

User ID: JDoe
IP: 152.12.54.1

UTILIZING NETWORK ROUTING TO COMMUNICATE COVERT MESSAGE

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The present invention generally relates to network communications.

Communication networks for computers and other electronic devices are increasingly ubiquitous. For example, most computer and communication devices are connected to one or more networks providing access to the conventional Internet. As a more specific example, desktop and laptop computers at homes and offices are commonly connected via Wi-Fi or ethernet to a broadband network (e.g., a fiber optic broadband network, a digital subscriber line (DSL) broadband network, or a satellite broadband network) provided by an internet service provider (ISP), which in turn provides connectivity to the Internet backbone. As another example, phones and other electronic devices are commonly connected to a cellular network (e.g., a 3G, 4G, or 5G broadband cellular network) provided by a cellular provider which in turn provides connectivity to the Internet.

A commonly used model for describing data transmission standards, processes, and protocols for communicating data over such networks is the Open Systems Interconnection (OSI) reference model. OSI is organized into seven layers of abstraction that are required to organize and send data between computers and other electronic devices The lowest layer of the OSI model is the physical layer. The physical layer is responsible for transmitting and receiving raw bit streams whether over a physical medium or wirelessly. For example, the physical layer may convert digital bits into electrical, radio, or optical signals for transmission, and convert received electrical, radio, or optical signals into digital bits.

The second layer of the OSI model is the data link layer. The data link layer is responsible for encoding, decoding, and organizing data bits before being transported between two adjacent nodes on a network. The data link layer also may detect and correct errors that occur at the physical layer. The data link layer includes a logical link control (LLC) sublayer and a media access control (MAC) sublayer. The data link layer is generally characterized as defining protocol data units in the form of frames that are communicated over a link between physical network nodes. The data link layer is generally understood to pass frames to the physical layer, which then transmits the frames as part of a raw bit stream.

The third layer of the OSI model is the network layer. The network layer is responsible for moving data in networks. Network layer protocols accomplish this by packaging data with network address information and selecting the appropriate network routes. The network layer is generally characterized as defining protocol data units in the form of packets for communication over a network. The routing information contained within a packet includes the source address of the sending host and the destination address of the receiving host. The network layer is generally understood to pass packets for communication over a network to the data link layer, which in turn encapsulates packet data in frames, and passes it on to the physical layer for transmission as part of a raw bit stream.

The fourth layer of the OSI model is the transport layer. The transport layer is generally characterized as defining protocol data units in the form of segments or datagrams for communication. The transport layer is generally responsible for dividing data for communication into smaller data parts which are then each encapsulated as a segment or datagram. The transport layer can provide for flow control and error control. The transport layer can keep track of segments that are communicated, provide for acknowledgment of received segments, and recommunicate segments for which no acknowledgment was received or for which delivery failed. The transport layer is generally understood to pass segments for communication to the network layer, which in turn encapsulates segment data in packets and passes it on to the data link layer, which then in turn encapsulates packet data in frames, and passes it on to the physical layer for transmission as part of a raw bit stream.

The fifth layer of the OSI model is the session layer. The session layer is generally characterized as establishing, managing, and terminating communication sessions between local and remote applications or services.

The sixth layer of the OSI model is the presentation layer. The presentation layer is generally characterized as translating data between different formats for software applications for which the data is communicated over the network.

The seventh and final layer of the OSI model is the application layer. The application layer is generally characterized as interfacing and interacting with the software applications of the computers or other electronic devices for which the data is communicated over the network.

While the OSI model is a widely recognized model, many communication protocols do not conform exactly to the OSI model, and data is frequently communicated using protocols that do not map cleanly to the OSI model.

Perhaps the best example of this is the Internet protocol suite, which is the most commonly used protocol suite for network communications. The Internet protocol suite makes heavy use of Internet Protocol (IP) (which can include both IPv4 and IPv6) and Transmission Control Protocol (TCP), and is accordingly sometimes referred to simply as TCP/IP. The Internet protocol suite also makes use of User Datagram Protocol (UDP). Under the OSI model, TCP generally can be understood as mapping to part of the session layer and part of the transport layer, UDP generally can be understood as mapping to the transport layer, and IP generally can be understood as mapping to the network layer.

Nonetheless, the Internet protocol suite does not map cleanly to the OSI model, and instead generally defines four or five abstraction layers. Classically, the Internet protocol suite is understood as defining an application layer, a transport layer, an internet layer, and a link layer. The internet layer is sometimes characterized as a network layer. The link layer is sometimes understood as being defined above a hardware or physical layer that is not part of the link layer, and is sometimes understood as including a hardware or physical layer. The link layer is sometimes subdivided into a data link layer and a physical layer.

With respect to the present disclosure, a conventional layer characterization schema ("Conventional Schema") used herein shall include the characterization of an application layer, a transport layer, a network layer, a data link layer, and a physical layer. In this Conventional Schema, a message for communication over a network from a software application is processed at an application layer and encapsulated in one or more segments at a transport layer, each segment being encapsulated in a packet at a network layer, each packet being encapsulated in a frame at a data link layer, and each frame being transmitted in a raw bit stream at a physical layer. Thus, for example, data is commonly communicated over the Internet utilizing TCP segments encapsulated inside of IP packets. As another example, data is commonly communicated over the Internet utilizing UDP segments or datagrams encapsulated inside of IP packets. In each case, IP packets are themselves encapsulated inside of frames (e.g., Ethernet frames) at the data link layer. Raw bit streams for such frames are communicated over the physical networks in accordance with communication protocols of the physical networks.

It will be appreciated that networks allow for communication of data from one electronic device to another, e.g., allow a user at a location to utilize an electronic device to communicate information with or access resources or services at another location. The Appendix, which is hereby incorporated herein by reference, includes drawings by which the prior art will now be described.

FIG. 1 of the Appendix illustrates an arrangement wherein a user device 20 communicates data to a server 30 over a network. Data is communicated from the user device 20 over a network segment 22 to a network core 40, is communicated through the network core 40, and is then communicated onward over a network segment 32 to the server 30. The user device 20 and sever 30 represent network nodes comprising communication endpoints in the network. The network may be a local or wide area network and may comprise the Internet.

It will be appreciated that the network segment 22 connecting the user device 20 to the network core 40 can be characterized as a "first mile segment", and that the network segment 32 connecting the server 30 to the network core 40 can be characterized as a "last mile segment" when a communication is sent from the user device 20 to the server 30. It will further be appreciated that each of the one or more network segments 22,32 may comprise a plurality of links between a plurality of physical network nodes in the form of networked devices. For example, the network segment 22 may comprise a Wi-Fi connection from the user device 20 to a wireless router, a connection from the wireless router to a cable modem, and a connection from the cable modem to the network core 40 through one or more network nodes (e.g., one or more switches or other devices of an ISP). The data is communicated from the user device 20 to the server 30 as one or more packets, which are communicated as part of one or more frames, in accordance with the above discussion.

FIG. 2 of the Appendix illustrates a specific network path from the user device 20 to the server 30 over a plurality of network segments C-D-E-F-G-H that form part of the network core 40. The specific network path C-D-E-F-G-H that is illustrated passes through, inter alia, network nodes 42,44 representing proximal endpoints of the respective network segments 22,32. It will be appreciated that although only a small number of segments are illustrated for clarity, a network path may comprise a large number of segments, and each illustrated segment itself may represent a plurality of links.

FIG. 3 of the Appendix figuratively illustrates a schema of an exemplary IP packet communicated over the network path illustrated in FIG. 2 of the Appendix. The IP packet includes an IP packet header and an IP packet payload. The IP packet payload in turn contains a TCP segment which includes a TCP header and a TCP payload. The TCP payload contains application data, which may be encapsulated with one or more other headers, such as an application header.

FIG. 4 of the Appendix illustrates a conventional schema of an IPv4 header.

FIG. 5 of the Appendix illustrates a conventional schema of a TCP header.

FIG. 6 of the Appendix illustrates a conventional schema of a UDP header.

Conventional networks, such as the Internet, rely heavily on centralized routers to perform routing tasks in accomplishing network communications, and end devices have relatively little control over a network path utilized for such network communications; however, approaches have been proposed which give end devices some level of control over network routing. For example, U.S. Pat. No. 9,071,607, which is hereby incorporated herein by reference, discloses an approach which involves intentionally routing network traffic through one or more intermediate network nodes, referred to therein as "deflecting" communications through such nodes which, in turn, are called deflect nodes or simply "deflects".

FIG. 7 of the Appendix schematically illustrates in general a conventional routing of a packet from an originating device 120 at an endpoint node to a destination device 130 at an endpoint node through a plurality of intermediate network nodes. The network may be a local or wide area network and may comprise the Internet.

In accordance with the '607 patent, a specific network node, such as node 140 shown in FIG. 8 of the Appendix, can be used as a "deflect" by forcing a packet to be routed therethrough. For example, this can be accomplished by originating device 120 sending a packet to deflect node 140, as illustrated in FIG. 8 of the Appendix, with node 140 receiving and then sending the packet along to the destination device 130, as illustrated in FIG. 9 of the Appendix. In this way, the node 140 acts as a data deflect node limiting the possible paths a packet may take through the network to a path that must include node 140, such as the particular path illustrated in FIG. 10 of the Appendix.

As the '607 Patent discloses, although complete control of routing with respect to nodes may not be available, by choosing to utilize one or more deflects, distinct multiple paths can be chosen and utilized. The ability to choose and utilize deflects thus enables different messages to be sent over different network paths, or different parts of a message to be sent all at once over different network paths. This ability also enables a network path to be changed over time or in response to a failed connection. The '607 Patent further discloses the use of a "control server" to establish, monitor, and control connections, or communication channels between, endpoint nodes over networks. In accordance with the '607 Patent disclosure, client software installed at devices forming endpoint nodes communicate their internet protocol (IP) addresses to a control server, which stores those IP addresses in association with unique identifiers representing the devices and/or users of the devices. The client software at the device of an endpoint node periodically checks in with the control server to maintain up-to-date IP address information associated with its unique identifier. Then, when two devices/users are to communicate with one another, and after the control server determines that the devices/users are authorized to communicate with one another, the control server communicates connection information to the software clients at those devices which information facilitates a communication connection between those devices. Generally, the control server is not involved in this connection, and does not form part of the network path for the network communications between those devices; the control server just facilitates the connection that is established between those devices.

In addition to communicating connection information to the software clients on those devices, the control server also communicates control information to deflects. The control server and communications used to establish, monitor, and control connections, or communication channels, can be characterized as being associated with a "control plane", while data deflects and communication of data between end nodes, e.g., over established connections or communication channels, can be characterized as being associated with a "data plane". This architecture and methodology can be characterized as setting up a software-defined network (SDN) in which the control plane is utilized to set up network communications over the data plane. Indeed, U.S. Pat. No. 10,833,972, which is hereby incorporated herein by reference, discloses such an approach.

The '972 Patent discloses an approach in which, in addition to using deflects as data deflects which facilitate communications of data over the data plane, one or more deflects are utilized to facilitate control communications over the control plane. Such deflects can be characterized as control plane deflects. A single deflect may operate as a data deflect, a control plane deflect, or both.

For purposes of illustration, consider a situation shown in FIG. 11 of the Appendix involving a first device 120 seeking to communicate with a second device 130. Each device 120,130 represents a network end node or endpoint, and the network may be a local or wide area network and may comprise the Internet. Each device 120,130 has a unique identifier, which can be characterized as a node identifier (NID), that is associated therewith at a control server 150. The NID may represent the MAC address of a device constituting the node of the network or may represent any other unique identifier for the device. The first device 120 has a unique node identifier of "12" in this illustration, while the second device 130 has a unique node identifier of "4" in this illustration.

Devices serving as data deflect nodes also have unique identifiers in the form of node identifiers. These include data deflect node 160 having a node identifier of "100", data deflect 162 having a node identifier of "202", and data deflect 164 having a node identifier of "310".

The first device 120 communicates to the control server 150 a request to communicate with the second device 130. The control server 150 communicates, over the control plane, e.g., utilizing one or more control plane deflects schematically represented by deflect node 170 in FIG. 12 of the Appendix, connection information enabling the first device 120 to set up a connection for communications between the first device 120 and the second device 130. This may include communication of the identification of one or more data plane deflect nodes.

The first device 120 then communicates a packet comprising a control portion over a network for communication to the second device 130 via one or more intermediate nodes, including one or more data deflects. A control portion, or control portions, of a packet may comprise one or more headers of a packet or within a packet, or even one or more control portions contained in the payload of a packet.

Communications can be set up to utilize a single deflect, or multiple deflects.

In an exemplary implementation involving a single deflect, a control portion of a packet includes an indication of a destination address for the packet, and a node identifier for the ultimate destination of the packet. More generally, a control portion of a packet, such as a data packet or a control packet, can include authentication data, a messaging version, a source client node identifier, a destination client node identifier, a next hop node identifier, a source session identifier, a destination session identifier, a channel identifier, a connection identifier, a length, and command specific data (e.g., a packet number for a data packet and/or frame). The control portion may also include a route identifier, as described hereinbelow. The control portion may also include some reserved fields, flag fields, and tracing fields. A control portion may include, as it normally would, an indication of source and destination MAC addresses for layer 2, an indication of source and destination IP addresses for layer 3, and an indication of source and destination ports.

The first device 120 can, based on control information received from the control server 150 via the control plane, set the destination address of data node deflect 160, e.g., the IP address of the node 160, in the control portion of the packet and additionally set the destination node identifier for the ultimate or final destination to the node identifier of the second device 130. The packet is then communicated from the first device 120 to the deflect 160, as illustrated in FIG. 13 of the Appendix.

At the deflect 160, the packet, the control portion, or a portion thereof, may be decrypted, and the deflect accesses the final destination node identifier contained therein. The deflect 160 looks up, in a maintained table, an IP address associated with the final destination node identifier. This table may be populated based on control information received from a control server over the control plane or based on network knowledge gleaned from packets received by the deflect 160 from the second device 130, e.g., control packets representing a ping received from the second device 130 as part of setting up a connection. This table may form part of a routing table or may be utilized in conjunction with a routing table which identifies a next node to forward the packet to in order to reach the second device 130.

The deflect 160 then sets the destination IP address to the looked-up IP address associated with the second device 130 and forwards the packet onward based on its routing table. The packet is then routed onward to the second device 130, as illustrated in FIG. 14 of the Appendix.

This process involves use of a single deflect and can be characterized as a "single-hop" deflection process.

A multi-hop deflection process, which involves the use of multiple deflects, can also be utilized In an exemplary such implementation, a route identifier is utilized to identify a route from an originating node to a destination node through multiple data deflects that are specified in the route using the unique node identifiers of the deflects.

Returning to the previous example, the control server 150 could provide, over the control plane, route information which indicates a route from the first device 120 to the second device 130 through data deflects 160,162,164, and further indicates a route identifier for said route, in this example the route indicator "0x0005" or simply "5". The route identifier may include a bit which specifies a direction for the route, e.g., "0x0005" may be a first direction, and "0x8005" may be a second, opposite direction. This route information, as well as other control information, may be communicated to the data deflects 160,162,164 from the control server 150 directly, or may be communicated via use of one or more control plane deflects. For example, FIG. 14 of the Appendix illustrates exemplary communication of control information comprising route information from the control server 150 to data deflect 160 via control plane deflect 170.

In setting up a connection from the first device 120 to the second device 130, the control server 150 provides control information to the first and second devices 120,130 which may include a route identifier, e.g., a route identifier of "0x0005" may be provided to the first device 120, and a route identifier of "0x8005" may be provided to the second device 130. This control information may be communicated to the first and second devices 120,130 from the control server 150 directly, or may be communicated via use of one or more control plane deflects.

The first device 120 can, based on control information received from the control server 150 via the control plane as shown in FIG. 15 of the Appendix, set the destination IP address in the control portion of the packet to the IP address of a deflect, such as deflect 160, set the final destination node identifier to the node identifier of the second device 130, and set the route identifier to the route identifier provided by the control server 150, e.g., "0x0005". The packet is then communicated from the first device 120 to the data deflect 160, as illustrated in FIG. 16 of the Appendix.

At the deflect 160, the packet, the control portion, or a portion thereof may be decrypted, and the deflect accesses the route identifier contained therein. The deflect 160 looks up, based on the route identifier, the node identifier for the next hop along the route, which in this case would be the node identifier of "202", as illustrated in FIG. 17 of the Appendix. This node identifier of "202" corresponds to the data deflect 162. The deflect 160 looks up, in a maintained table, an IP address associated with the next hop node identifier of "202". This table may be populated based on control information received from the control server over the control plane, or this table may be populated based on network knowledge gleaned from packets received from deflect 162, e.g., control packets representing a ping received as part of setting up a connection. This table may form part of a routing table or may be utilized in conjunction with a routing table which identifies a next node to forward the packet to in order to reach deflect 162 corresponding to the node identifier of "202" indicated to be the next hop along the route.

The deflect 160 sets the destination IP address to the looked-up IP address associated with the deflect 162 and sends the packet onward based on its routing table. The packet is then routed onward to the deflect 162, as illustrated in FIG. 18 of the Appendix.

At the deflect 162, the packet, the control portion, or a portion thereof may be decrypted, and the deflect 162 accesses the route identifier contained therein. The deflect 162 looks up, based on the route identifier, the node identifier for the next hop along the route, which in this case would be the node identifier of "310". This node identifier of "310" corresponds to the data deflect 164. The deflect 162 looks up, in a maintained table, an IP address associated with the next hop node identifier of "310". As before, this table may be populated based on control information received from the control server over the control plane, or this table may be populated based on network knowledge gleaned from packets received from deflect 164, e.g., control packets representing a ping received as part of setting up a connection. This table may form part of a routing table or may be utilized in conjunction with a routing table which identifies a next node to send the packet to in order to reach the deflect 164 corresponding to the node identifier of "310" indicated to be the next hop along the route.

The deflect 162 sets the destination IP address to the looked-up IP address associated with the deflect 164 and forwards the packet onward based on its routing table. The packet is then routed onward to the deflect 164, as illustrated in FIG. 19 of the Appendix.

At the deflect 164, the packet, the control portion, or a portion thereof may be decrypted, and the deflect 164 accesses the route identifier contained therein. The deflect 164 looks up, based on the route identifier, the node identifier for the next node along the route, which in this case would be the node identifier of "4". This node identifier of "4" corresponds to the second device 130. The deflect 164 looks up, in a maintained table, an IP address associated with the next hop node identifier of "4". This table may be populated based on control information received from the control server over the control plane, or this table may be populated based on network knowledge gleaned from packets received from the second device 130, e.g., control packets representing a ping received as part of setting up a connection. This table may form part of a routing table or may be utilized in conjunction with a routing table which identifies a next node to forward the packet to in order to reach the second device 130 corresponding to the node identifier of "4" indicated to be the end of the route defined by the route identifier.

The deflect 164 sets the destination IP address to the looked-up IP address associated with the second device 130 and forwards the packet onward based on its routing table, as shown in FIG. 20 of the Appendix.

Approaches such as these involve use of the data plane to tunnel, encapsulate, or otherwise transport user data from a first endpoint node to a second endpoint node. These endpoint nodes may be user devices such as phones, tablets, or laptop computers; may be servers connecting two or more locations or connecting a single user to a service; may be IoT devices; and may be virtual devices on a virtual machine or in a container.

Traditionally, when a packet is received at a device, it is impossible to determine the exact network path that was taken in communicating the packet through the network; however, approaches have been proposed for tracking and providing a pathway history for the path that a packet takes through a network in a communication from an origin node to a destination node. For example, each of U.S. Pat. Nos. 7,990,947; 8,625,574; 9,060,023; and 9,392,020, each of which is hereby incorporated herein by reference, discloses an approach which involves providing, as part of a communicated packet, a pathway history for the path by which the packet has been communicated from the origin node to the destination node. This may involve appending, by each of one or more respective nodes along the network path, a unique identifier of that respective node, such as an IP address, a MAC address, or a node identifier. Similarly, the '607 Patent discloses an approach which involves appending, at each of one or more nodes along a path of a packet, information regarding that node or that path. Such pathway history that is created in accordance with these teachings is referred to herein as a "watermark" or "network watermark".

As network communications have become more and more ubiquitous, the security of network communications has become more and more important. Attempts to intercept network communications are common, especially for some networks and for some types of communications.

Needs exist for improvement in securely communicating over networks, networking, network communications, and network routing. These and other needs are addressed by one or more aspects of the present invention which build upon the foregoing networks methodologies and systems of the prior art.

SUMMARY OF THE INVENTION

The invention includes many aspects and features. Moreover, while many aspects and features relate to, and are described in, a particular context, the invention is not limited to use only in this context, as will become apparent from the following summaries and detailed descriptions of aspects, features, and one or more embodiments of the invention.

In an aspect of the invention, a method of transmitting, over a plurality of different network paths, an encoded message from a first networked electronic device to a second networked electronic device, comprises the steps of: (a) encoding a message as a function of one or more network paths out of a plurality of network paths by which packets can be sent from a first networked electronic device for communication to a second networked electronic device; and (b) sending a sequence of packets from the first networked electronic device, each packet comprising a payload addressed for receipt by the second networked electronic device over said one or more network paths, a function of which the message is encoded. Both the sequence of the packets, and said one or more network paths, a function of which the message is encoded, signals to the second networked electronic device the encoded message.

In a feature, the message is encoded using an n-based number system, wherein n is not less than the number of network paths by which packets can be sent from the first networked electronic device for communication to the second networked electronic device.

In a feature, the message is encoded using a binary number system, there being at least two network paths by which packets can be sent from the first networked electronic device for communication to the second networked electronic device.

In a feature, the message is encoded using a hexadecimal number system, there being at least sixteen network paths by which packets can be sent from the first networked electronic device for communication to the second networked electronic device.

In a feature, the packet comprises a node identifier of an intermediate node to which the packet is addressed when communicated from the first networked electronic device, and the intermediate node is a redirect.

In a feature, sending a sequence of packets from the first networked electronic device comprises both sending one or more packets directly to the second networked electronic device and sending one or more packets indirectly to the second networked electronic device through a redirect.

In a feature, the packet comprises a route identifier when communicated from the first networked electronic device, the route identifier being associated with a pathway comprising one or more intermediate nodes, each intermediate node being a redirect.

In a feature, the payload of a packet of the sequence of packets is addressed for receipt by the second networked electronic device, whereby the payload is directly communicated to the second networked electronic device from the first networked electronic device.

In a feature, an encapsulated payload of a said packet of the sequence of packets is addressed for receipt by the second networked electronic device. Said packet itself preferably is addressed for receipt by a networked electronic device other than the second networked electronic device and that performs redirects, whereby the encapsulated payload is indirectly communicated to the second networked electronic device from the first networked electronic device.

In a feature, an encapsulated payload of a said packet of the sequence of packets is addressed for receipt by the second networked electronic device. A node identifier is included with the encapsulated packet received by the second networked electronic device, whereby the second networked electronic device determines the network path taken by the encapsulated payload.

In a feature, an encapsulated payload of a said packet of the sequence of packets is addressed for receipt by the second networked electronic device. A route identifier is included with the encapsulated packet received by the second networked electronic device, whereby the second networked electronic device determines the network path taken by the encapsulated payload.

In a feature, an encapsulated payload of a said packet of the sequence of packets is addressed for receipt by the second networked electronic device. A network watermark is received with the encapsulated payload, whereby the second networked electronic device determines the network path taken by the encapsulated payload.

In a feature, the plurality of network paths by which packets can be sent from the first networked electronic device for communication to the second networked electronic device comprises network paths in an overlay network.

In a feature, the plurality of network paths by which packets can be sent from the first networked electronic device for communication to the second networked electronic device comprises network paths in a software-defined network (SDN).

In a feature, the first networked electronic device has network connections to different networks, and wherein the plurality of network paths by which packets can be sent from the first networked electronic device for communication to the second networked electronic device comprises the different networks.

In a feature, a network watermark is received with the payload addressed for receipt by the second networked electronic device, whereby the second networked electronic device determines the network path taken by the payload.

In another aspect of the invention, a method of transmitting a covert message over a network from an origin device to a destination device, comprises using selection by the origin device of network paths, channels, tunnels, or network medium to signal, to the destination device, "symbols" or "digits" of a number system, wherein sequences of the signaled symbols are interpreted by the destination device as values, and wherein the interpreted values represent an encoded message that is then decoded by the destination device to obtain the covert message.

In another aspect of the invention, a method of transmitting, over a plurality of different network tunnels, an encoded message from a first networked electronic device to a second networked electronic device, comprises the steps of: (a) encoding a message as a function of one or more network tunnels out of a plurality of network tunnels by which packets can be sent from a first networked electronic device for communication to a second networked electronic device; and (b) sending a sequence of packets from the first networked electronic device, each packet comprising a payload addressed for receipt by the second networked electronic device over said one or more network tunnels, a function of which the message is encoded. Both (i) the sequence of the packets, and (ii) said one or more network tunnels, a function of which the message is encoded, signals to the second networked electronic device the encoded message.

In another aspect, a method of transmitting, over a plurality of different network channels, an encoded message from a first networked electronic device to a second networked electronic device, comprises the steps of: (a) encoding a message as a function of one or more network channels out of a plurality of network channels by which packets can be sent from a first networked electronic device for communication to a second networked electronic device; and (b) sending a sequence of packets from the first networked electronic device, each packet comprising a payload addressed for receipt by the second networked electronic device over said one or more network channels, a function of which the message is encoded. Both (i) the sequence of the packets, and (ii) said one or more network channels, a function of which the message is encoded, signals to the second networked electronic device the encoded message.

In another aspect, a method of transmitting a covert message over a network from an origin device to a destination device, comprises using selection by the origin device of a plurality of network paths, network channels, and network tunnels to signal to the destination device symbols of a number system, wherein sequences of the signaled symbols are interpreted by the destination device as values, and wherein the interpreted values represent an encoded message that is then decoded by the destination device to obtain the covert message.

In a feature, the values are values of an n-based number system.

In a feature, the values are values of a binary number system, and wherein there are at least two network paths, network channels, and network tunnels by which the devices may communicate.

In a feature, the values are values of a hexadecimal number system, and wherein there are at least sixteen network paths, network channels, and network tunnels by which the devices may communicate.

In a feature, a selected one of the plurality of network paths, network channels, and network tunnels signals a single symbol.

In a feature, a selected one of the plurality of network paths, network channels, and network tunnels signals a sequence of symbols.

In a feature, a selected one of the plurality of network paths, network channels, and network tunnels comprises a single prime node.

In a feature, a selected one of the plurality of network paths, network channels, and network tunnels comprises a network path comprising a sequence of node identifiers.

In a feature, a selected one of the plurality of network paths, network channels, and network tunnels comprises a network path comprising a sequence of IP addresses.

In a feature, a selected one of the plurality of network paths, network channels, and network tunnels comprises a network path comprising a sequence of MAC addresses.

In a feature, a selected one of the plurality of network paths, network channels, and network tunnels comprises a path comprising a sequence of prime nodes.

In a feature, a selected one of the plurality of network paths, network channels, and network tunnels comprises a path comprising a combination of prime nodes.

In another aspect, a method for network communications of a covert message from a first networked electronic device to a second networked electronic device, comprises: (a) signaling to the second networked electronic device, using packets of a packet stream, a sequence of symbols for encoded data of the covert message by, (i) determining, at the first networked electronic device, based on a stored association, a respective redirect associated with a respective said symbol, (ii) configuring, at the first networked electronic device, a respective packet of the packet stream for communication to the second networked electronic device via the determined respective redirect, the respective packet comprising a sequence identifier placing it in a relative position corresponding to a position of the respective said symbol in the sequence of symbols for the encoded data, (iii) communicating, by the first networked electronic device, the respective packet of the packet stream for communication to the respective redirect, (iv) receiving, at the respective redirect, the respective packet of the packet stream, (v) determining, by the respective redirect based on information in the respective packet, that the second networked electronic device is the ultimate destination of the payload of the respective packet, and (vi) communicating the payload of the respective packet onward to the second networked electronic device with the sequence identifier of the received respective packet and with respective path information of the payload; and (b) decoding the covert message from the first networked electronic device at the second networked electronic device by, (i) for each respective received payload of a respective packet, (A) determining, based on path information received with the respective received payload, the respective redirect through which the respective received payload was routed, and (B) determining a respective symbol for the respective received payload based on the determined respective redirect through which the respective payload was routed, (ii) ordering the determined respective symbols based on the sequence numbers received with their corresponding respective payloads in order to generate the encoded data, and (iii) decoding the encoded data to generate the covert message from the first networked electronic device at the second networked electronic device.

In a feature, communicating a payload of the respective packet to the second networked electronic device with the sequence identifier of the respective received packet and with respective path information of the payload comprises appending the respective path information to the respective received packet, changing the destination address of the respective received packet, and communicating the respective received packet onward for delivery to the second networked electronic device.

In a feature, communicating a payload of the respective packet to the second networked electronic device with the sequence identifier of the respective received packet and with respective path information of the payload comprises creating a new packet that includes the payload of the respective received packet, appending the respective path information to the new packet, and communicating the new packet onward for delivery to the second networked electronic device.

In a feature, at least one of the first electronic device and the second networked electronic device comprises a computer, a laptop, a mobile phone, a tablet, or a server.

In a feature, the first networked electronic device and the second networked electronic device comprise mobile phones having an app loaded thereon, and wherein the app performs one or more steps of the method at the first networked electronic device and the second networked electronic device.

In a feature, the respective path information comprises a node identifier corresponding to the respective redirect.

In a feature, the respective path information comprises an internet protocol address corresponding to the respective redirect.

In a feature, the respective path information comprises a media access control address corresponding to the respective redirect.

In a feature, the respective path information comprises a route identifier.

In a feature, the respective path information comprises a sequence or combination of node identifiers.

In a feature, the respective path information comprises a network watermark.

In a feature, a said redirect comprises a storage server over an overlay network that is software-defined.

Another aspect comprises a method of network communications as disclosed herein

Another aspect comprises a method providing a technical solution to the technical problem of how to communicate data over a network so as to prevent interception of the data by an actor with access to communications over the network, the method comprising any one of the foregoing methods.

Another aspect of the invention comprises one or more computer readable media containing computer executable instructions for performing a method as disclosed herein.

Another aspect of the invention comprises a device forming a node of one or more networks and configured to perform a method of network communications as disclosed herein.

Another aspect relates to computer readable media containing computer executable instructions for performing all or part of a disclosed method.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

FIG. 13 illustrates a table for mapping letters to a binary system.

FIG. 24 shows the resulting IP Packet after the determining and setting of FIGS. 22 and 23.

FIG. 31 shows the resulting IP Packet after the determining and setting of FIGS. 29 and 30.

FIG. 40 illustrates exemplary pseudocode for adding data representing a covert message to a packet stream.

FIG. 41 illustrates exemplary pseudocode for processing packets before they are sent to determine whether to add data for a covert message.

FIG. 47 illustrates exemplary pseudocode for randomly selecting a particular route from among identified alternative route candidates all containing a particular prime node.

FIG. 48 illustrates exemplary pseudocode for signaling a binary symbol by a packet stream, which involves, for each packet in a packet stream, setting a node identifier indicating a prime node based on the binary symbol in the array corresponding to that packet's sequential place in the packet stream.

FIGS. 49 and 50 provide exemplary pseudocode for communication of a covert message that involves, for each packet in a packet stream for which multiple possible routes are available to signal a desired binary symbol, randomly selecting a respective particular route for that respective packet, such that packets signaling the same binary symbol may utilize different routes.

FIG. 51 illustrates an example of hexadecimal values used in encoding the covert message of "hidden".

FIG. 70 illustrates maintenance at the first mobile phone of routes which correspond to hexadecimal symbols to be signaled in transmitting the covert message.

DETAILED DESCRIPTION

Figure 1:
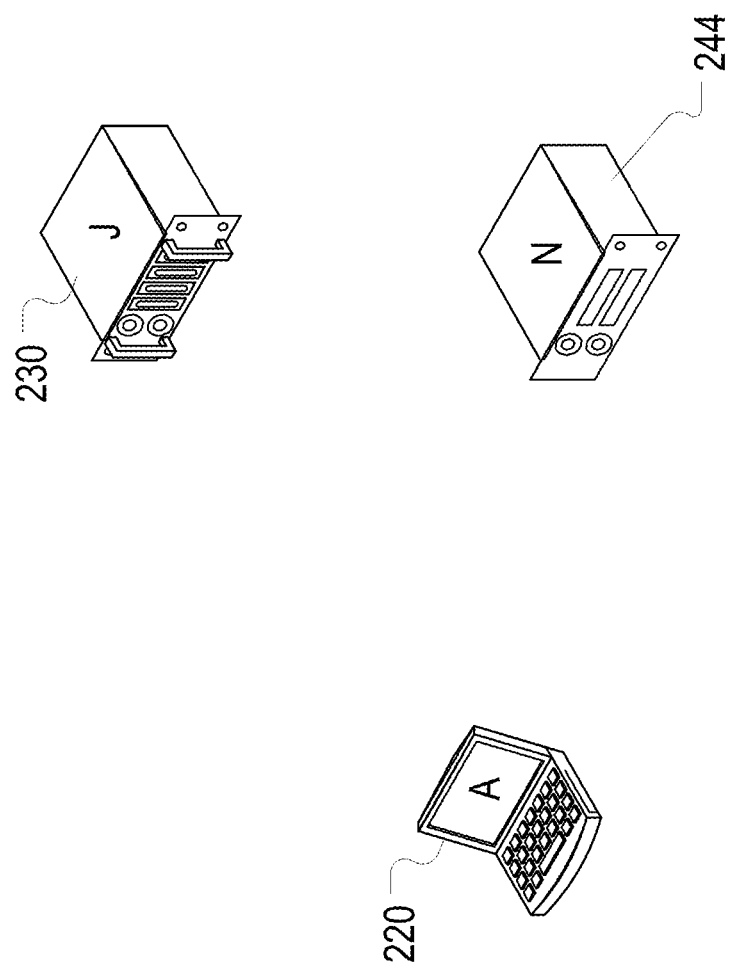
FIG. 1 illustrates three devices arranged in a network for communications therebetween.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers", wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

As noted above, attempts to intercept network communications are common, especially for some networks and some types of communications.

In accordance with one or more preferred implementations, a covert message is communicated from an origin device to a destination device based on the communication of packets or other data units over multiple paths, channels, tunnels, or mediums. In this regard, the message is communicated from an origin device to a destination device by using path, channel, tunnel, or medium selection to signal "symbols" or "digits" of an n-based number system such as, for example, "0" and "1" in a binary system. Based on sequences of the symbols, the symbol sequences are interpreted as values in the n-based number system. The values represent an encoded message and are decoded to obtain the message. Preferably, a hexadecimal number system is used and there are at least sixteen network paths by which the devices may communicate.

As a simple example using bits, data can be covertly communicated from an origin device to a destination device as part of the communication of packets over both (i) a direct path between the two devices, and (ii) an indirect path involving an intermediate endpoint node such as a deflect node, e.g., a server functioning as a deflect. In this example, data is covertly communicated from the origin device to the destination device by using path selection to signal binary symbols.

Figure 2:
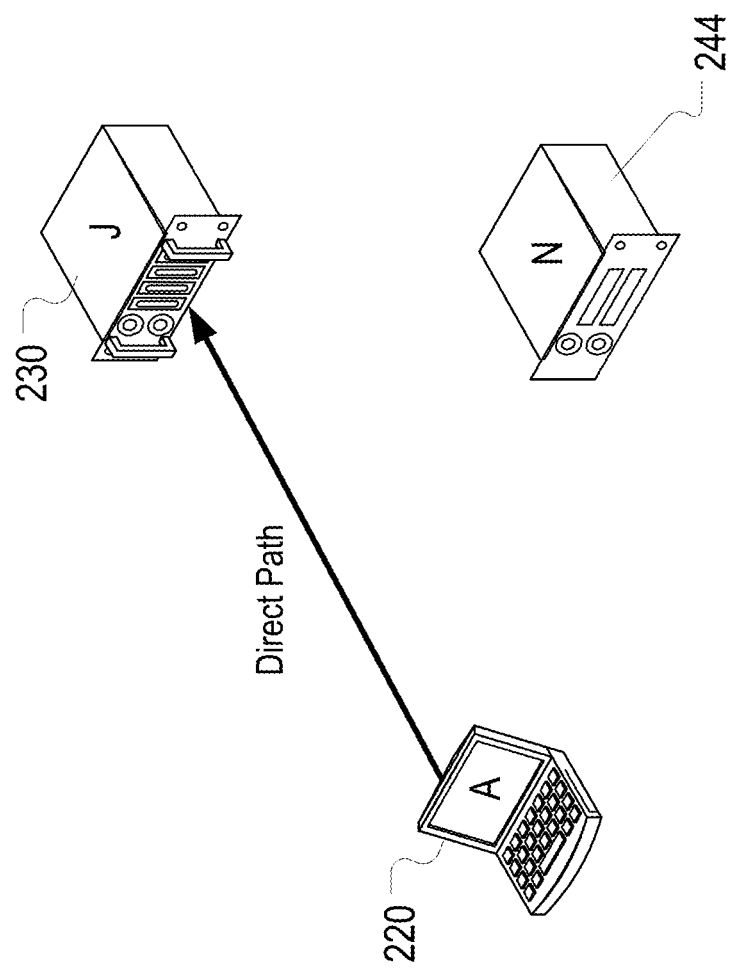
FIG. 2 illustrates a direct network path from a first device to a second device in the system of FIG. 1.
Figure 3:
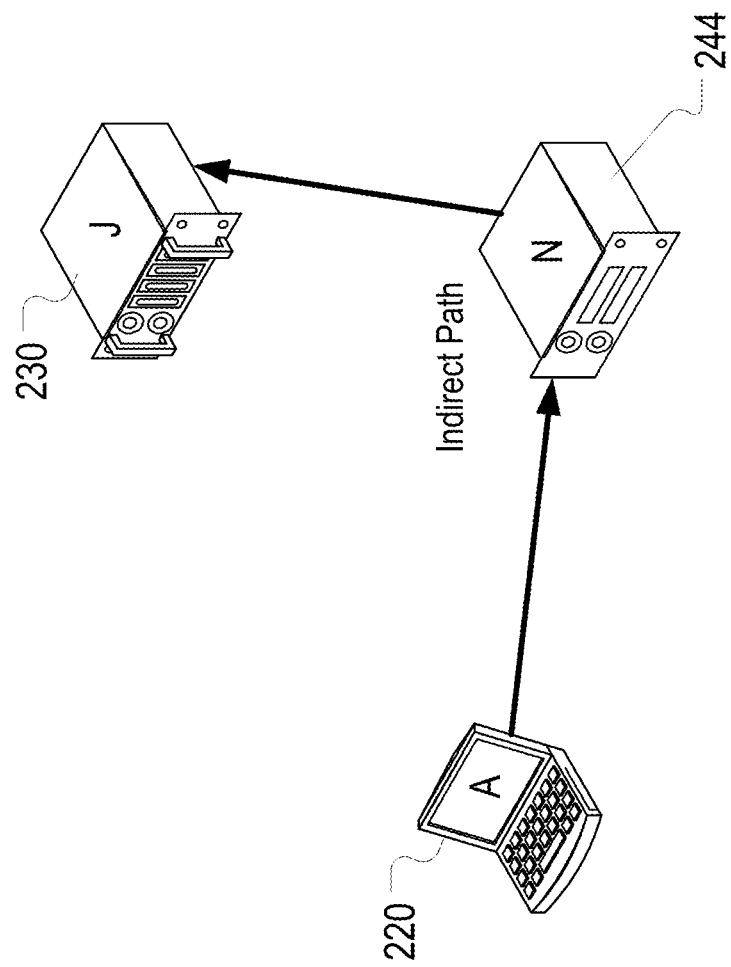
FIG. 3 illustrates an indirect network path from the first device to the second device in the network of FIG. 1.
Figure 4:
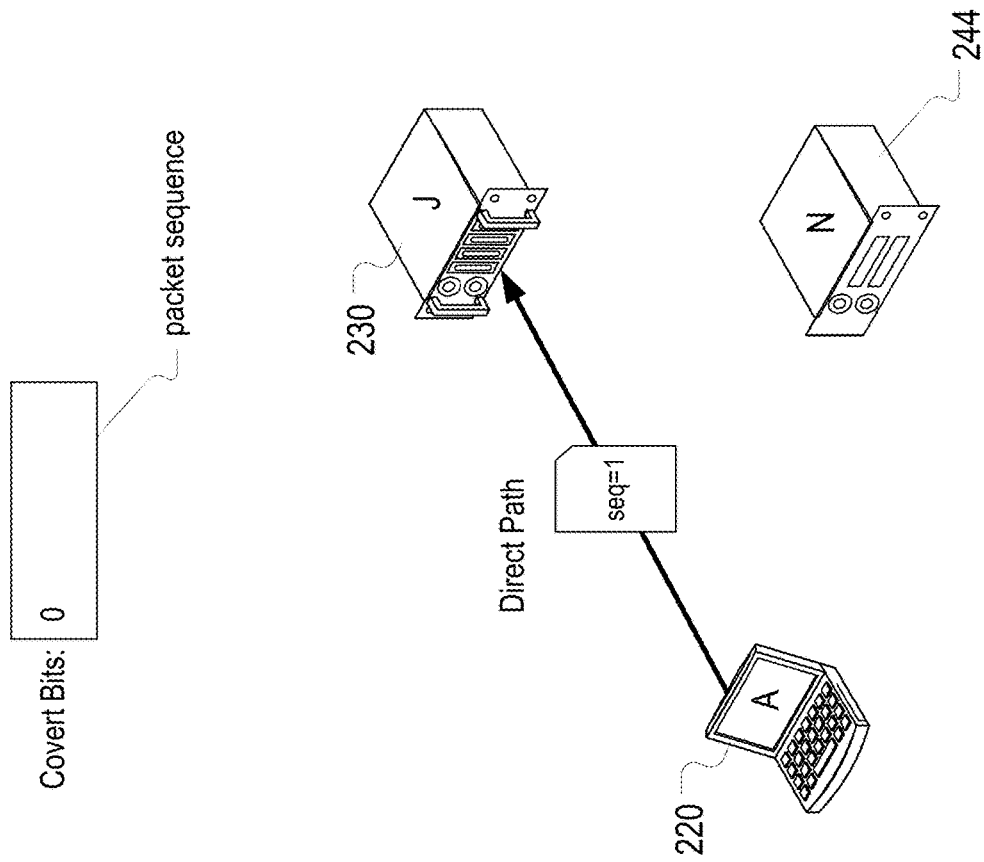
FIG. 4 illustrates signaling a binary symbol of "0" by the first device to the second device based on the network path by which a packet is communicated from the first device to the second device in the network of FIG. 1.
Figure 5:
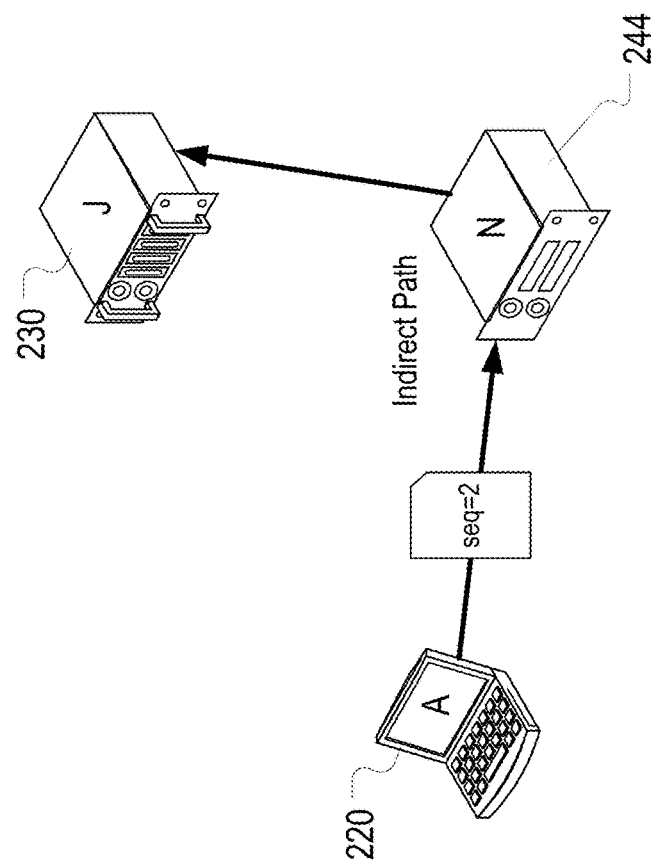
FIG. 5 illustrates signaling a binary symbol of "1" by the first device to the second device based on the network path by which a packet is communicated from the first device to the second device in the network of FIG. 1.
Figure 6:
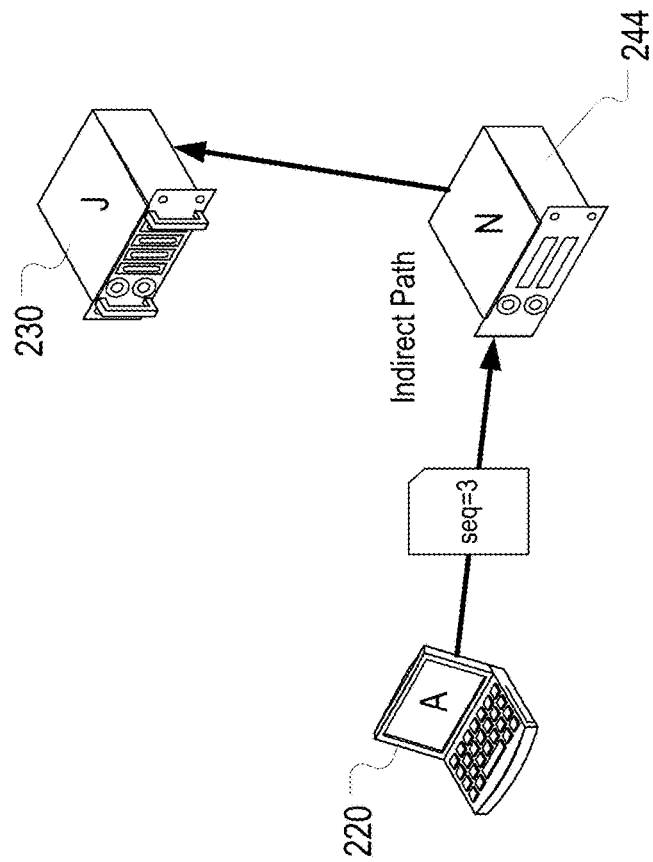
FIG. 6 illustrates signaling a binary symbol of "1" by the first device to the second device based on the network path by which a packet is communicated from the first device to the second device in the network of FIG. 1.
Figure 7:
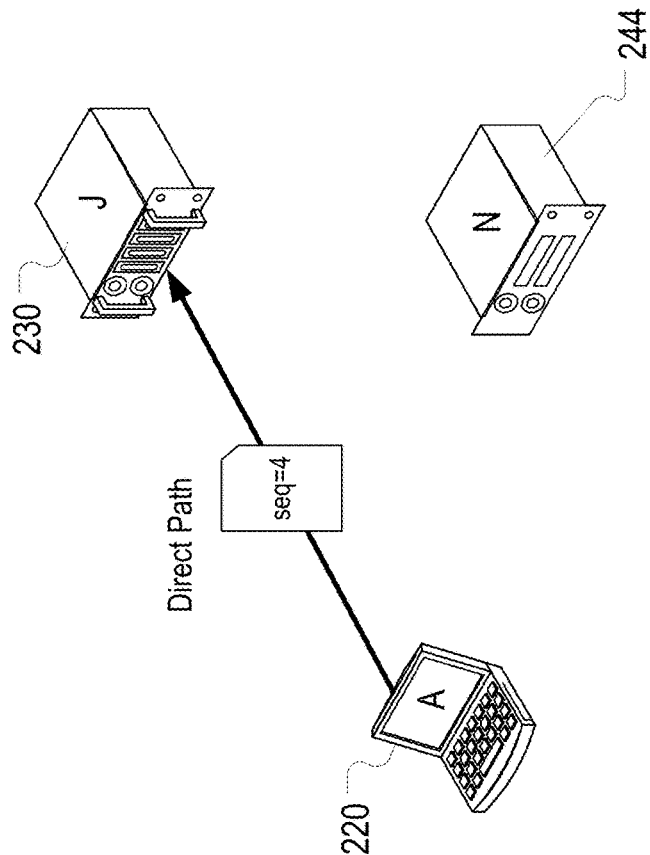
FIG. 7 illustrates signaling a binary symbol of "0" by the first device to the second device based on the network path by which a packet is communicated from the first device to the second device in the network of FIG. 1.
Figure 8:
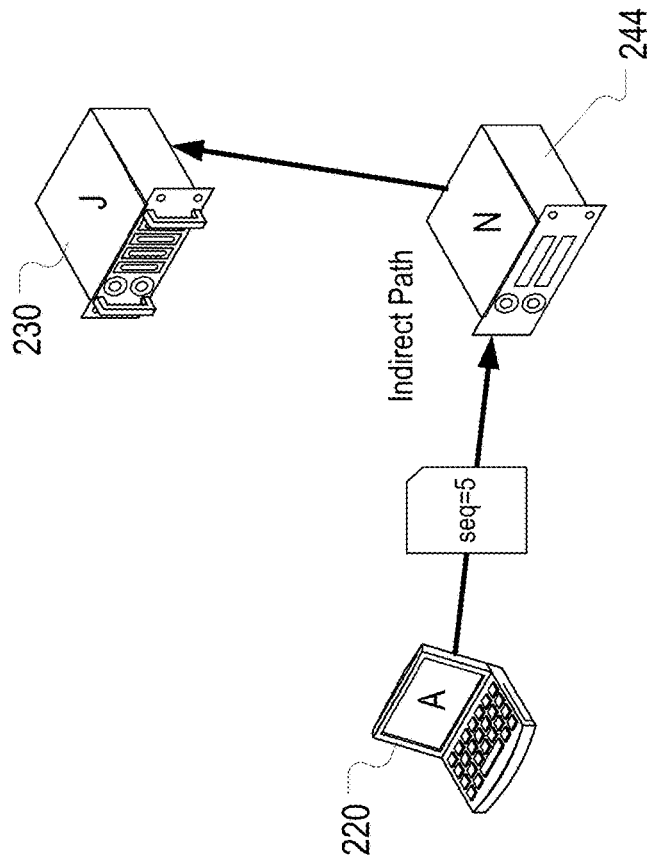
FIG. 8 illustrates signaling a binary symbol of "1" by the first device to the second device based on the network path by which a packet is communicated from the first device to the second device in the network of FIG. 1.
Figure 9:
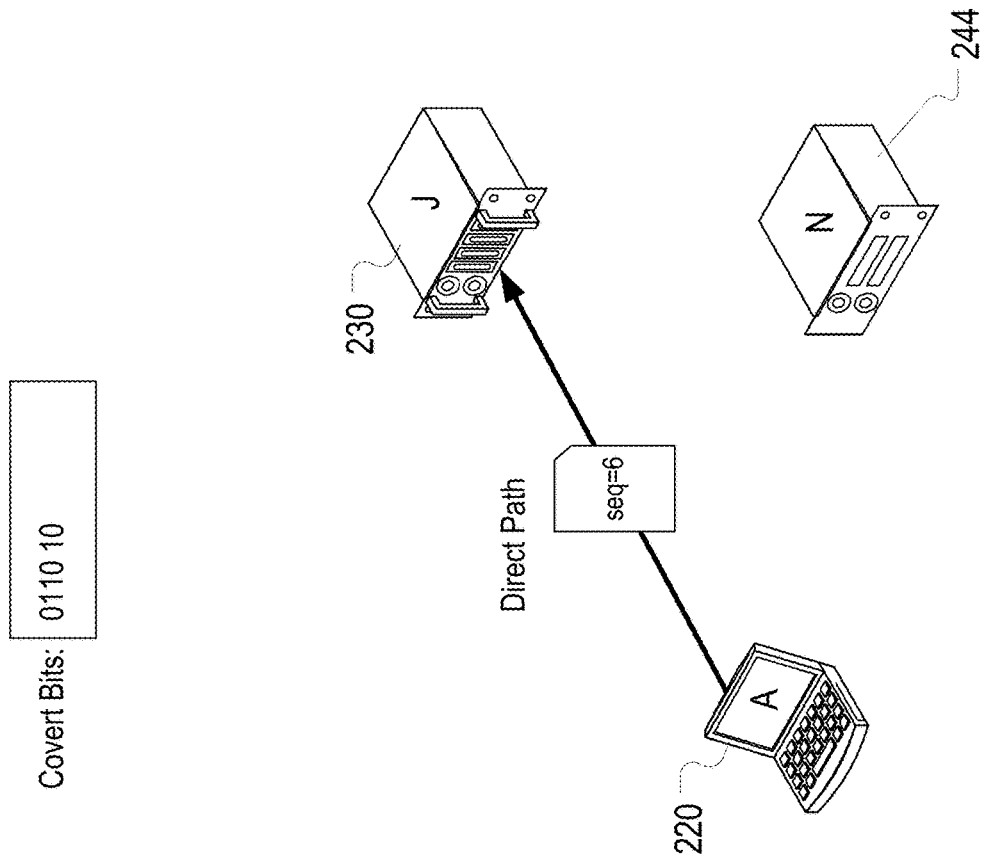
FIG. 9 illustrates signaling a binary symbol of "0" by the first device to the second device based on the network path by which a packet is communicated from the first device to the second device in the network of FIG. 1.
Figure 10:
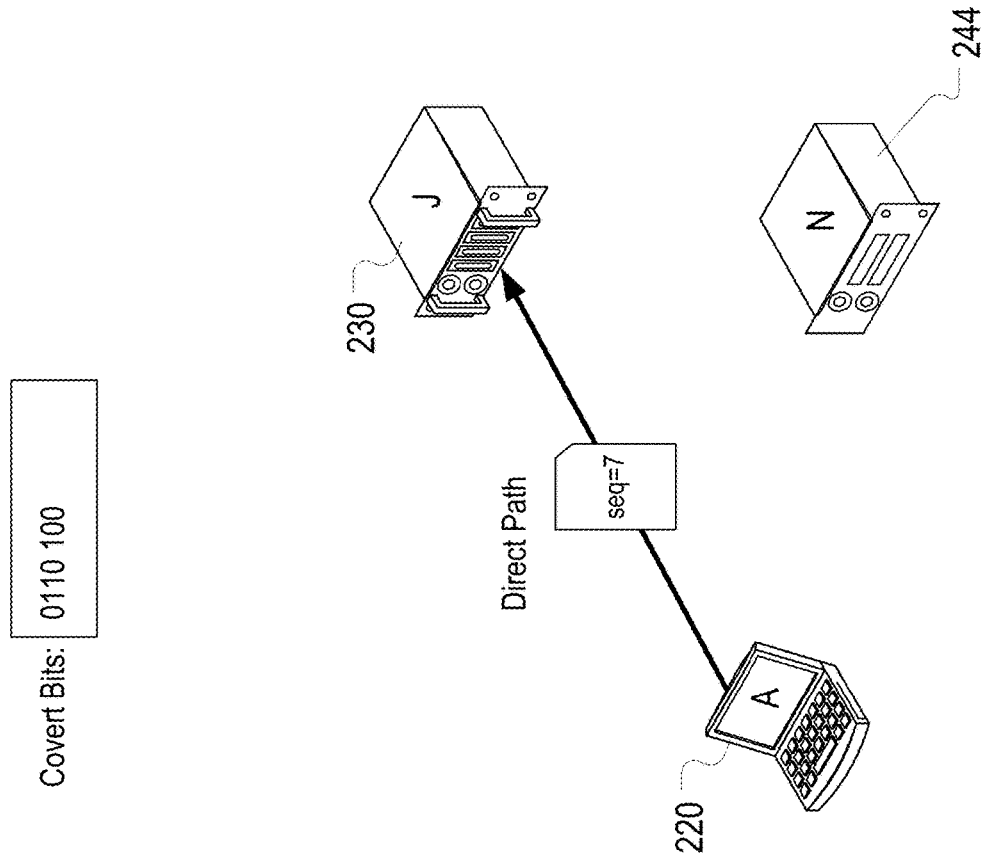
FIG. 10 illustrates signaling a binary symbol of "0" by the first device to the second device based on the network path by which a packet is communicated from the first device to the second device in the network of FIG. 1.
Figure 11:
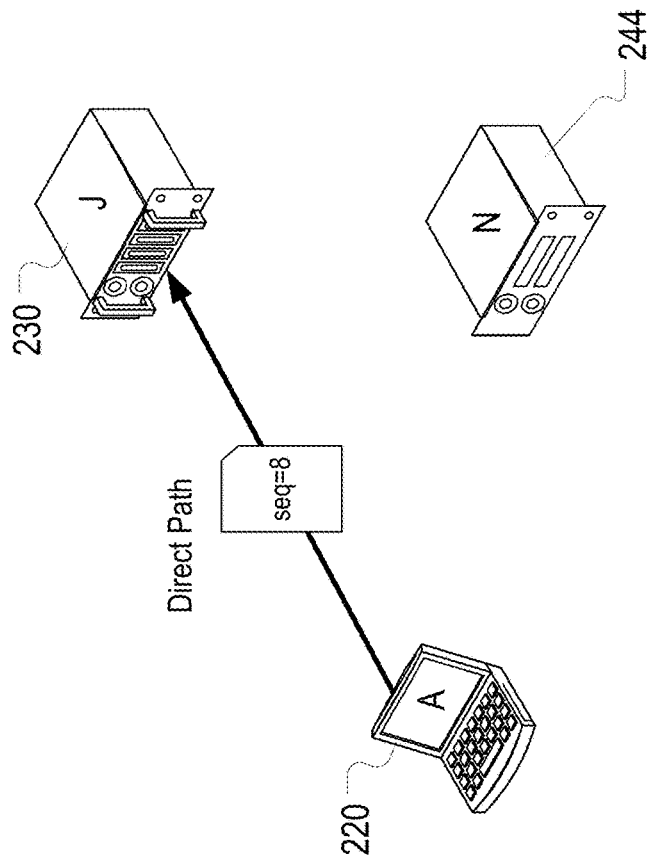
FIG. 11 illustrates signaling a binary symbol of "0" by the first device to the second device based on the network path by which a packet is communicated from the first device to the second device in the network of FIG. 1.

FIGS. 1-11 illustrates this concept. The system shown in FIG. 1 comprises an origin device 220 (node A), a destination device 230 (node J), and a server 244 (node N) configured to provide redirection functionality (hereinafter referred to as a "redirect node" or simply "redirect"). FIG. 2 illustrates a "direct" communication path from the origin device 220 to the destination device 230, and FIG. 3 illustrates an "indirect" communication path from the origin device 220 to the destination device 230 insofar as the indirect communication path necessarily includes the redirect node comprising server 244 and the "direct" communication path necessarily does not. Covert data is communicated from the origin device 220 to the destination device 230 by using path selection for each packet in a sequence of packets to signal binary signals, with communication over the direct path representing communication of a binary symbol of "0", and communication over the indirect path representing communication of a binary symbol of "1". Of course, it will be appreciated that these representations could equally be switched, with the direct path representing a binary symbol of "1" and the indirect path representing a binary symbol of "0". The binary symbols are arranged in sequence to obtain binary values representing the encoded message that is covertly communicated. This former scenario is illustrated in FIGS. 4 and 5, wherein a communication of a first packet in a packet sequence (e.g., a packet having a sequence number of "1") from the origin device 220 to the destination device 230 over the direct path is interpreted by the destination device 230 as signaling of the binary symbol of "0"; and wherein a communication of a second packet in the packet sequence (e.g., a packet having a sequence number of "2") from the origin device 220 to the destination device 230 over the indirect path is interpreted by the destination device 230 as signaling of the binary symbol of "1". A network watermark in each of the communicated packet is utilized by the destination device 230 to determine path information and, thereby, a symbol that is signaled by the respective packet.

FIGS. 6-11 illustrate communication of additional packets in the packet sequence from the origin device 220 to the destination device 230. In this example, the packet sequence is 8 bits in length and utilizes 8-bit Unicode encoding. The packet sequence illustrated in FIGS. 4-11 thus is interpreted by the destination device 230 as the letter "H", which is the first letter in the convert message that is transmitted.

Figure 12:
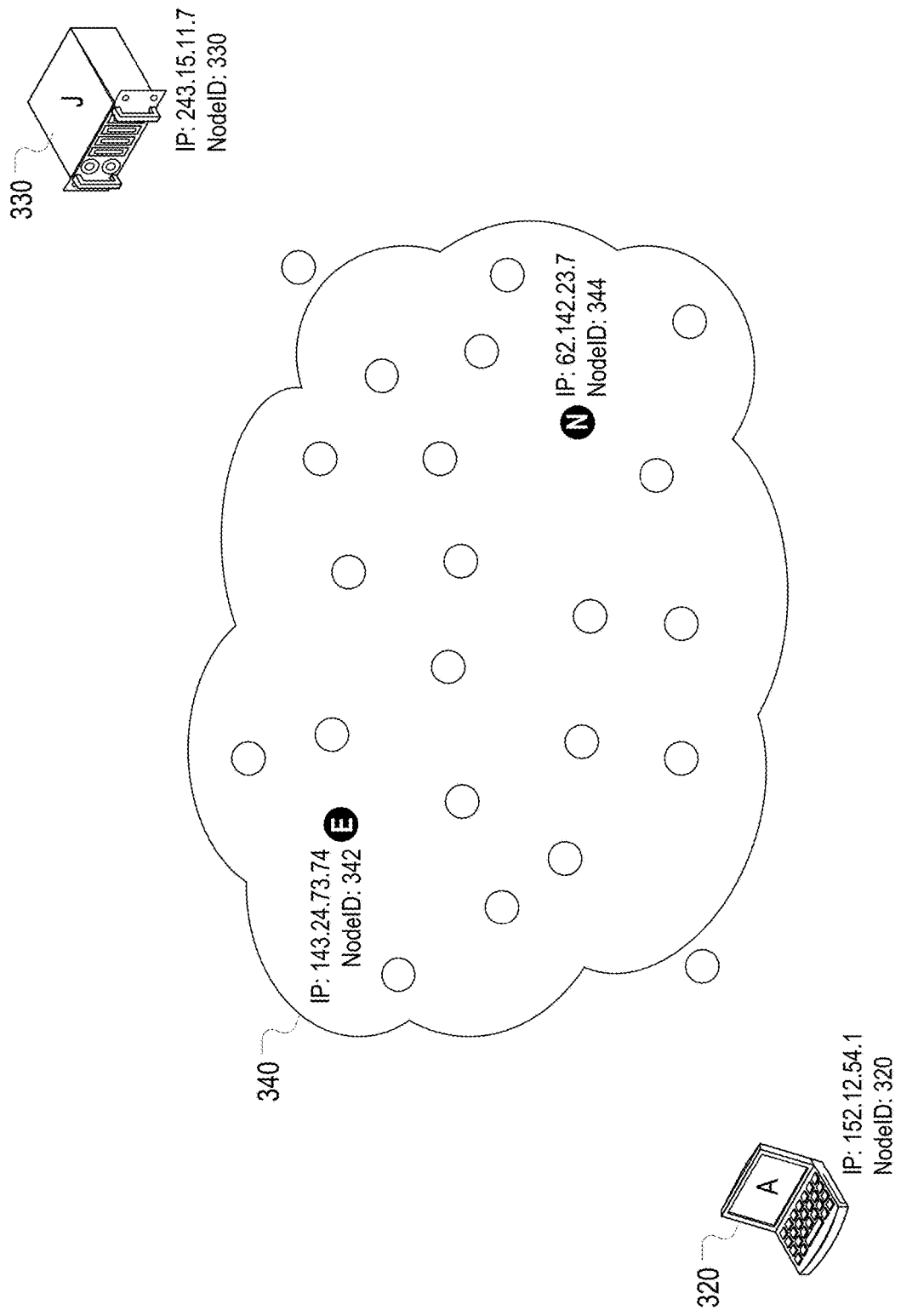
FIG. 12 illustrates another network including a first device at origin node "A", a second device at a destination node "J", and intermediate nodes including node "E" and node "N".

The illustration of the communication of the letter "H" between the origin node 220 and destination node 230 represents a simple example. A more complex example is illustrated next, in which the covert message "hidden" is communicated from a first device 320 to a second device 330 utilizing 8-bit Unicode encoding. In particular, FIG. 12 illustrates a network including a first device 320 at origin node "A", a second device 330 at destination node "J", and intermediate nodes forming network 340 at which electronic devices are configured for routing network communications, including node "E" and node "N". Data can be communicated from the first device 320 to the second device 330 by using path selection to signal symbols in an n-based number system, with communication over a network path through the node "E" representing in a binary system, for example, communication of a binary symbol of "0", and communication over a network path through node "N" representing, for example, communication of a binary symbol of "1".

Figure 14:
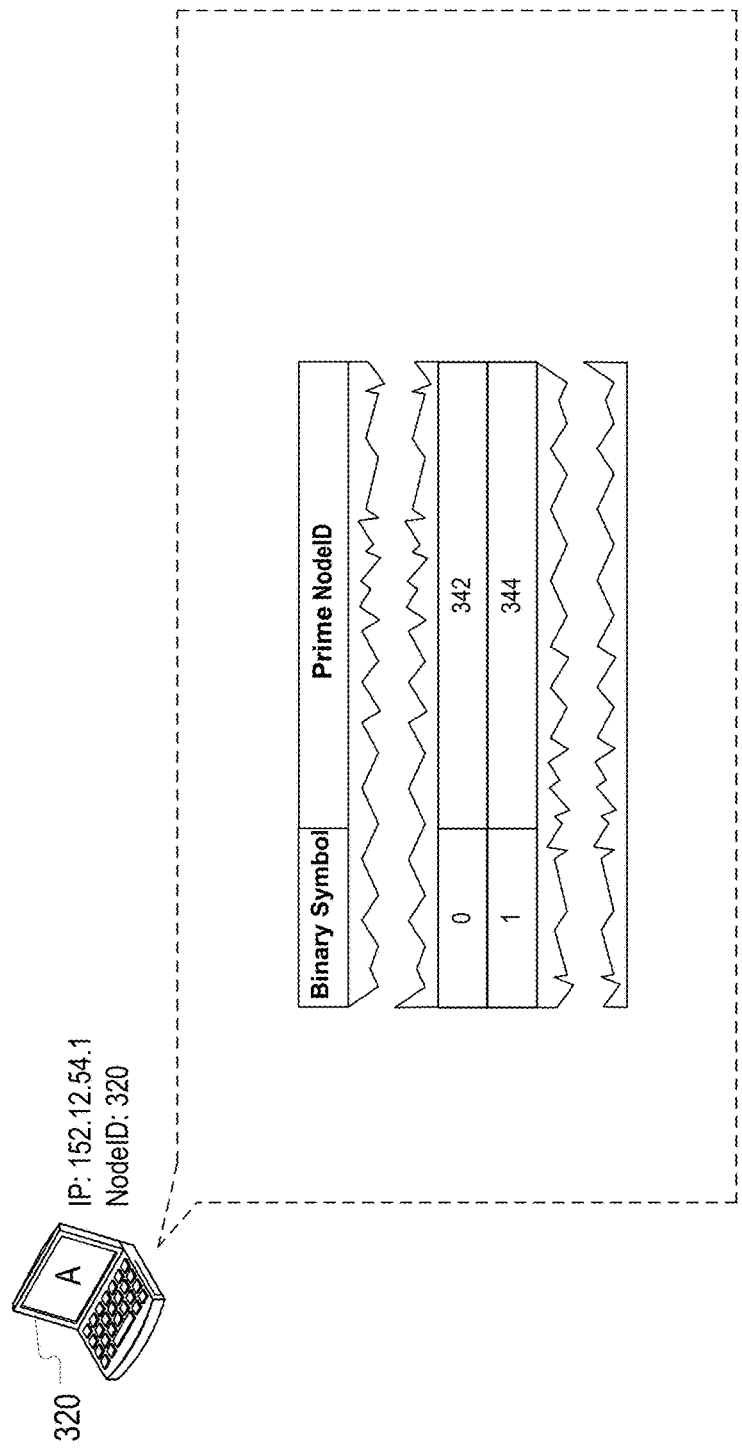
FIG. 14 illustrates a table associating prime node identifiers for signaling binary symbol.
Figure 15:
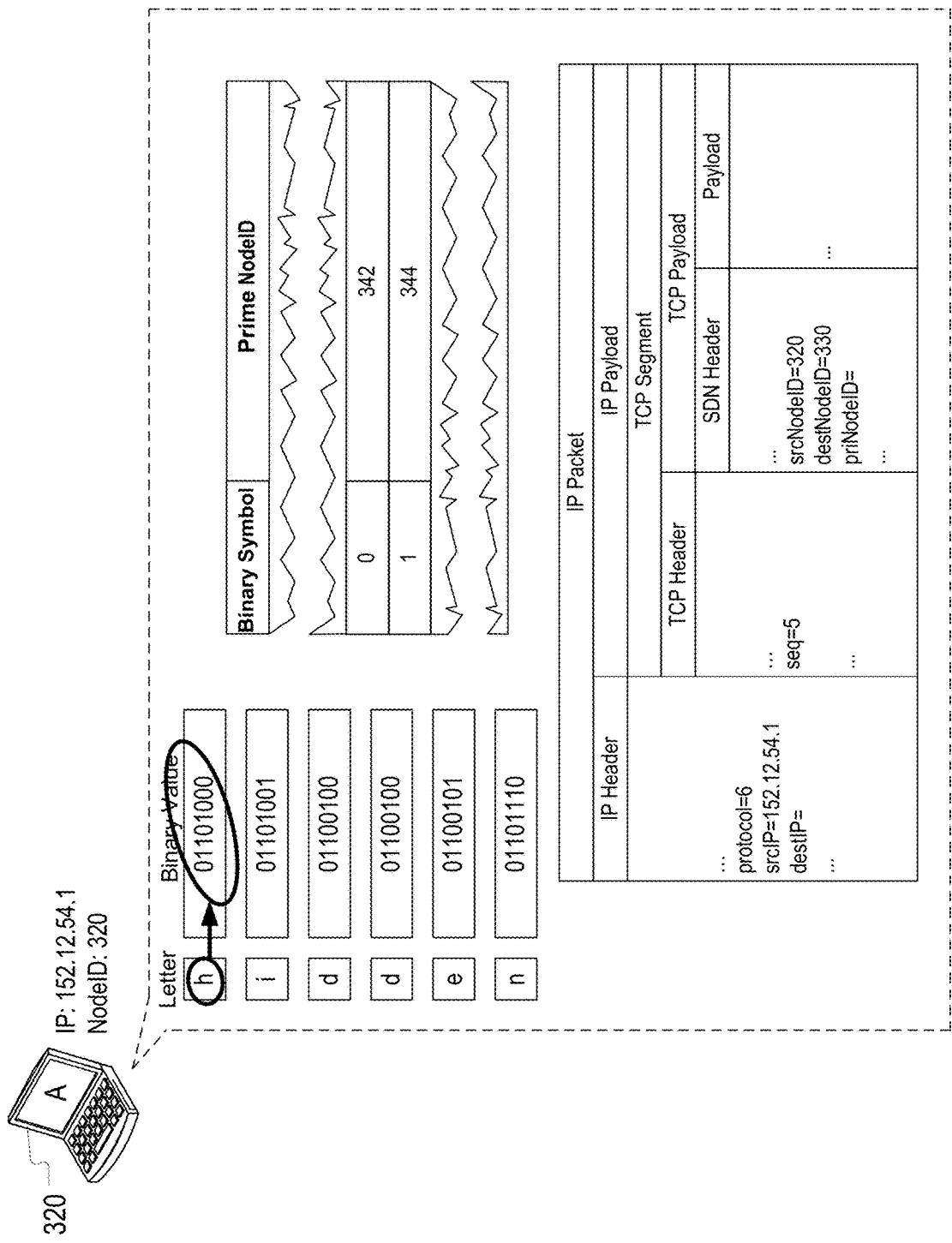
FIG. 15 schematically shows the determining by the first device of the network of FIG. 12 of a binary number that maps to the letter "h".
Figure 16:
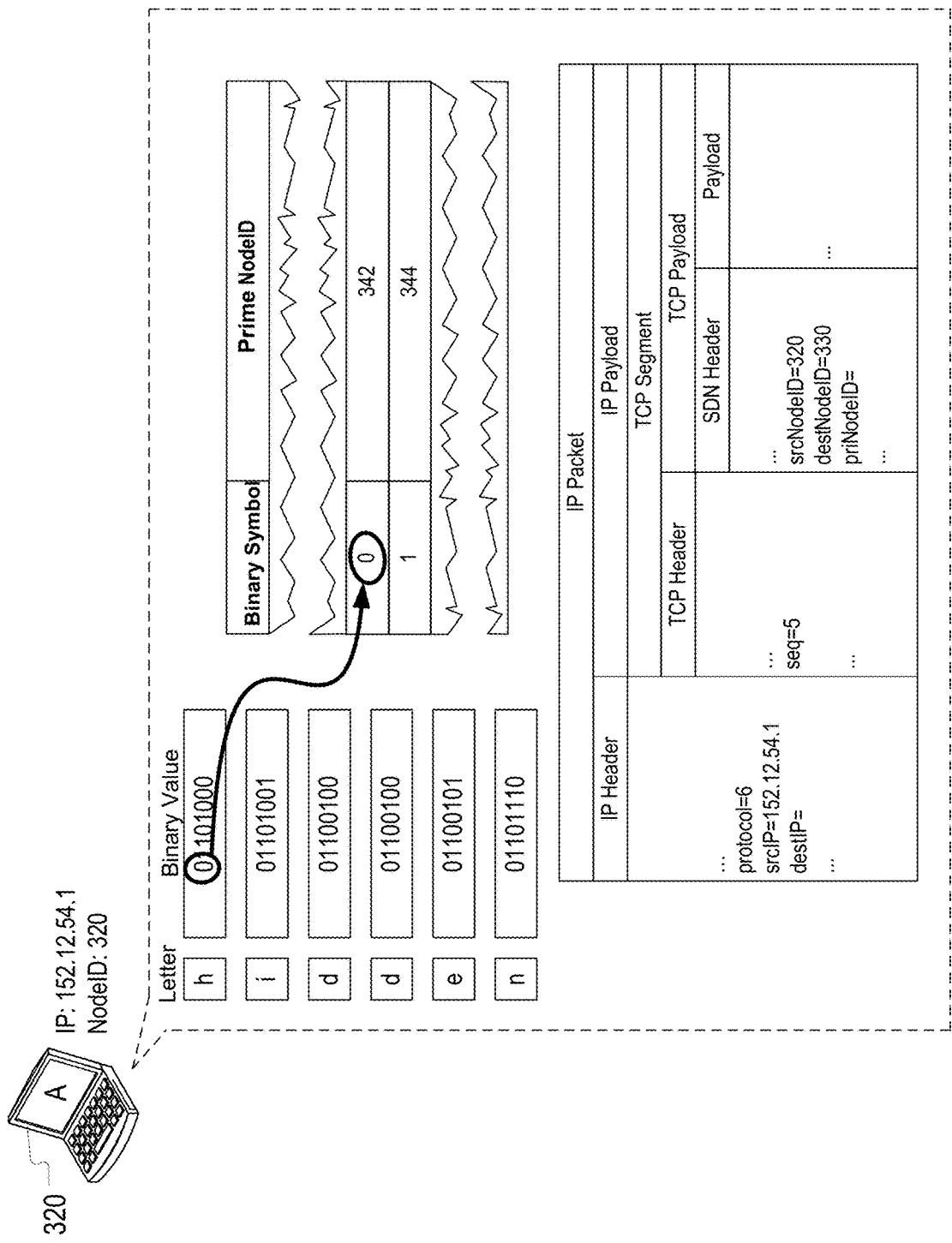
FIG. 16 schematically shows the determining by the first device of the network of FIG. 12 of the first digit in the binary number that maps to the letter "h".

In this example, the first device 320 preferably utilizes encoding data in the table illustrated in FIG. 13, which is stored or received by the first device 320, in order to map binary values to the letters of the message "hidden". The first device 320 preferably utilizes the table illustrated in FIG. 14, which is stored or received by the first device 320, in order to then determine the network paths for signaling the binary symbols of the binary values determined from FIG. 13.

It will be appreciated that a "direct path" may comprise one or more intermediate nodes, i.e., nodes other than the origin and destination nodes of the origin device and destination device, and that an "indirect path" does indeed comprise one or more intermediate nodes. Furthermore, a packet sent from the origin node along the direct path will have a packet destination address of the destination node, whereas a packet sent from the origin node along the indirect path will have a packet destination address of an intermediate node and not an address of the destination node, the intermediate node being a redirect.

With reference to the Conventional Schema, covertly transmitting a communication preferably introduces a new layer referred to as the "covert layer" that is located between the transport layer and the network layer. The covert layer generates packets to be sent for each segment, none of the packets actually containing data of the segment. In this new schemas, referred to the "Covert Schema", a message for communication over a network from a software application is processed at an application layer and encapsulated in one or more segments at a transport layer, and a plurality of packets are generated for communication based on each segment at the covert layer, with each segment being encapsulated in a packet at a network layer, each packet being encapsulated in a frame at a data link layer, and each frame being transmitted in a raw data stream at a physical layer, wherein the covert layer determines for each generated packet the path of the network by which the packet is sent, and wherein the covert layer regenerates the segments at the destination node based on the path taken and sequence number of each of the received packets. Unlike in the Conventional Schema, in-turn encapsulation between layers is not continued from the transport layer to the data layer in the Covert Schema. In the Covert Schema, data packet paths are by analogy the raw data stream of the physical layer in the Conventional Schema, and the packet sequences are by analogy the frames transmitted in the raw data stream. Moreover, the data of the payload contained in a packet, frame, and raw data stream has no relation whatsoever to the actual segments or information being communicated between software applications at the application layer at the origin and destination nodes. Consequently, it is impossible to discover the information being communicated through interception and analysis of the payloads of the packets, frames, or raw data streams that are sent in the network.

Of course it should be appreciated that while a binary number system has been used in the foregoing illustrations, other n-based numbing systems may be used as well. Indeed, a hexadecimal system may be preferred for efficiently communicating bytes when sixteen or more network paths are available for communicating.

Additionally, as used herein, a network node is referred to as a "prime" node if inclusion of that node in a network path traversed by a packet consequently signals a symbol in the n-based number system that is utilized Thus, each of node "E" and node "N" is a prime node in the foregoing illustration, as a path including either node thereby signals a binary symbol of either "0" or "1".

Preferably, a network path will include a single prime node; however, protocols may be utilized for determining the symbol signaled by a network path that includes multiple prime nodes. For example, the symbol signaled by the first prime node may be used irrespective of any other prime modes occurring later along the path. As another example, a packet that is sent by a network path including more than one prime node may be deemed "lost" and disregarded or dropped. As another example, a route identifier may only include a single prime node even though a network watermark indicates multiple prime nodes of the network path, in which case the single prime node of the route identifier may be used to for determining the symbol signaled.

It also will further be appreciated that combinations or sequences of intermediate nodes may be used to signal signals rather than a single node, with such combinations or sequences each identifying a symbol of the n-based number system utilized. In this scenario, such combinations and sequences are referred to herein as prime combinations and prime sequences. Moreover, the symbol signaled would be dependent on node order in a sequence, but not in a combination.

It further will be appreciated that a prime node, a prime combination, or a prime sequence further may signal a sequence of symbols in an n-based number system, especially in scenarios in which there are a sufficient number of different pathways for being able to communicate the symbols as well as symbol sequences.

Lastly, it will be appreciated that one or more pathways may be used to communicate control information, such as indicating the start of a message or an end of a packet sequence, especially in scenarios in which packet sequences may have variable lengths in the covert communications.

Figure 17:
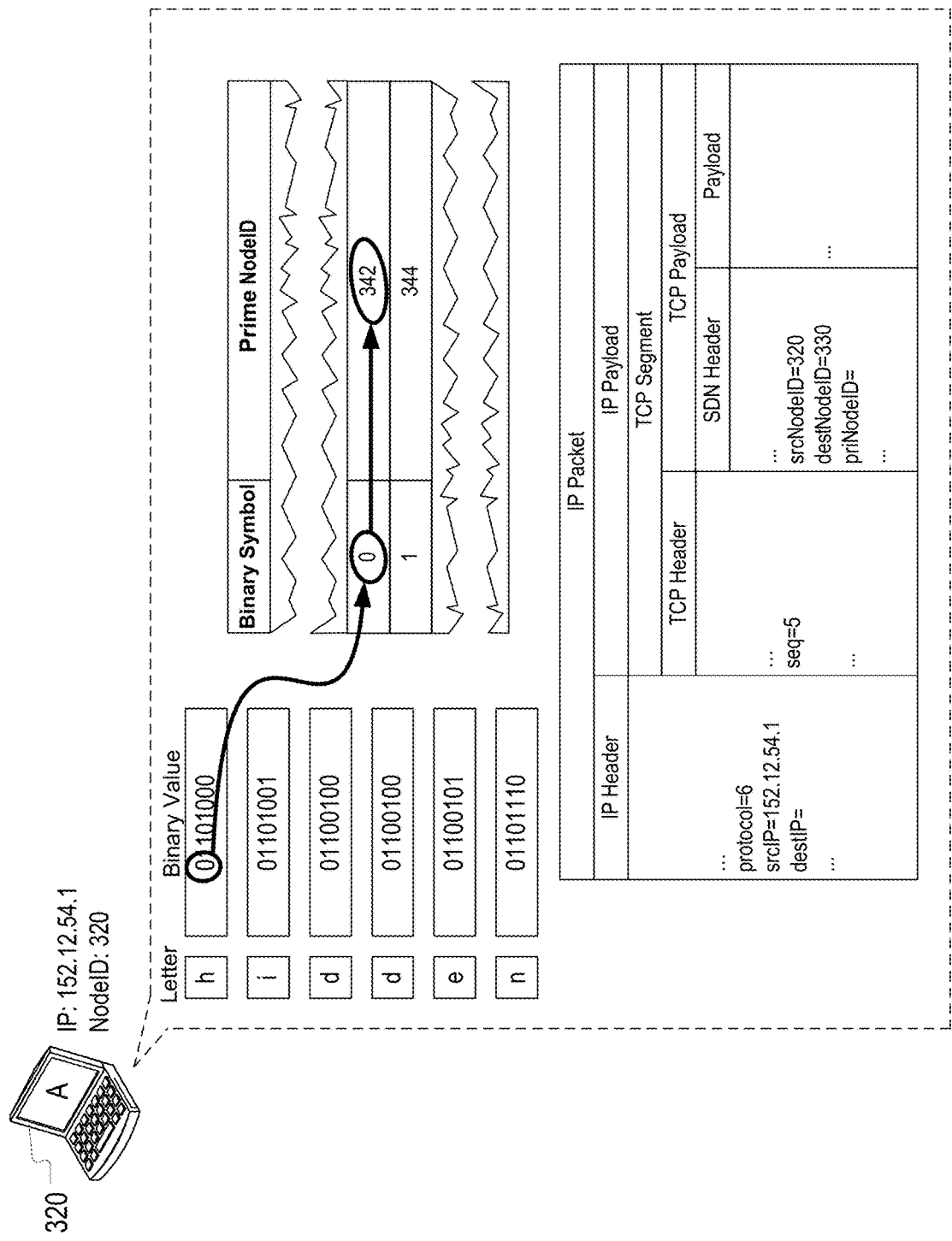
FIG. 17 schematically shows the determining by the first device of the network of FIG. 12 of a prime node identifier that represents the binary symbol of "0".
Figure 18:
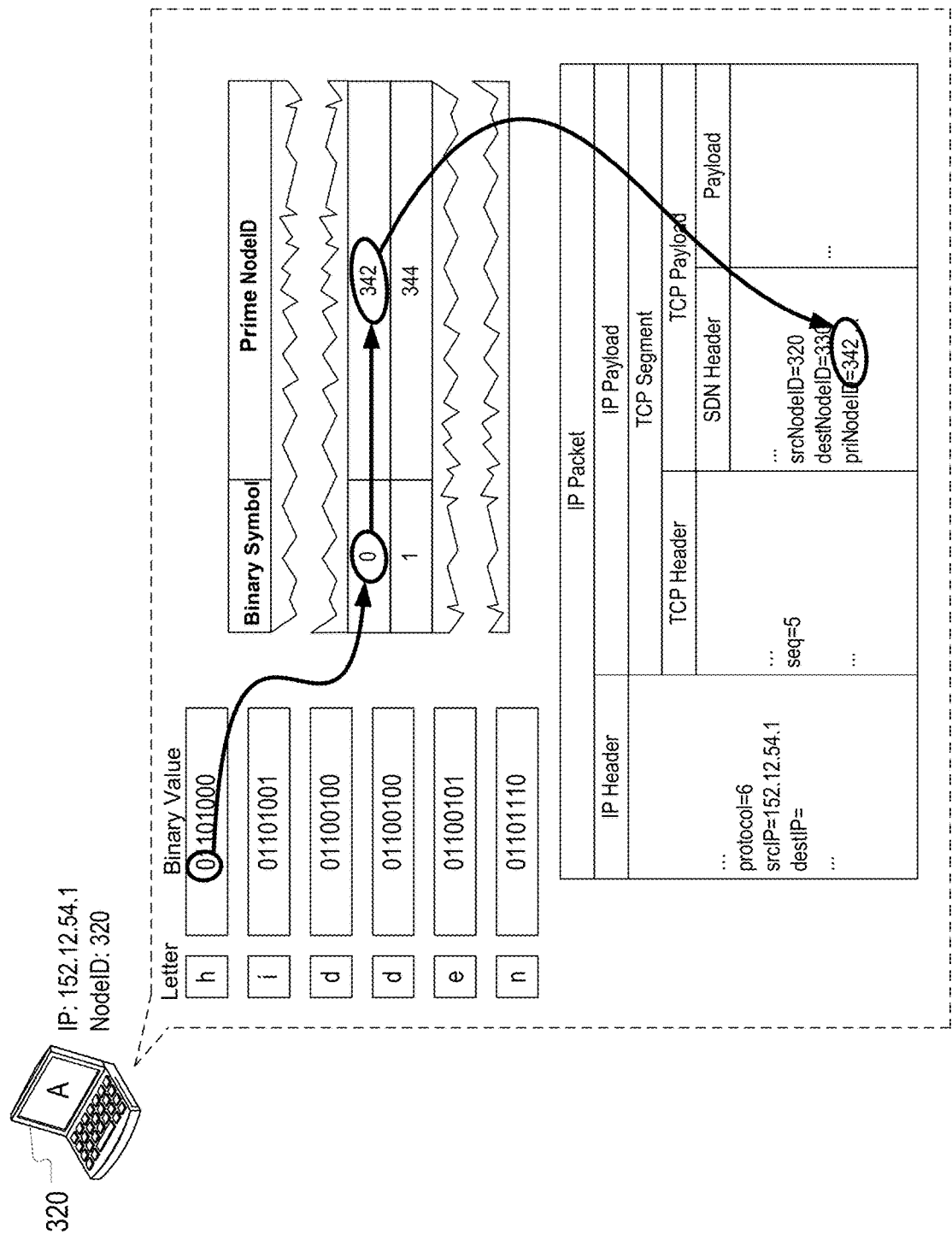
FIG. 18 schematically shows the setting of the priNodeID value in a header of a TCP Payload of an IP Packet to the determined prime node identifier that represents the binary symbol of "0".
Figure 19:
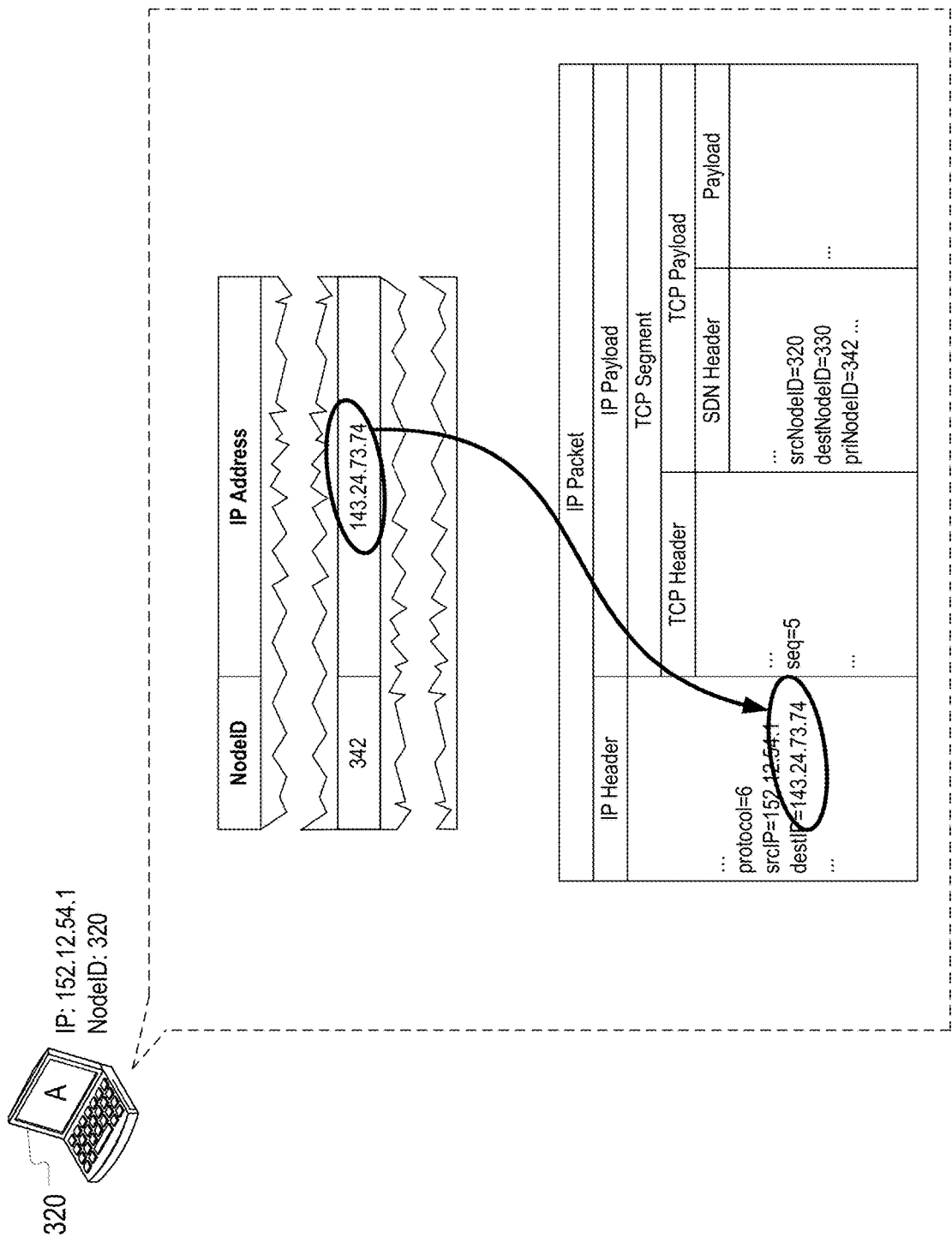
FIG. 19 schematically shows the setting of the destIP value in the IP Header of the IP Packet of FIG. 18 to an IP address associated with the prime node identifier that represents the binary symbol of "0".
Figure 20:
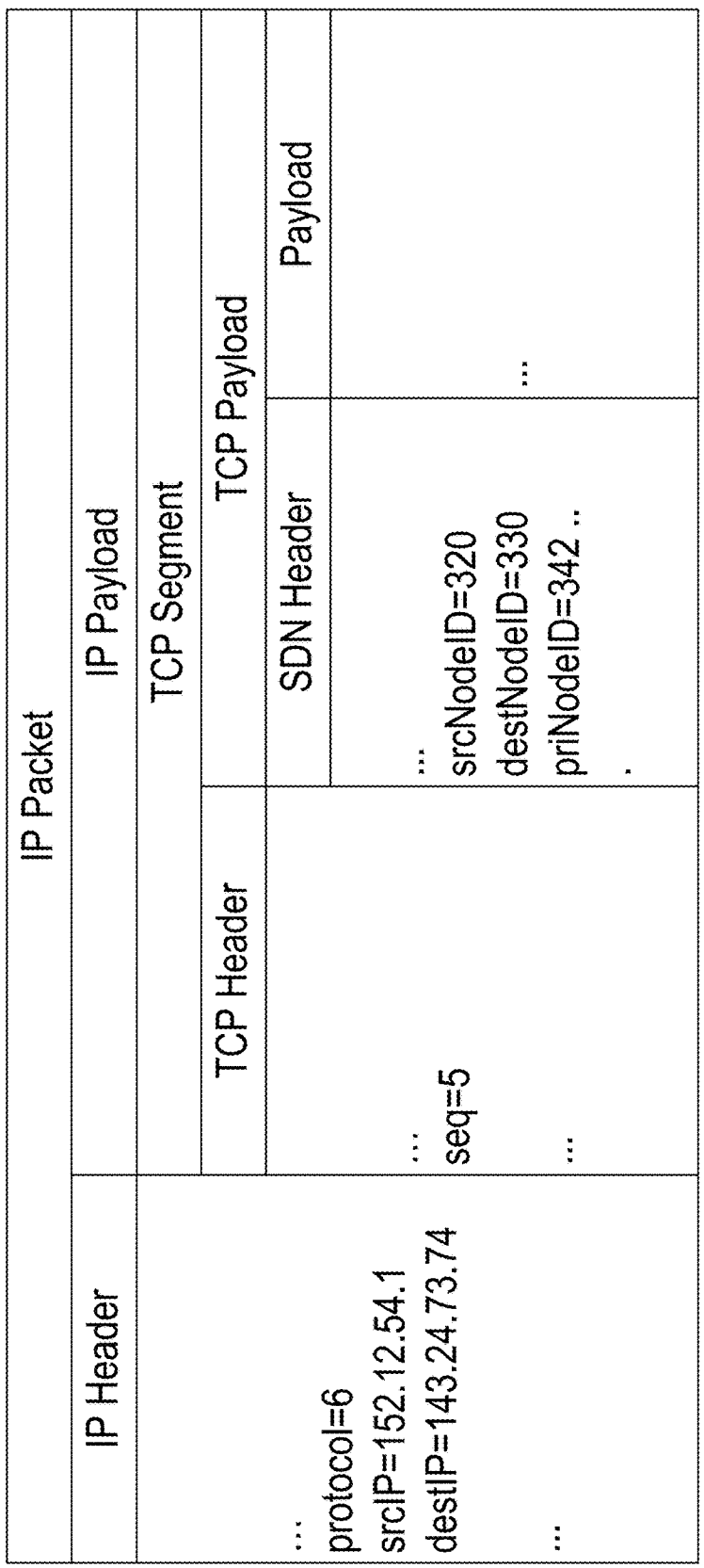
FIG. 20 shows the resulting IP Packet after the determinations and settings of FIGS. 15-19.
Figure 21:
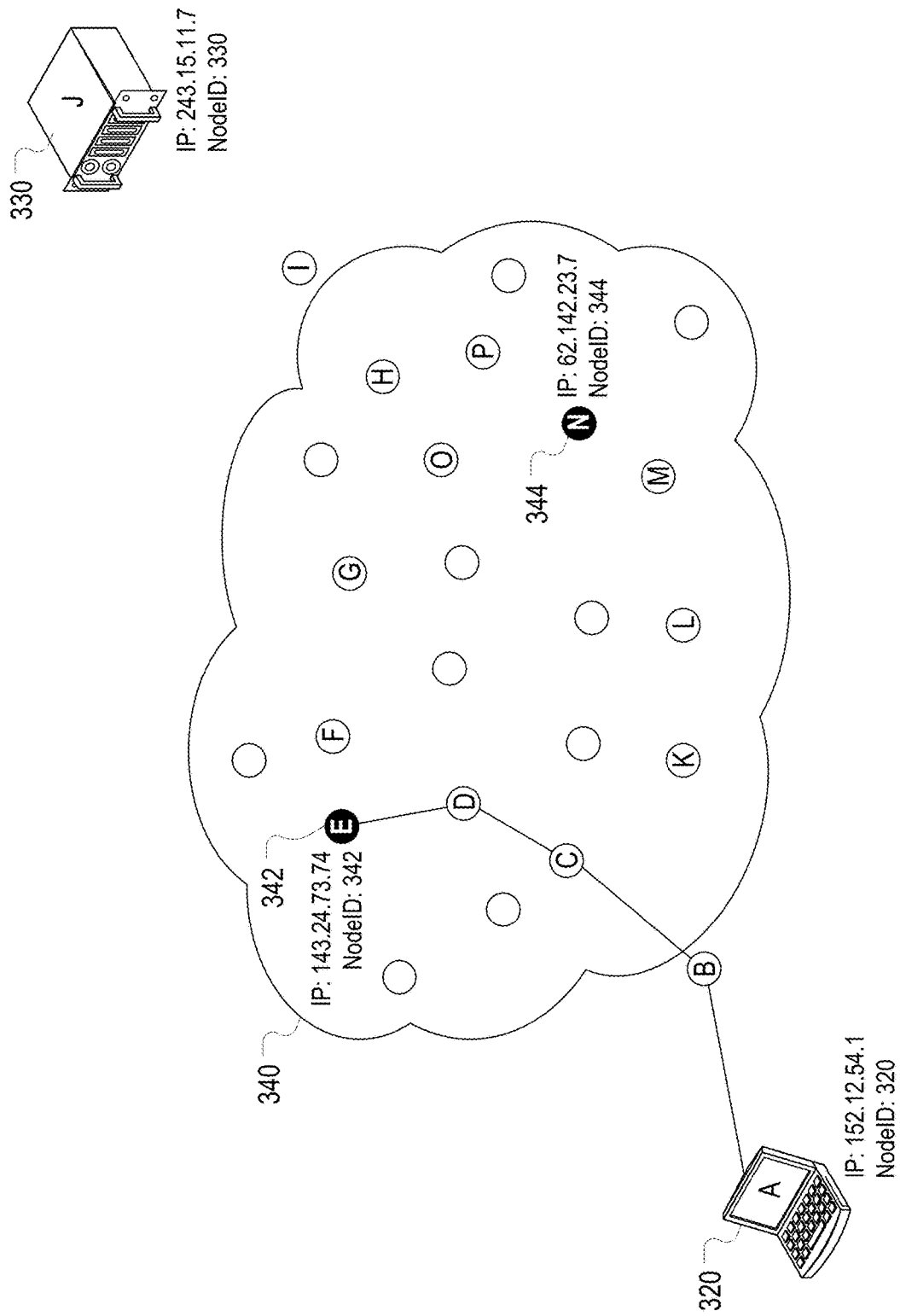
FIG. 21 schematically shows the communication of the IP Packet of FIG. 20 by the first device to prime node "E" for communication to the second device.

Referring to FIGS. 15-21, in communicating the covert message "hidden", the first device 320 at node "A" determines that the first symbol to signal is "0" (FIG. 16); and then determines a prime node (in this case node "E" identified by prime node identifier "342") by which to route a packet in order to signal such symbol to the second device 330 (FIG. 17). The first device 320 then prepares a packet to effect routing through the determined prime node, e.g., by setting or updating a prime node identifier field or parameter of the packet to the node identifier for node "E" (FIG. 18). The first device 320 also updates a destination IP address field of the IP header of the packet to identify an IP address of the determined prime node (in this case the node "E") based on routing information received or maintained at the first device 320 (FIG. 19). The resulting IP packet is illustrated in FIG. 20. This IP packet is then communicated by the first device 320 for communication to the second device 330 via prime node "E", as illustrated in FIG. 21.

Figure 22:
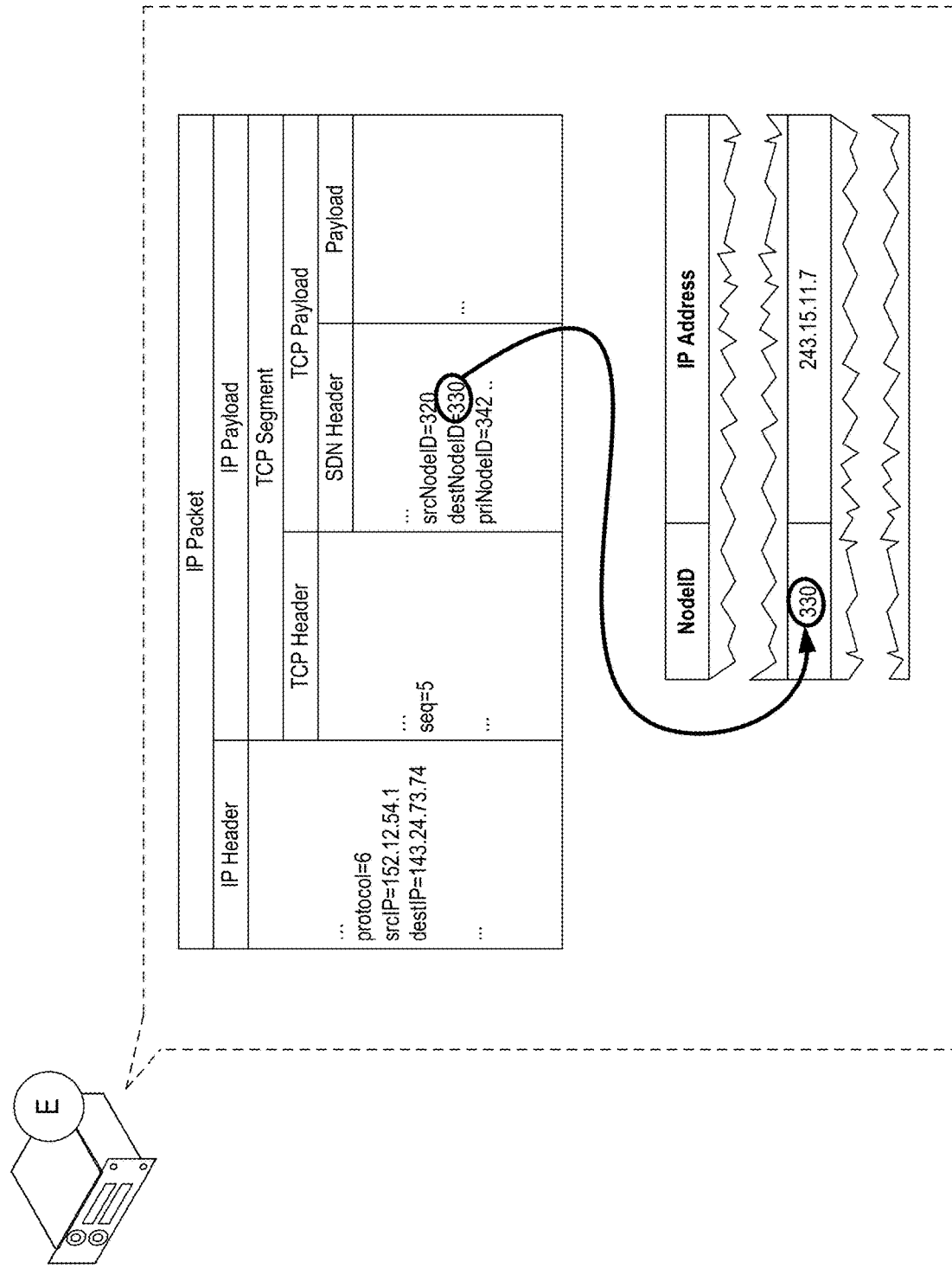
FIG. 22 schematically shows the determining by the device at node "E" of an IP Address for the destination node identifier indicating the ultimate or final destination of the packet, which in this case is "330" corresponding to the second device.
Figure 23:
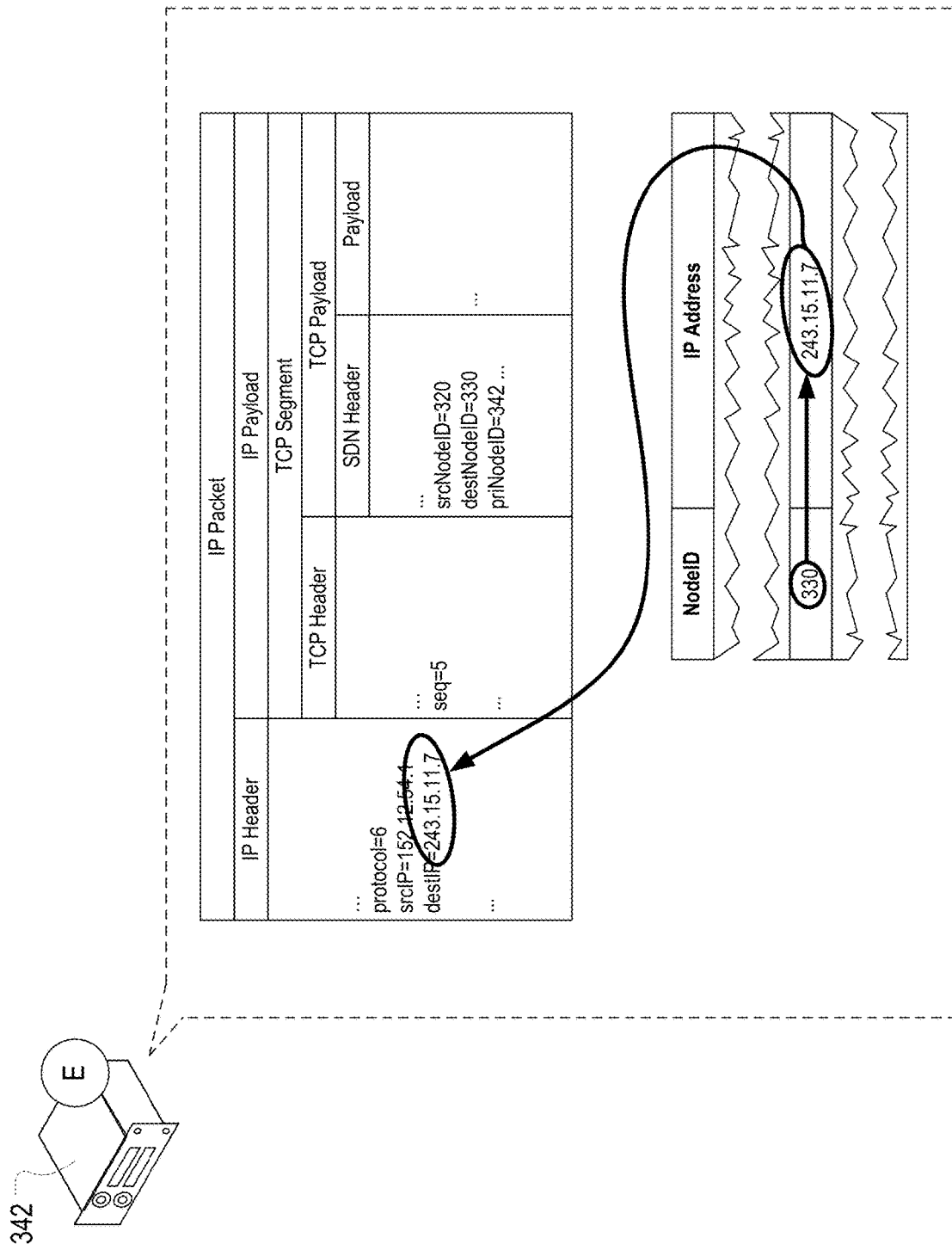
FIG. 23 schematically shows the setting by the device at node "E" of the determined IP Address as the destIP in the IP Header in an IP Packet.
Figure 25:
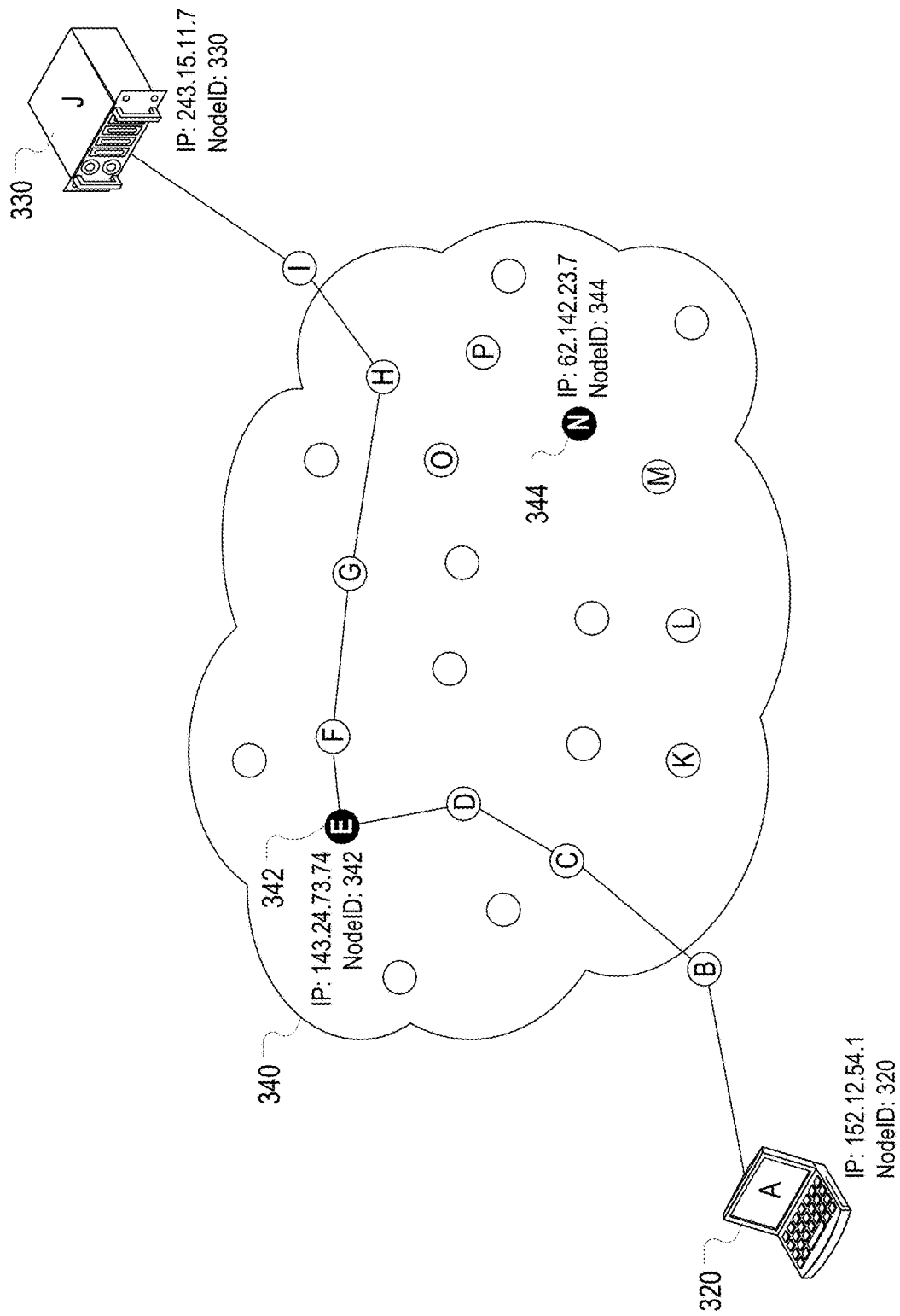
FIG. 25 schematically illustrates communication of the IP Packet of FIG. 24 from node "E" to the second device at node "J".

At the prime node "E", the packet is parsed to determine a destination node identifier indicating the ultimate or final destination of the packet, which in this case is "330" corresponding to the second device 330. As illustrated in FIG. 22, this destination node identifier is found by the device of node "E" in the IP packet payload and, specifically, in the TCP payload portion of the IP packet. This destination node identifier is used to look up, based on received or maintained routing information at node "E", an IP address for the determined destination node. The device at node "E" updates the destination IP address field of the IP header of the packet to identify the IP address of the determined destination, as illustrated in FIG. 23, or alternatively, the device at node "E" constructs a new packet with the data from the received packet. FIG. 24 illustrates the resulting updated or new IP packet. This IP packet then is communicated from the prime node "E" for communication to the second device 330. FIG. 25 illustrates communication of this IP packet from node "E" to the second device 330 at node "J".

Optionally, the "priNodeID" information shown in FIG. 24 may be removed from the new IP packet by the device at node "E", especially if path information is being recorded as shown in FIG. 24. In some preferred embodiments, network watermarks are utilized, by which network watermarks the device of the destination node is able determine whether any prime node, prime combination, or prime sequence was part of the network pathway taken by each received packet.

Figure 26:
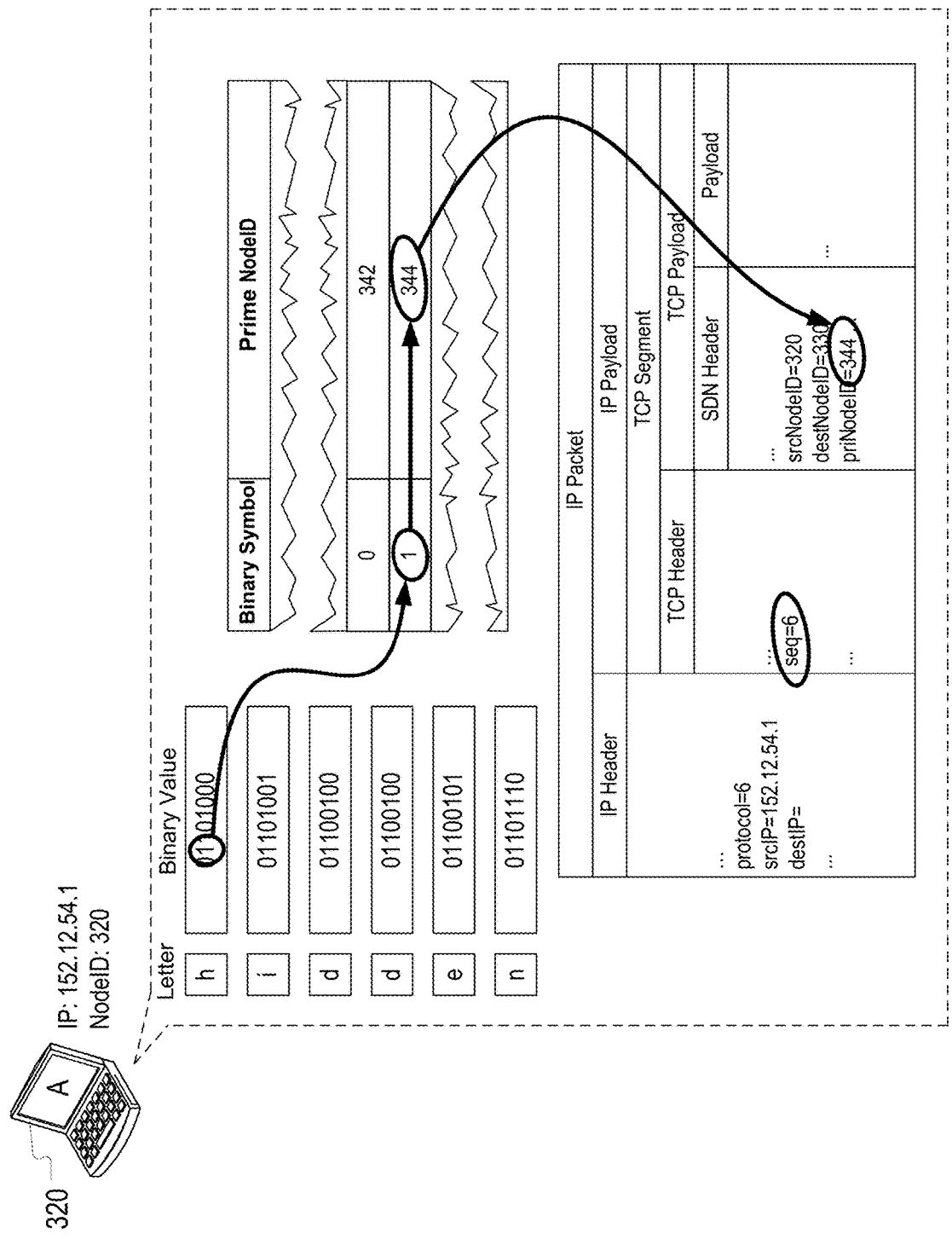
FIG. 26 schematically shows the determining by the first device of the network of FIG. 12 of the second digit in the binary number that maps to the letter "h"; the determining by the first device of a prime node identifier for prime node "N" that represents the binary symbol of the second digit; and the setting of the priNodeID value in a header of a TCP Payload of an IP Packet to the determined prime node identifier that represents the determined symbol.
Figure 27:
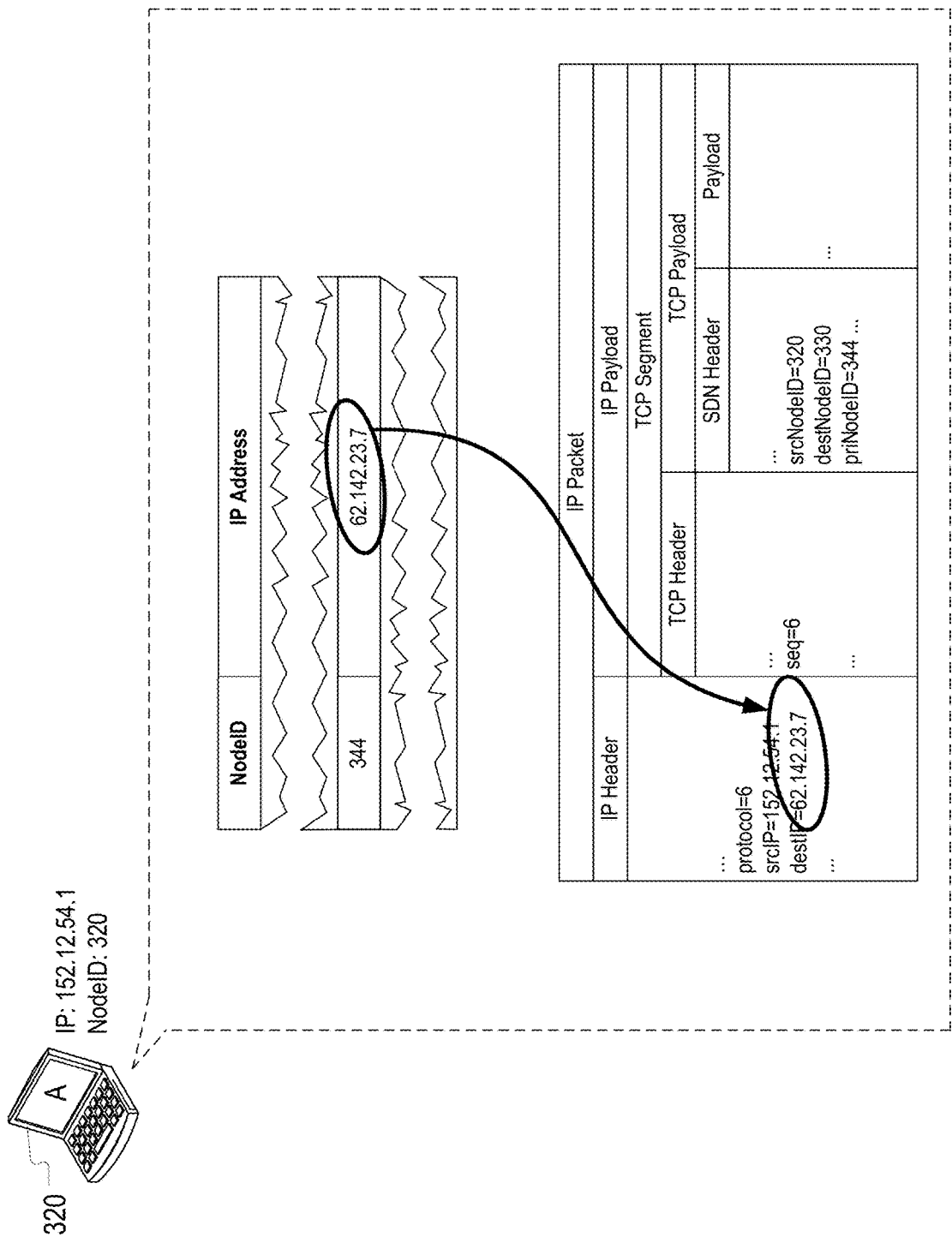
FIG. 27 schematically shows the setting by the first device of the network of FIG. 12 of the destIP value in the IP Header of the IP Packet of FIG. 26 to a determined IP address associated with the determined prime node identifier that represents the determined binary symbol.
Figure 28:
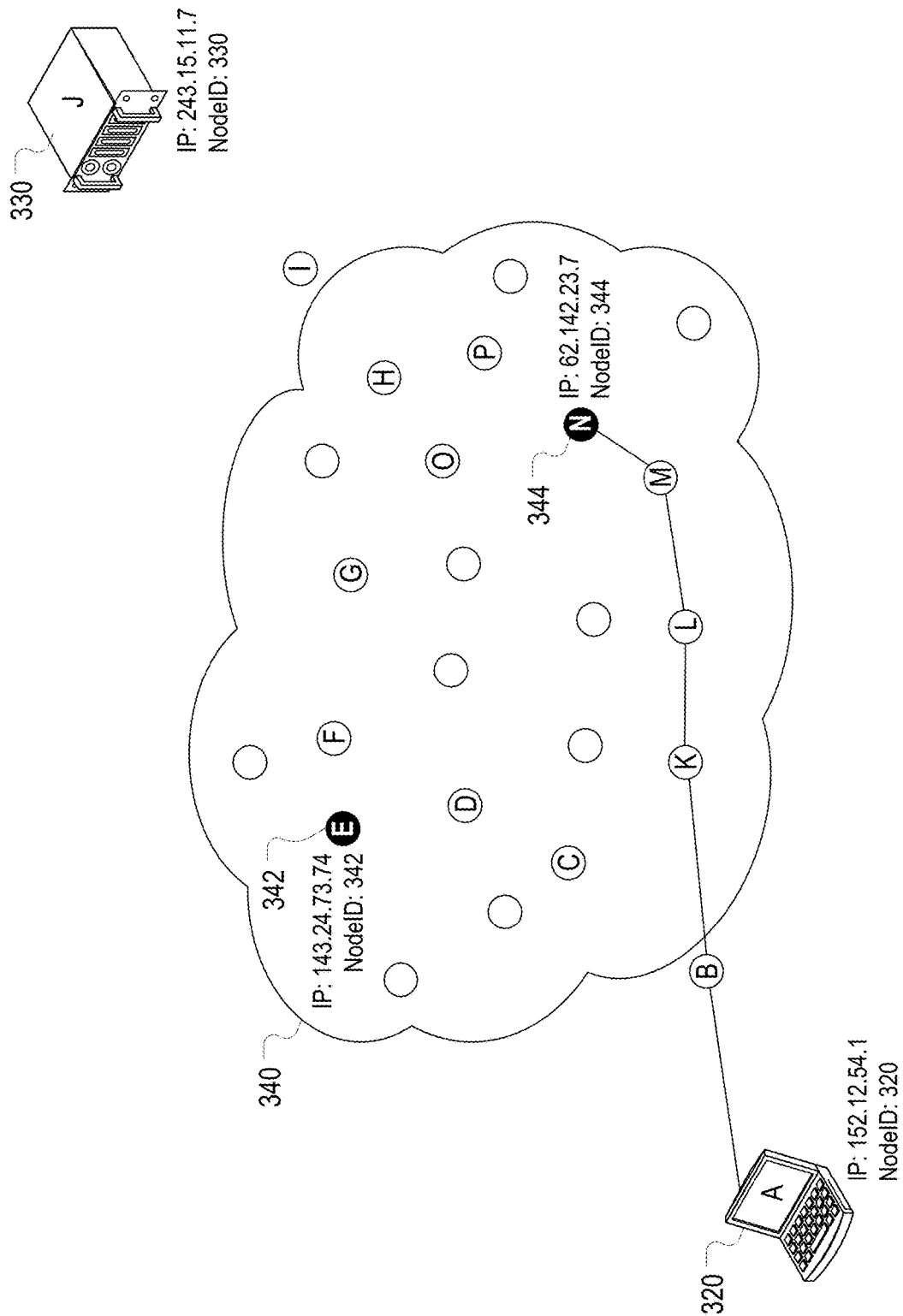
FIG. 28 schematically shows the communication of the IP Packet of FIG. 27 by the first device to prime node "N" for communication to the second device.

The first device 320 continues to transmit the covert message by further signaling symbols as illustrated in FIG. 26. The first device 320 determines that the second symbol to be signaled is "1"; and then determines a prime node (in this case node "N" identified by prime node identifier "344") by which to route a packet in order to signal to the second device 330 the determined symbol. The first device 320 then prepares a packet to effect routing through the determined prime node, e.g., by setting or updating a prime node identifier field or parameter of the packet to the node identifier for node "N". The first device 320 also updates a destination IP address field of the IP header of the packet to identify an IP address of the determined prime node (in this case the node "N") based on routing information received or maintained at the first device 320 (FIG. 27). This IP packet is then communicated by the first device 320 for communication to the second device 330 via prime node "N", as illustrated in FIG. 28.

Figure 29:
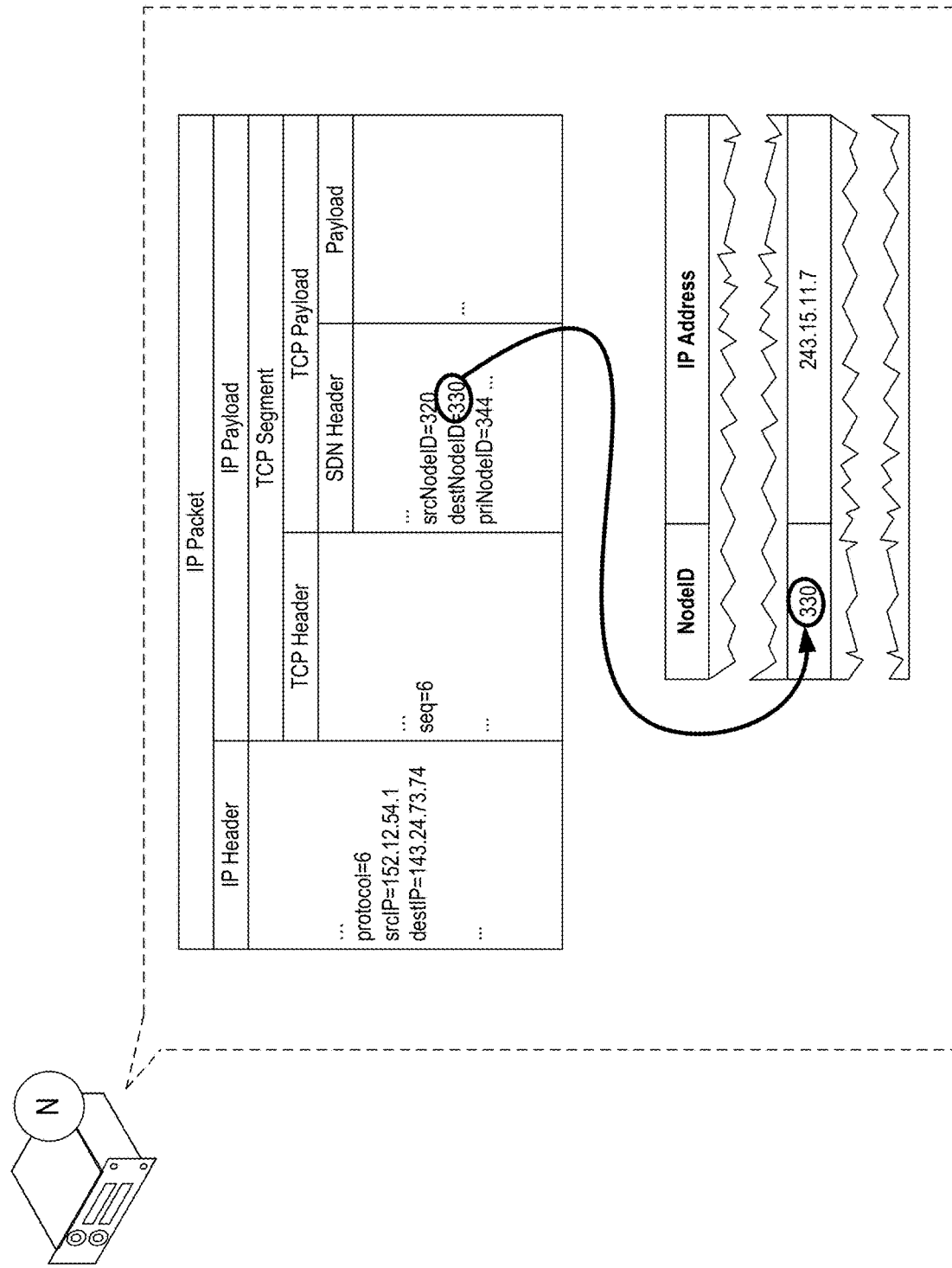
FIG. 29 schematically shows the determining by the device at node "N" of an IP Address for the destination node identifier indicating the ultimate or final destination of the packet, which in this case is "330" corresponding to the second device.
Figure 30:
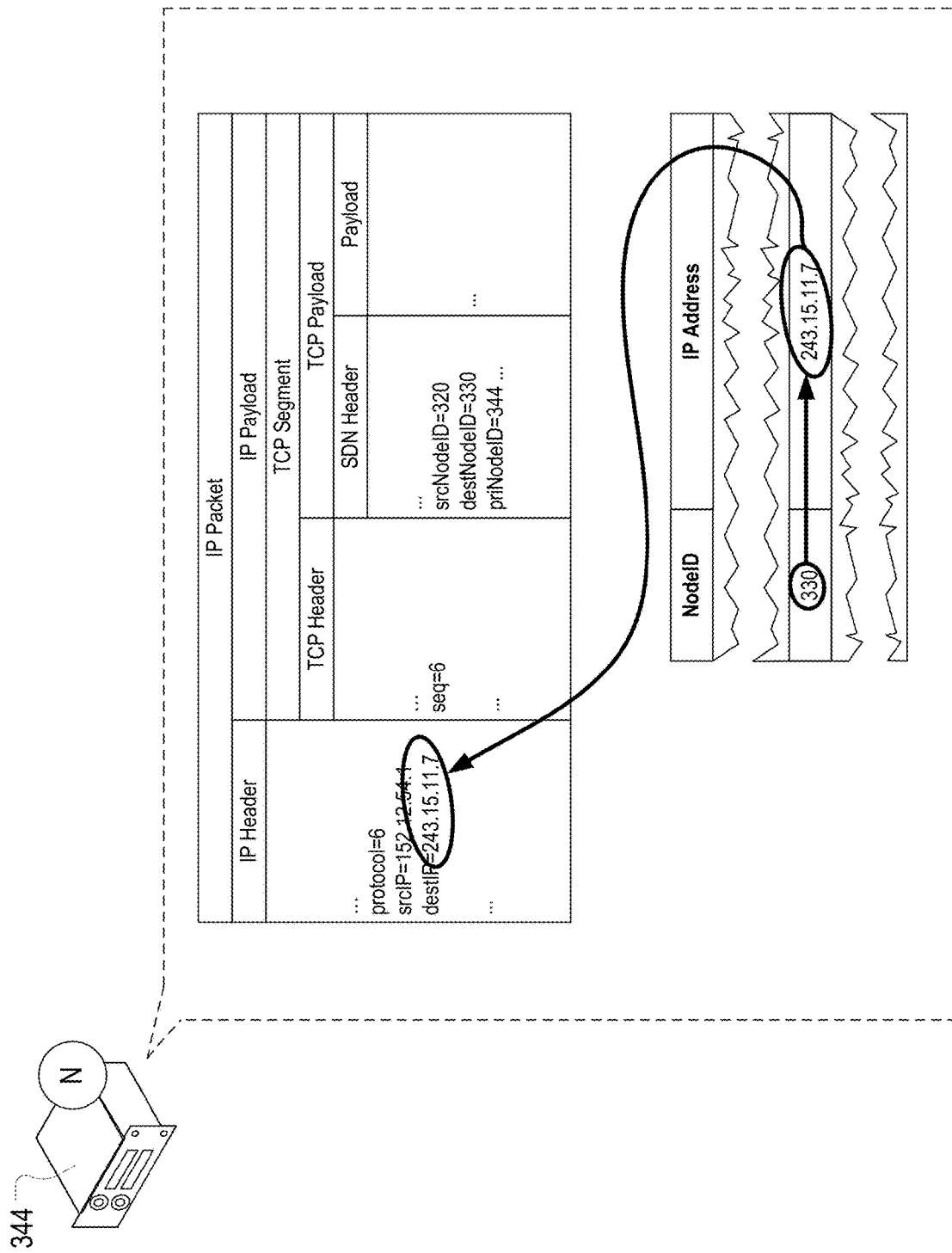
FIG. 30 schematically shows the setting by the device at node "N" of the determined IP Address as the destIP in the IP Header in an IP Packet.

At the prime node "N", the packet is parsed to determine a destination node identifier indicating the ultimate or final destination of the packet, which in this case is "330" corresponding to the second device 330. As illustrated in FIG. 29, this destination node identifier is found by the device of node "N" in the IP packet payload and, specifically, in the TCP payload portion of the IP packet. This destination node identifier is used to look up, based on received or maintained routing information at node "N", an IP address for the determined destination node. The device at node "N" updates the destination IP address field of the IP header of the packet to identify the IP address of the determined destination, as illustrated in FIG. 30, or alternatively, the device at node "N" constructs a new packet with the data from the received packet. FIG. 31 illustrates the resulting updated or new IP packet. This IP packet then is communicated from the prime node "N" for communication to the second device 330.

Optionally, the "priNodeID" information shown in FIG. 31 may be removed from the IP packet by the device at node "N", especially if path information is being recorded as shown in FIG. 31. In some preferred embodiments, network watermarks are utilized, by which network watermarks the device of the destination node is able determine whether any prime node, prime combination, or prime sequence was part of the network pathway taken by each received packet.

The first device continues to transmit the covert message by determining the sequential symbols to be signaled, and the prime nodes through which to route sequential packets corresponding to the determined symbols. For each symbol, the first device creates or updates a packet to effect routing through the respective determined prime node. Each respective IP packet then is communicated by the first device for communication of a payload encapsulated in the packet to the second device by way of the identified prime node.

In accordance with one or more preferred implementations, a device configured to function as a prime node is also configured to append to a packet path information in the form of an identification that the packet passed through the prime node, e.g., is configured to append an identifier associated with itself within the packet. Again, this may be and preferably is accomplished through use of a network watermark in many implementations. Returning to the previous example, the node "E" and the node "N" are each configured to append path information to packets routed through them as primes, as can be seen in FIGS. 24 and 31, each of which illustrates that a node identifier for the respective prime node has been appended to the value in a path field of a header contained in the TCP payload of the respective packet. In accordance with one or more preferred implementations, this path information in the form of appended node identifiers in a packet received at the second device is used by the second device to determine the symbol signaled by that packet. Alternatively, the node identifier of a prime node in the packet is used, if present, in the packet that is received by the second device at the destination node. Examples of this are illustrated next.

Figure 32:
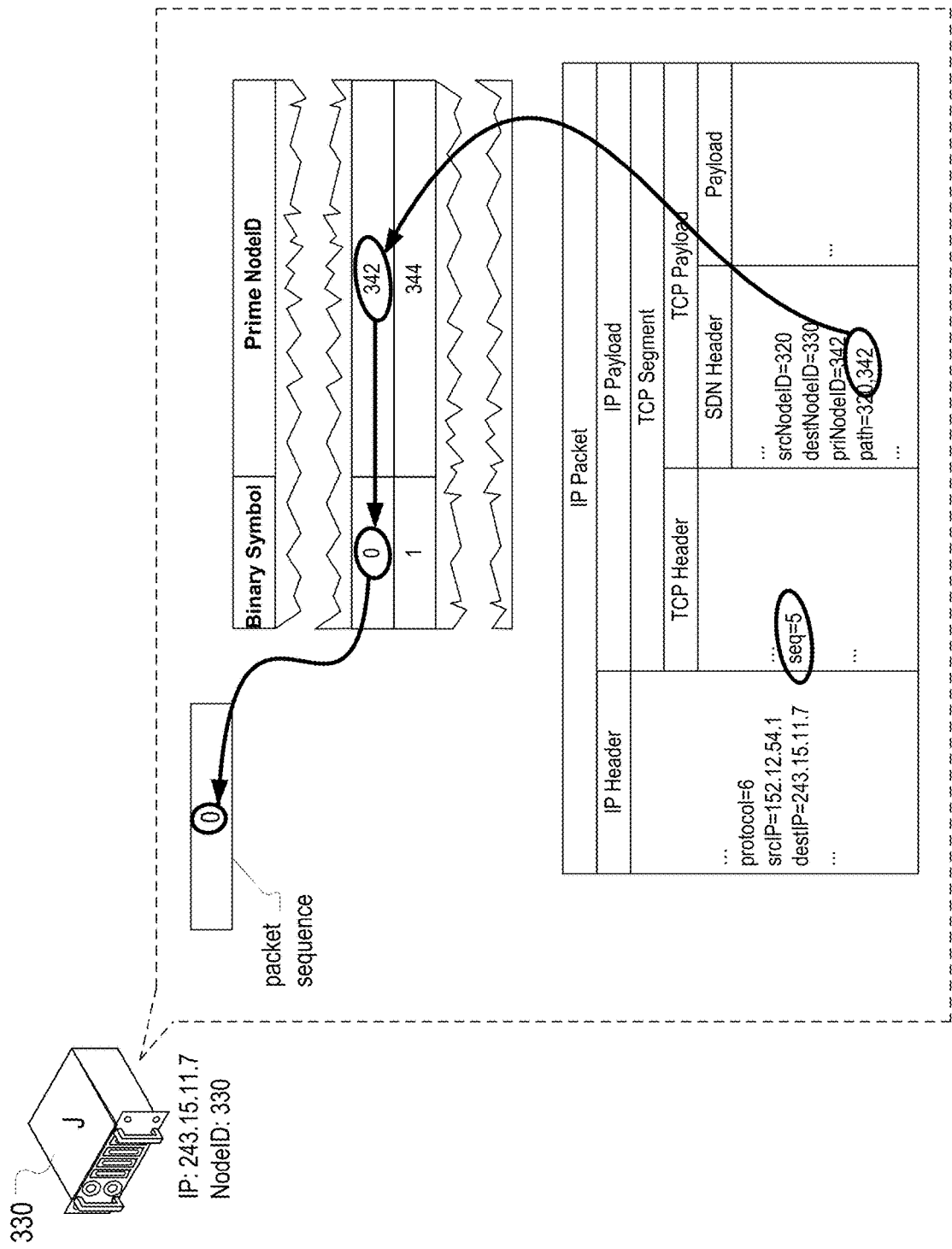
FIG. 32 schematically shows the reading of the binary symbol signaled by an IP Packet that is received and the position thereof in the packet sequence.

Referring to FIG. 32, the second device 330 receives the IP packet having a sequence number of "5" and utilizes the path information or the prime node identifier, if present, to determine that the packet was routed through node "E" as a prime node, and uses stored or received information regarding covert communications to lookup a symbol associated with packets communicated through said prime node. Thus, the symbols of "0" is determined to be in the "fifth" position of the packet sequence.

Figure 33:
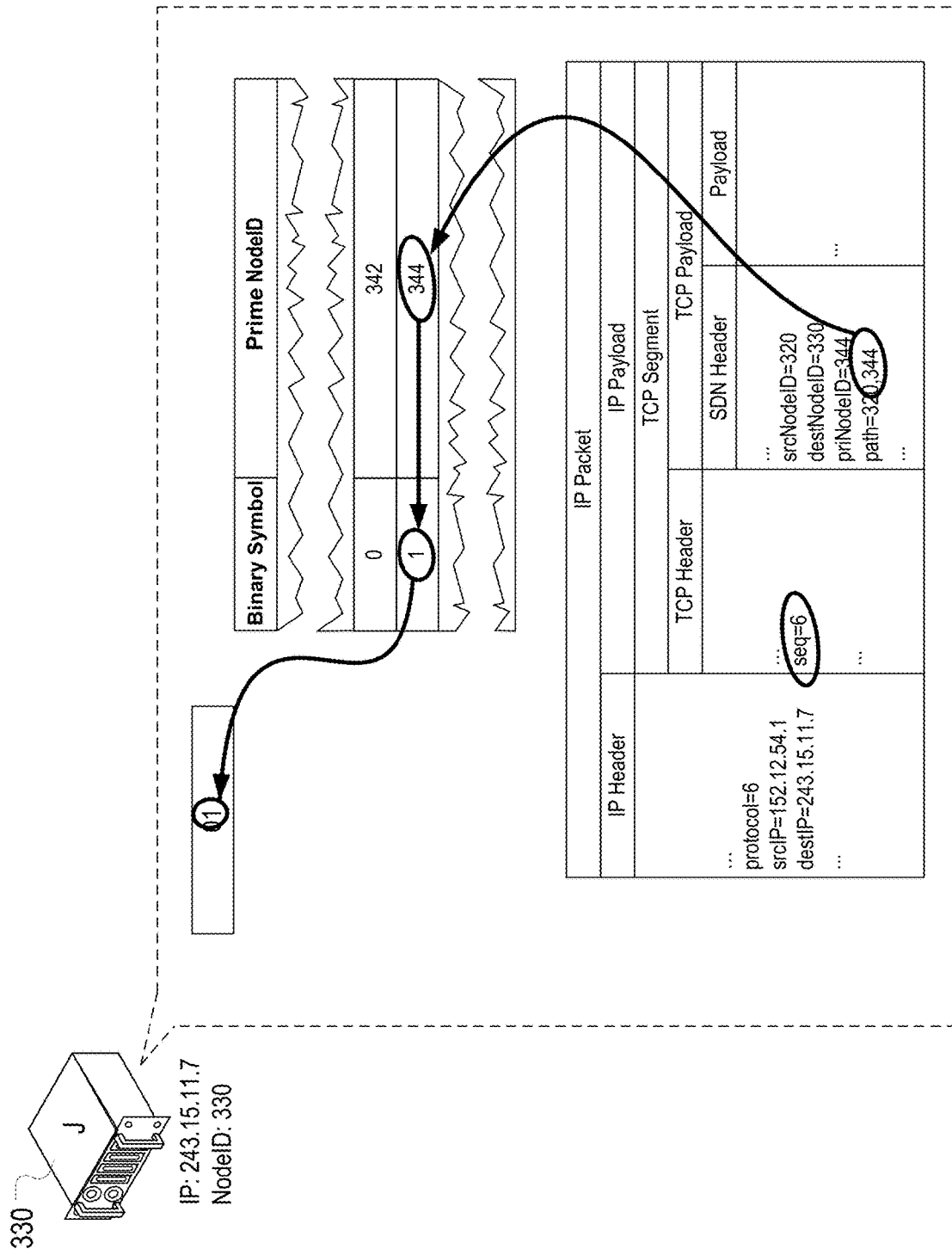
FIG. 33 schematically shows the reading of the binary symbol signaled by an IP Packet that is received and the position thereof in the packet sequence.

Referring to FIG. 33, when the second device 330 receives the IP packet having a sequence number of "6", the second device 330 utilizes the path information or the prime node identifier, if present, to determine that the packet was routed through node "N" as a prime node, and uses stored or received information regarding covert communications to lookup a symbol associated with packets communicated through said prime node. Thus, the symbol of "1" is determined to be in the "sixth" position of the packet sequence.

Figure 34:
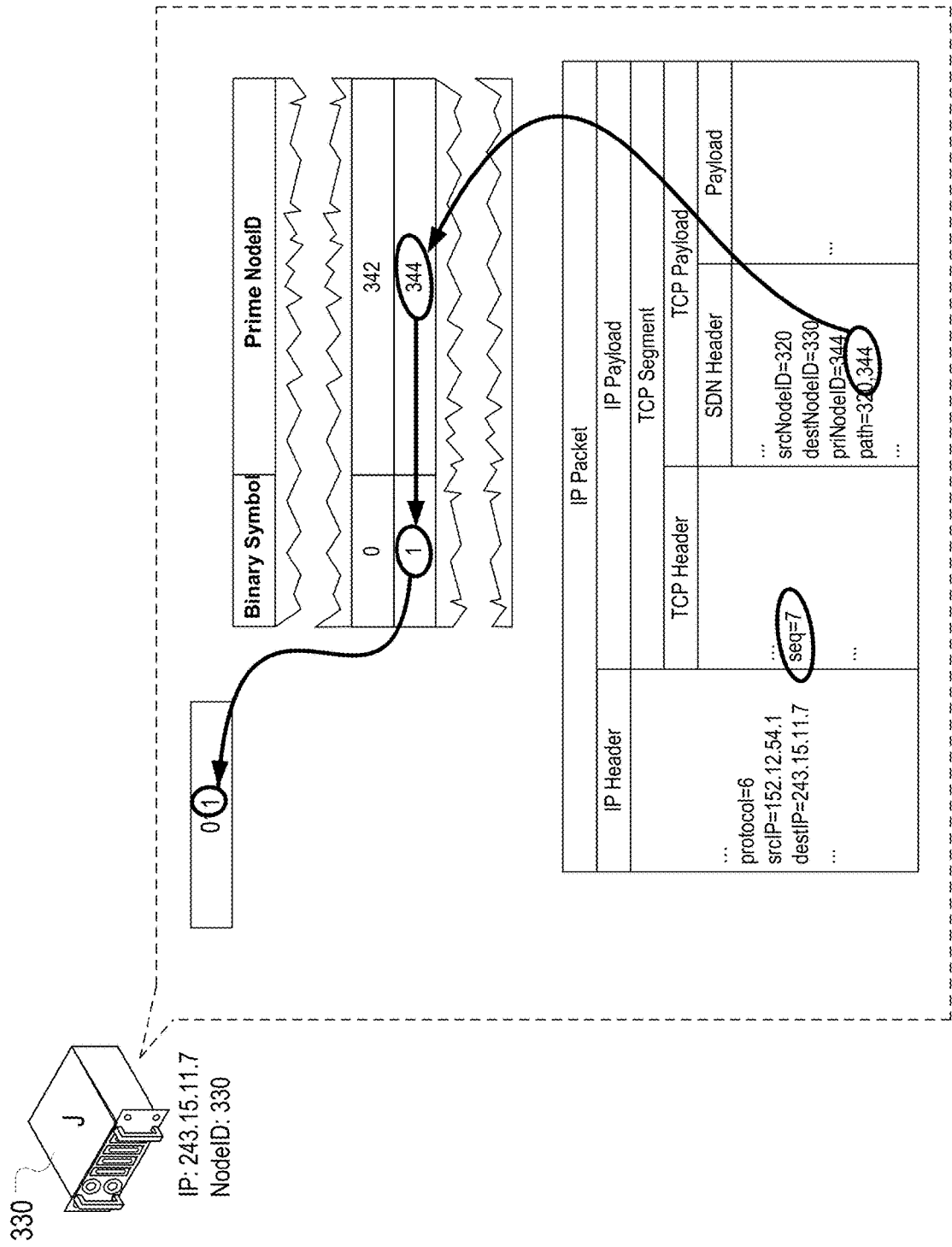
FIG. 34 schematically shows the reading of the binary symbol signaled by an IP Packet that is received and the position thereof in the packet sequence.

Referring to FIG. 34, when the second device 330 receives the IP packet having a sequence number of "7", the second device 330 utilizes the path information or the prime node identifier, if present, to determine that the packet was routed through node "N" as a prime node, and uses stored or received information regarding covert communications to lookup a symbol associated with packets communicated through said prime node. Thus, the symbol of "1" is determined to be in the "seventh" position of the packet sequence.

Figure 35:
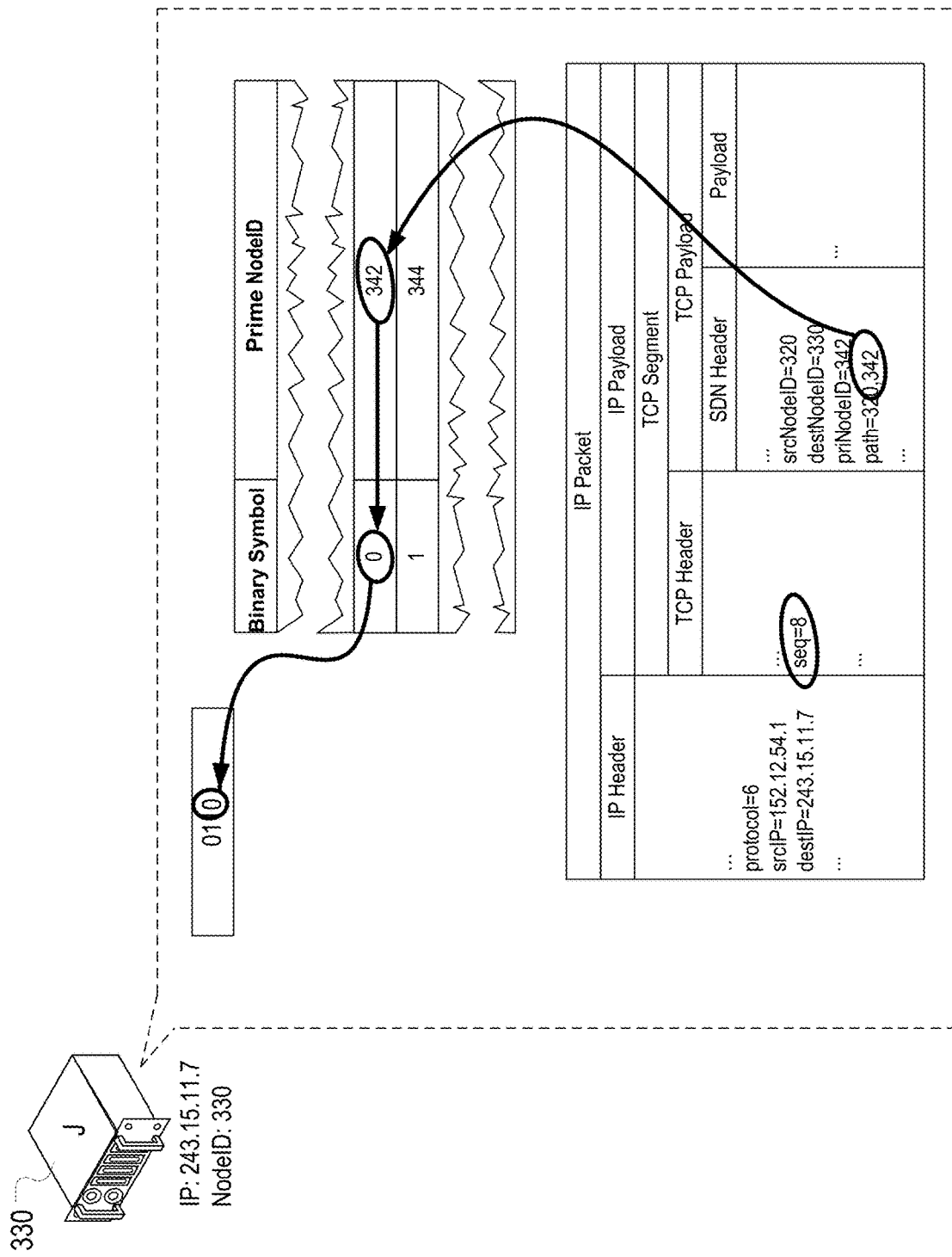
FIG. 35 schematically shows the reading of the binary symbol signaled by an IP Packet that is received and the position thereof in the packet sequence.

Referring to FIG. 35, when the second device 330 receives the IP packet having a sequence number of "8", the second device 330 utilizes the path information or the prime node identifier, if present, to determine that the packet was routed through node "E" as a prime node, and uses stored or received information regarding covert communications to lookup a symbol associated with packets communicated through said prime node. Thus, the symbol of "0" is determined to be in the "eighth" position of the packet sequence.

Figure 36:
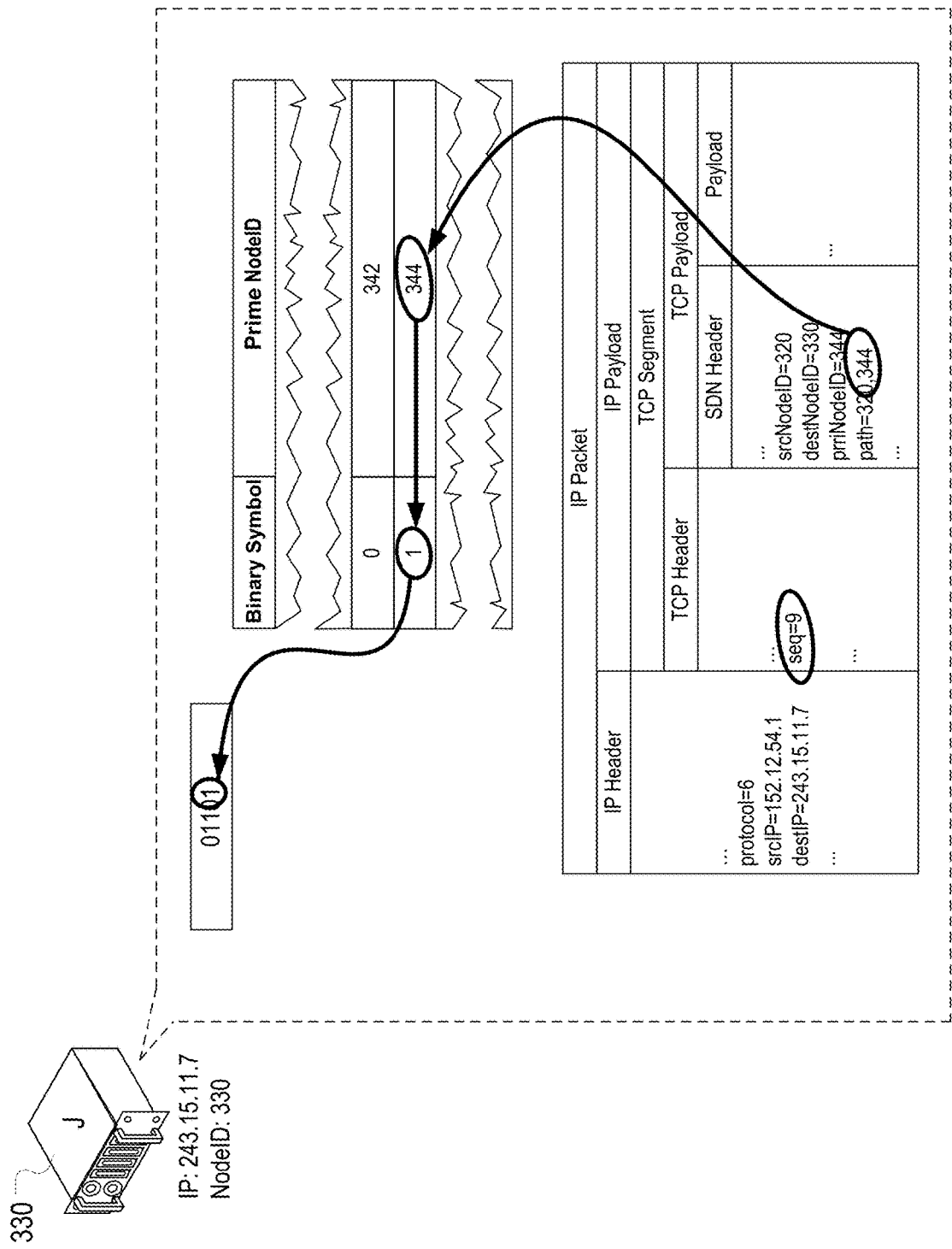
FIG. 36 schematically shows the reading of the binary symbol signaled by an IP Packet that is received and the position thereof in the packet sequence.

Referring to FIG. 36, when the second device 330 receives the IP packet having a sequence number of "9", the second device 330 utilizes the path information or the prime node identifier, if present, to determine that the packet was routed through node "N" as a prime node, and uses stored or received information regarding covert communications to lookup a symbol associated with packets communicated through said prime node. Thus, the symbol of "1" is determined to be in the "ninth" position of the packet sequence.

Figure 37:
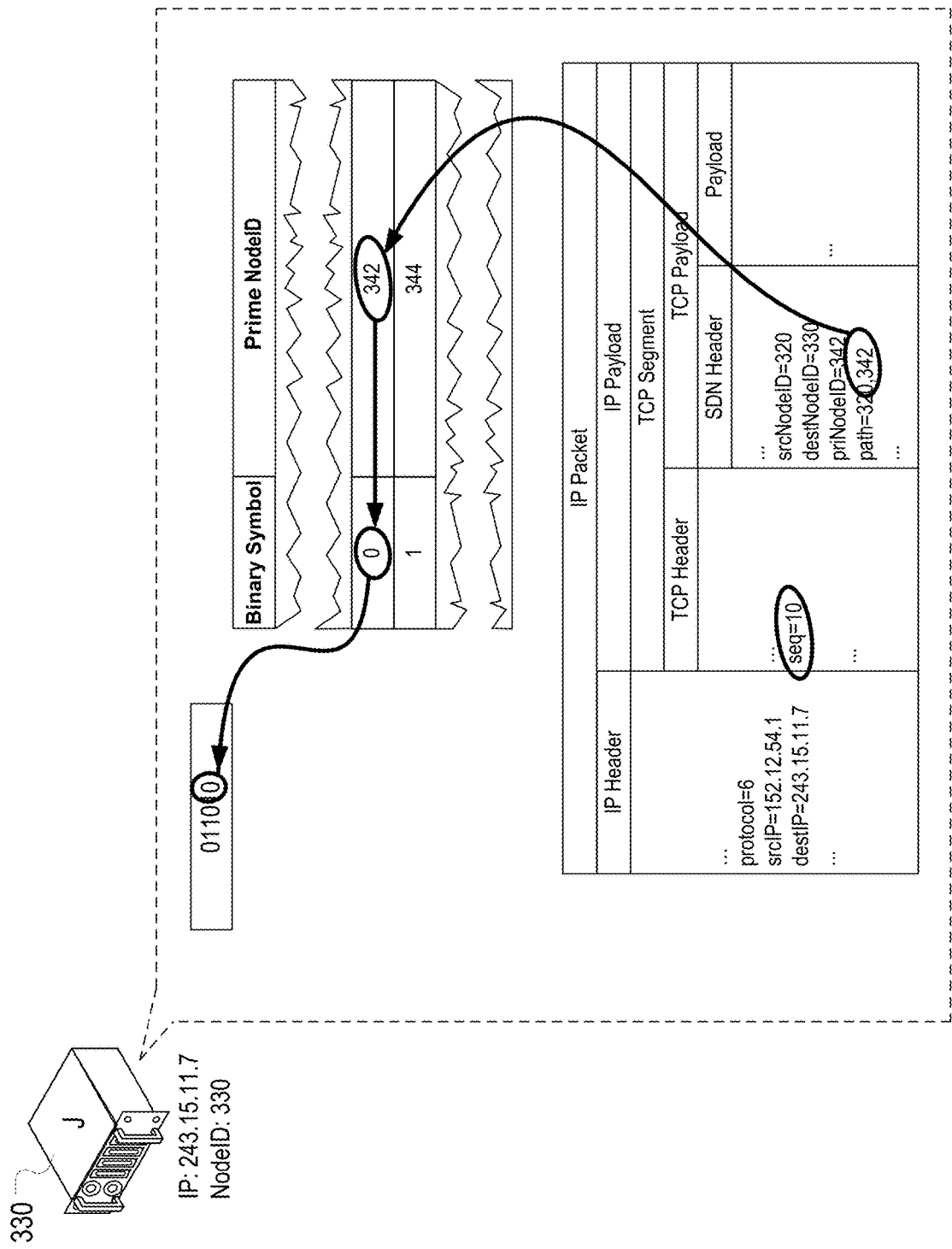
FIG. 37 schematically shows the reading of the binary symbol signaled by an IP Packet that is received and the position thereof in the packet sequence.

Referring to FIG. 37, when the second device 330 receives the IP packet having a sequence number of "10", the second device 330 utilizes the path information or the prime node identifier, if present, to determine that the packet was routed through node "E" as a prime node, and uses stored or received information regarding covert communications to lookup a symbol associated with packets communicated through said prime node. Thus, the symbol of "0" is determined to be in the "tenth" position of the packet sequence.

Figure 38:
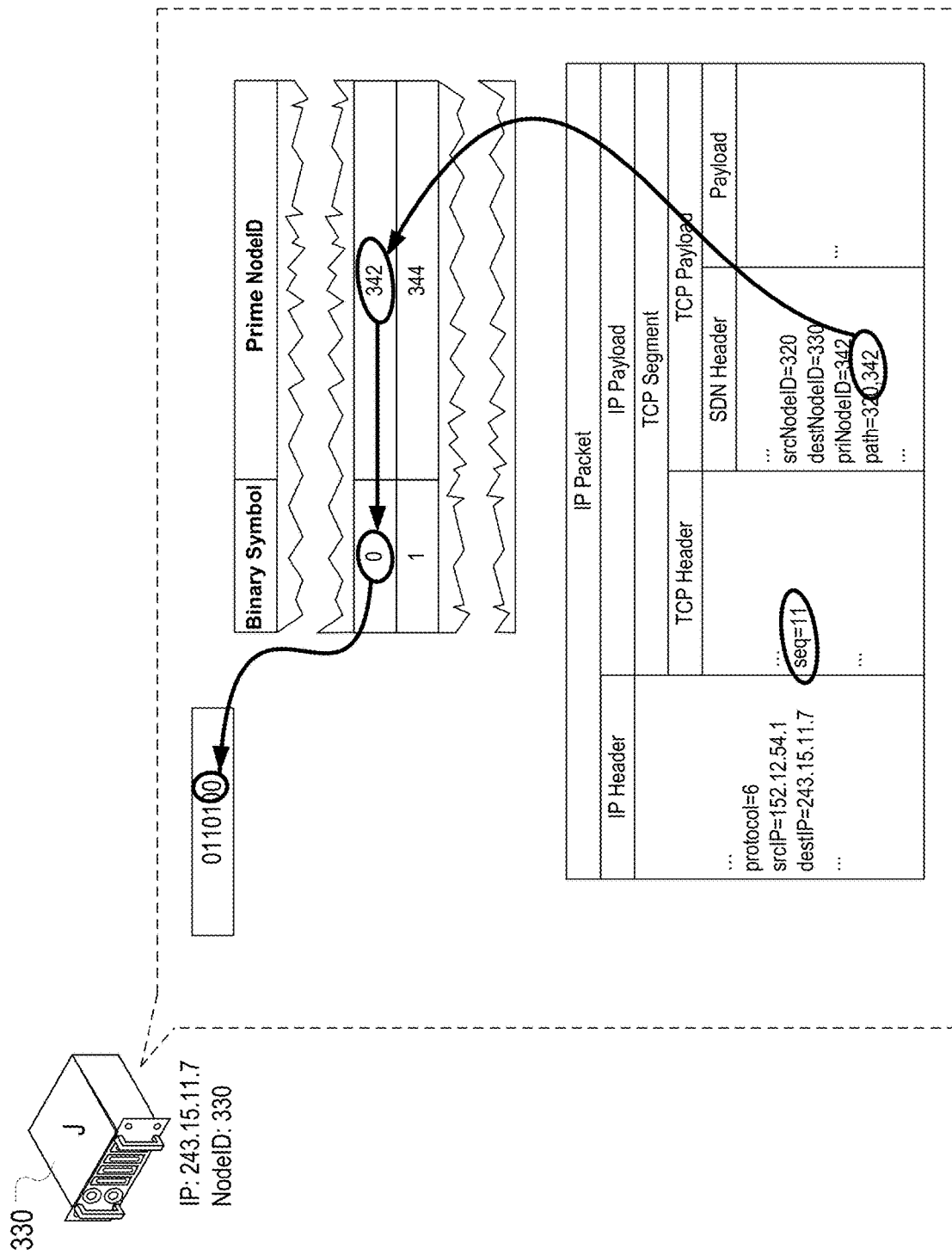
FIG. 38 schematically shows the reading of the binary symbol signaled by an IP Packet that is received and the position thereof in the packet sequence FIG. 39 schematically shows the reading of the binary symbol signaled by an IP Packet that is received and the position thereof in the packet sequence.

Referring to FIG. 38, when the second device 330 receives the IP packet having a sequence number of "11", the second device 330 utilizes the path information or the prime node identifier, if present, to determine that the packet was routed through node "E" as a prime node, and uses stored or received information regarding covert communications to lookup a symbol associated with packets communicated through said prime node. Thus, the symbol of "0" is determined to be in the "eleventh" position of the packet sequence.

Figure 39:
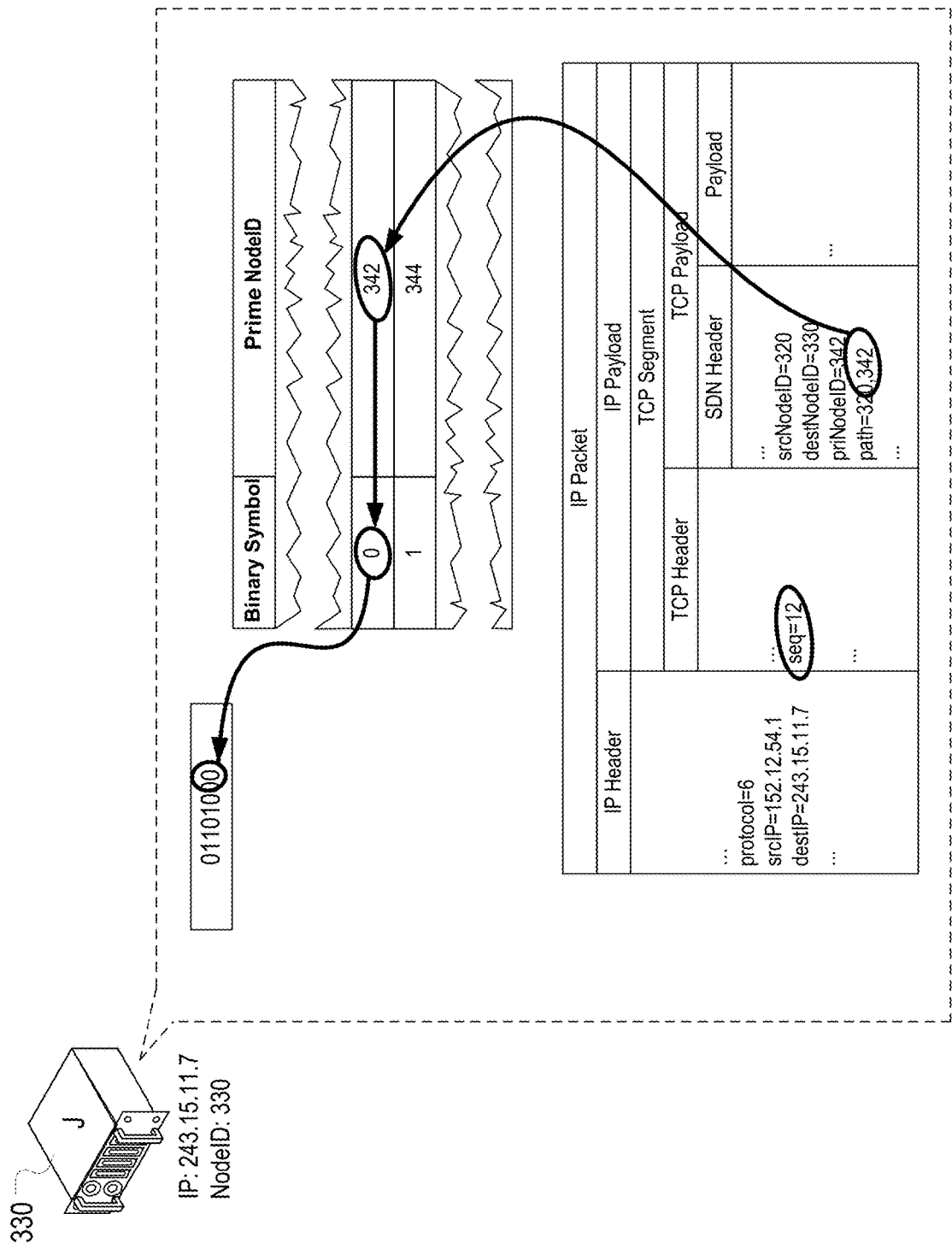

Referring to FIG. 39, when the second device 330 receives the IP packet having a sequence number of "12", the second device 330 utilizes the path information or the prime node identifier, if present, to determine that the packet was routed through node "E" as a prime node, and uses stored or received information regarding covert communications to lookup a symbol associated with packets communicated through said prime node. Thus, the symbol of "0" is determined to be in the "twelfth" position of the packet sequence.

When the destination device 330 receives the IP packet having a sequence number of "12", the second device 330 utilizes the path information or the prime node identifier (if present) to determine that the packet was routed through node 342 as a prime node, and uses stored or received information regarding covert communications to lookup a binary symbol associated with packets communicated through said prime node, as illustrated in FIG. 39.

It will be appreciated as well that these communicated sequential packets illustrated in FIGS. 32-39 have sequence numbers offset by a value of "4", whereby the first communicated sequential packet has as sequence position of "5" and the last communicated sequential packet has as sequence position of "12". Any offset may be used in the particular communication protocol established beforehand between the first device 320 and the second device 330.

FIG. 40 illustrates exemplary pseudocode for adding data representing a covert message to a packet stream. This involves filling a bit array based on converting the covert message to bits, and then, for each packet in the packet stream, setting a prime node identifier indicating a prime node based on the binary symbol in the array corresponding to that packet's sequential place in the packet stream.

For example, for the first packet in a packet stream, i.e., the packet at the 0th position corresponding to an index value of 0, this would involve determining the binary symbol in the array at the corresponding position, i.e., the 0th position corresponding to an index value of zero, and then using that binary symbol as an index to lookup a node in the prime node array to which to send the packet, and setting a prime node identifier to the node identifier for that node. For the second packet in a packet stream, i.e., the packet at the 1st position corresponding to an index value of one, this would involve determining the binary symbol in the array at the corresponding position, i.e., the 1st position corresponding to an index value of one, and then using that binary symbol as an index to lookup a node in the prime node array to which to send the packet, and setting a prime node identifier to the node identifier for that node. Rather than an array for the prime node array, it will be appreciated that a list or dictionary equivalently could be used, for example.

FIG. 41 illustrates exemplary pseudocode for processing packets before they are sent to determine whether to add data for a covert message. This involves checking for the existence of a covert message that needs to be transmitted to the destination of the packet, and, if so, setting an identifier of a prime node, prime combination, or prime sequence in the packet for signaling one or more symbols for the covert message. In this context, continual communications of no particular significance could be established in "opening a channel" between the first device and the second device, with transmissions of covert messages being performed only when needed.

Additionally, one or more prime nodes—or the absence of one or more prime nodes—could be used to actually indicate in a data packet that no symbol for a covert message is being signaled by the particular data packet. In this way the second device would be able to precisely identify both data packets signaling a symbol of a covert message and data packets not signaling a symbol of a covert message. For example, as described above with specific reference to FIGS. 32-39, when the second device 330 receives an IP packet, it utilizes the path information to determine a prime node through which packet was routed, and uses stored or received information to lookup a symbol associated with packets communicated through the prime node. If no prime node is identified in a watermark of a packet, then this can indicate to the second device that no symbol is signaled by such packet, and that consequently the packet may be discarded.

Figure 42:
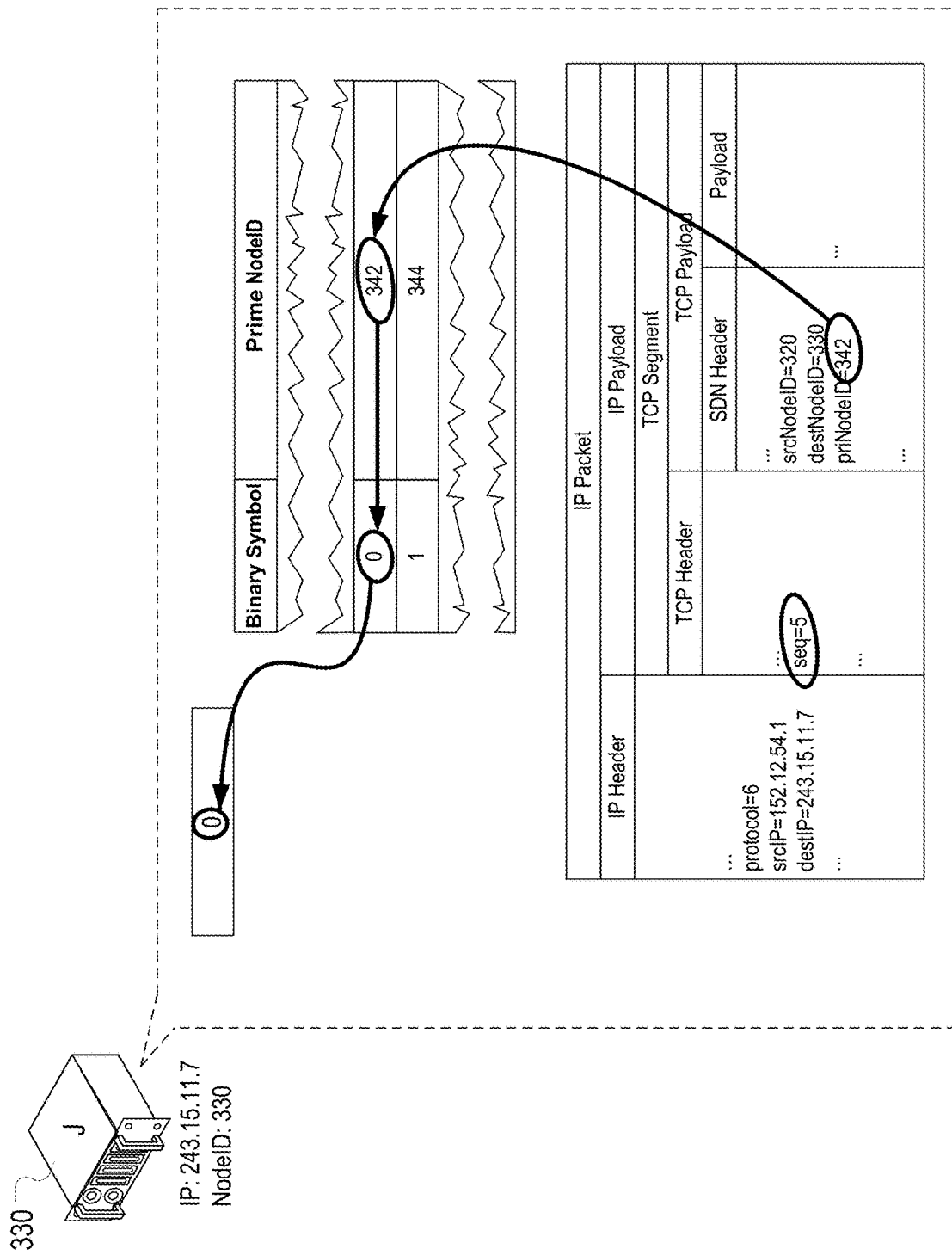
FIG. 42 schematically illustrates use of a prime node identifier in lieu of path information in an IP Packet.

In some preferred implementations, use of a prime node identifier in lieu of path information is utilized (FIG. 42); however, use of path information contained in a network watermark is preferred over including a prime node identifier in the packet data, at least in some implementations, because a network watermark does not identify explicitly that a node, combination, or sequence is prime. The second device must parse the watermark to determine whether part of the network pathway contains a node, combination, or sequence that is prime.

Figure 43:
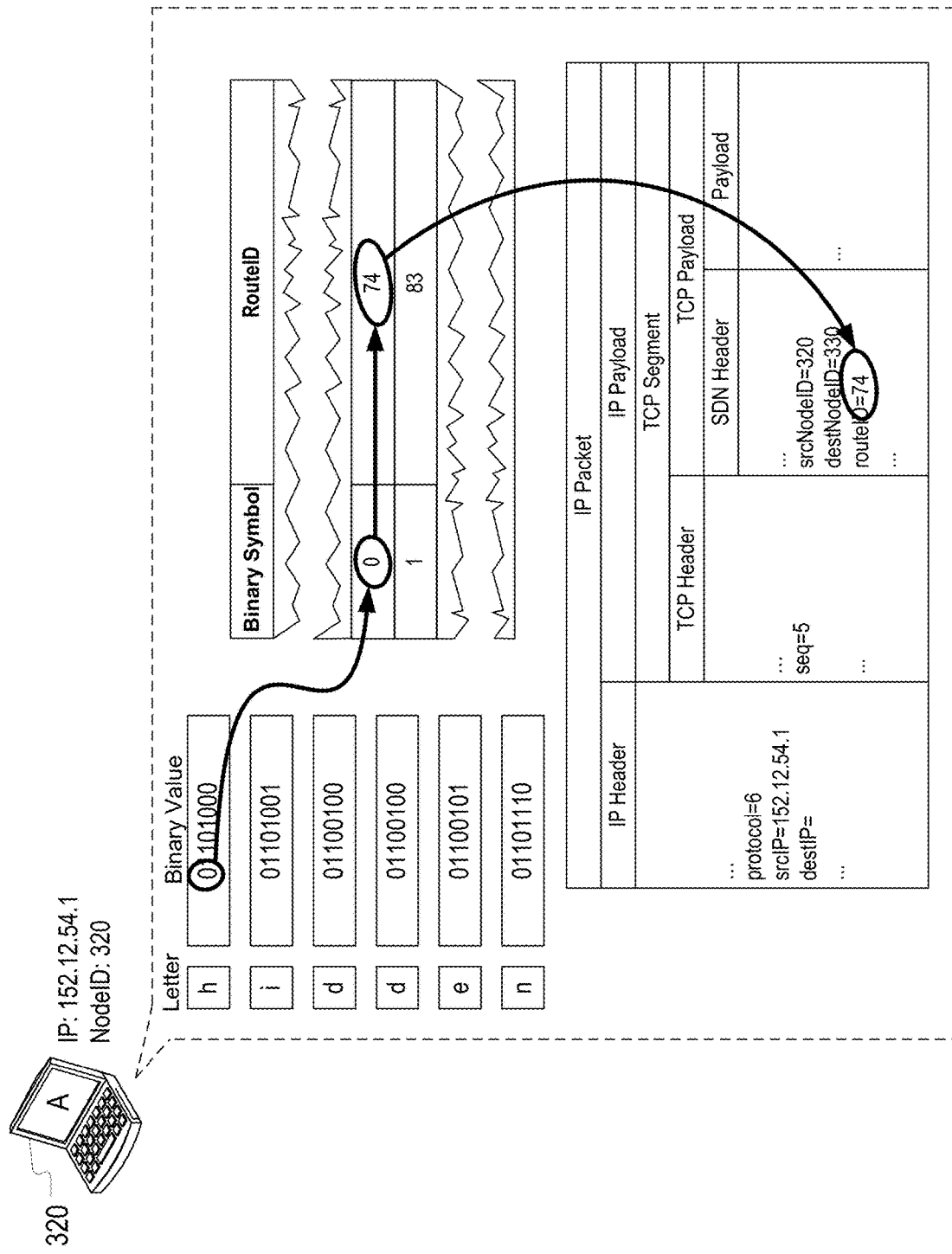
FIG. 43 illustrates use of a route identifier in a packet by the first device located at the origin node "A" for communicating a binary symbol.
Figure 44:
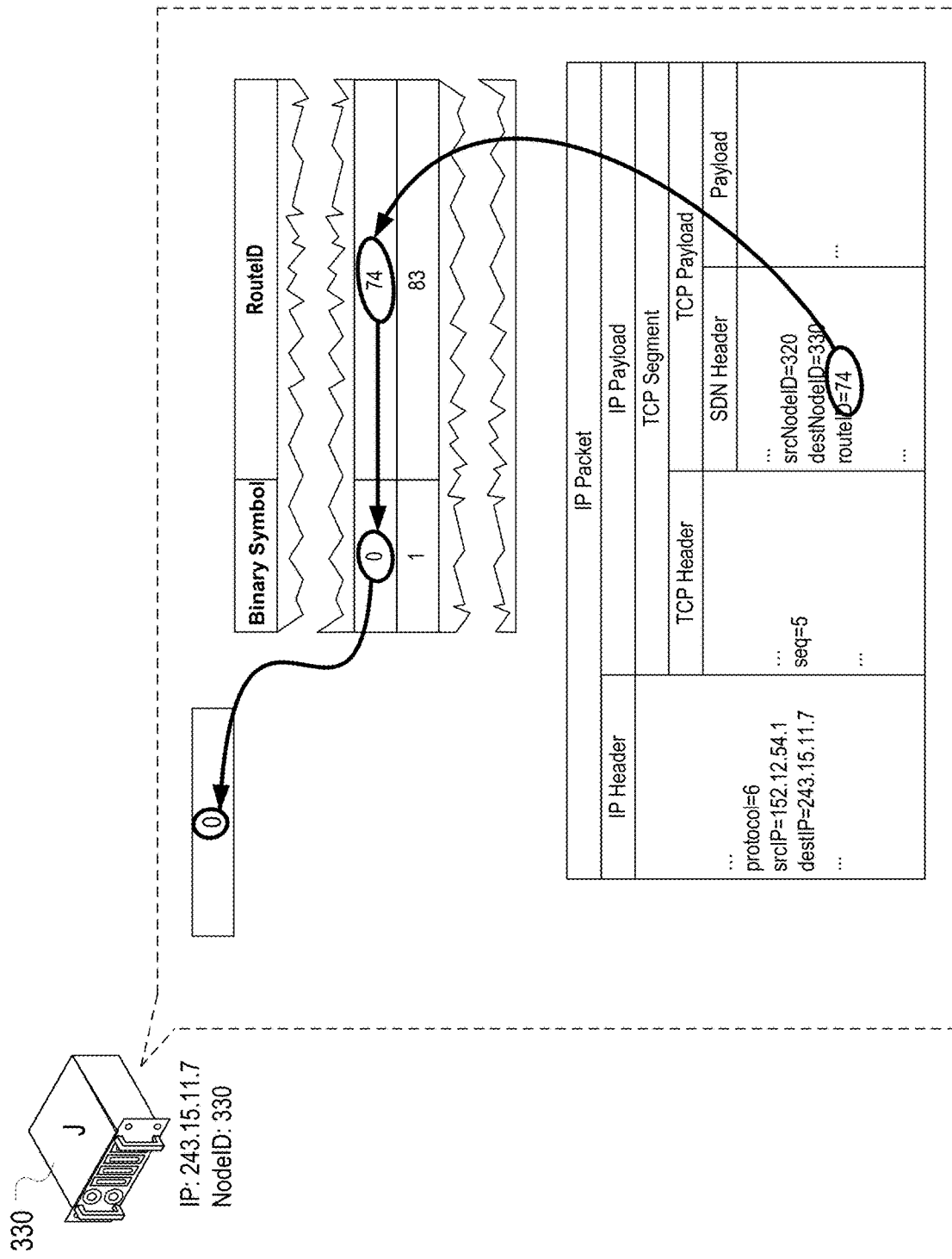
FIG. 44 illustrates use of a route identifier in a packet by the second device located at the destination node "J" to identify a binary symbol for a digit in a binary number.
Figure 45:
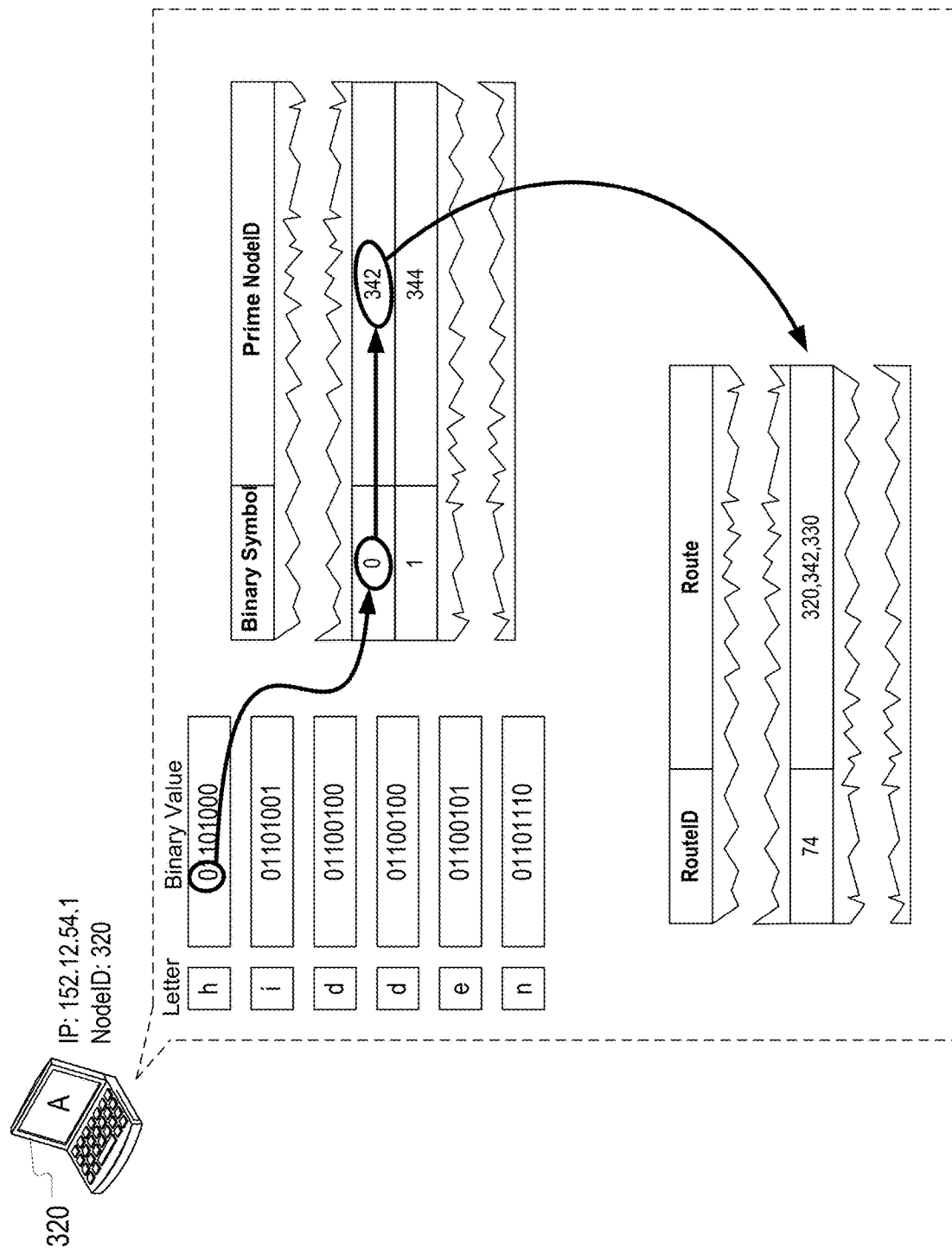
FIG. 45 illustrates use of a prime node in a specified route having a route identifier by the first device located at the origin node "A" for communicating a binary symbol.

In accordance with one or more other preferred implementations, a packet includes a route identifier which is configured to control to a greater extent the network path of the packet. This is preferably accomplished by specifying a route identifier, with one or more intermediate nodes specifically identified for the network pathway by the route identifier. In such implementations, a first device selects a route identifier for a packet, which route identifier, path information, or watermark contained in a received packet then indicates to the second device one or more specific symbols for a covert message. Such use of a route identifier in a packet is illustrated in FIGS. 43 and 44. In similar manner, the use of a prime node in a specified route having a route identifier is illustrated in FIG. 45

Figure 46:
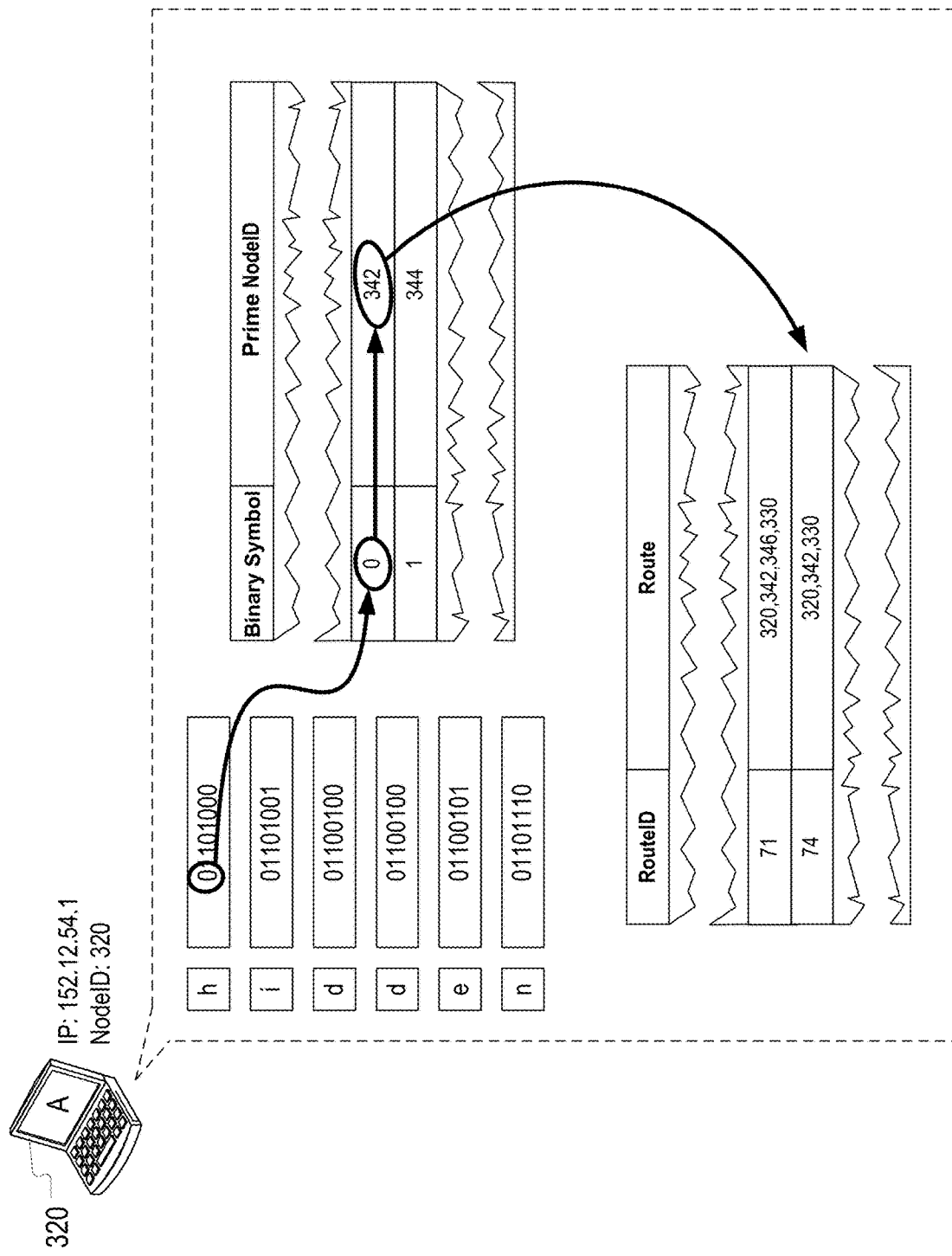
FIG. 46 illustrates use of multiple routes that include the same prime node, whereby optional routes are available for signaling the same binary symbol.

In accordance with one or more preferred implementations, a first device has stored route information for multiple routes including the same prime node, whereby optional routes are available for signaling the same symbol. This situation is illustrated in FIG. 46, wherein both routes identified respectively by route ID 71 and route ID 74 include prime node "E" identified by node identifier "342" in the pathway. Preferably, software at the first device automatically selects a shortest route, a route with the lowest latency, a route with the best network characteristics, or a route with the lowest packet loss from the available routes for signaling the same symbol. In other preferred implementations, in such a situation software at the first device randomly selects one of the alternative routes for each packet that is transmitted. Whatever protocol is utilized may be done on a message-by-message basis or on a session-by-session basis, for example.

FIGS. 47 and 48 provide exemplary pseudocode for randomly selecting a route to utilize to signal the same symbol, and then utilizing that particular route for all packets in a communication stream signaling that symbol. In this respect, FIG. 47 illustrates exemplary pseudocode for randomly selecting a particular route from among identified alternative route candidates containing a particular prime node; and FIG. 48 illustrates exemplary pseudocode for adding a symbol to the packet stream, which involves, for each packet in a packet stream, setting a node identifier indicating a prime node based on the symbol in the bit array corresponding to that packet's sequential place in the packet stream. Again, in a binary system, the symbols are "0" and "1".

FIGS. 49 and 50 provide exemplary pseudocode for communication of a covert message that involves, for each packet in a packet stream for which multiple possible routes are available to signal a desired binary symbol, randomly selecting a respective particular route for that respective packet, such that packets signaling the same binary symbol may utilize different routes.

It will further be appreciated that prime nodes may be part of different networks as well as the first "hop" from the first device, wherein the first device forms an origin node in each network. In an exemplary implementation of this, the origin device may have Internet access via a satellite connection, a cellular data connection, and a cable modem connection for communicating over all three connections with the second device over the Internet. In such scenario, a prime node may be a first node in each of these three different network connections when communicating packets from the first device.

Figure 52:
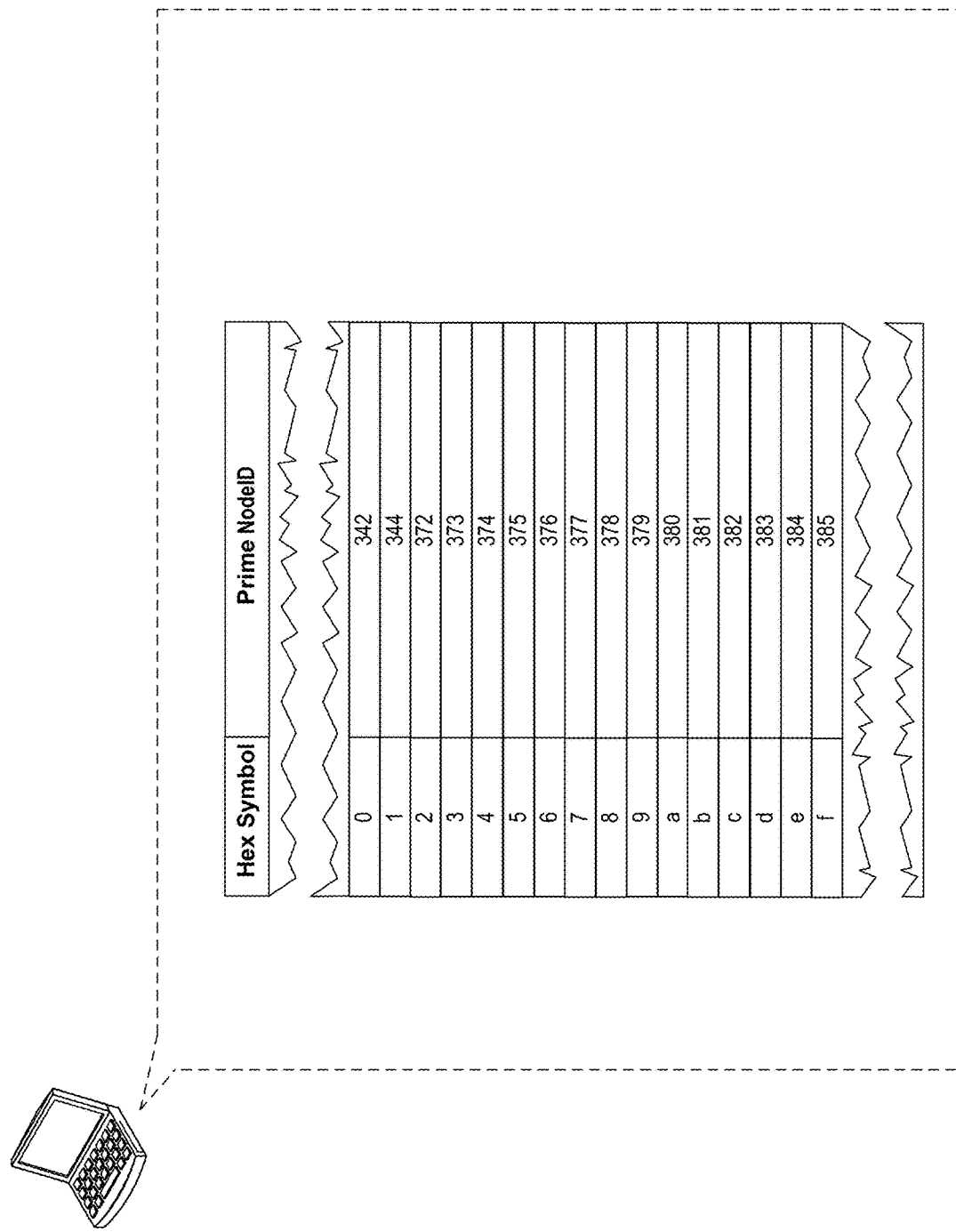
FIG. 52 illustrates a table of sixteen different prime nodes corresponding to the sixteen hexadecimal symbols for use by a device in sending or receiving packets for determining the hex symbols of the packets, if any.

Thus far, binary values and symbols have been used in the examples. An example of use of a hexadecimal number system is shown in FIG. 51 for communicating a covert message of "hidden". In such a system, preferably at least sixteen different prime nodes are utilized to signal the sixteen hexadecimal symbols consisting of "0", "1", "2", "3", "4", "5", "6", "7", "8", "9", "a", "b", "c", "d", "e", "f", with each hexadecimal symbol corresponding to a different prime node. FIG. 52 illustrates a table of sixteen different prime nodes corresponding to the sixteen different hexadecimal symbols for use by a device in mapping symbols to prime nodes and vice-versa.

Additionally, in the examples actually illustrated so far, a first device at an origin node utilizes a node identifier or a route identifier in a packet to determine a symbol signaled by that packet, wherein the node identifier or route identifier identifies a network pathway comprising a prime node; and a second device at a destination node utilizes network path information appended to a packet, e.g., path information contained in a network watermark, to determine a symbol signaled by that packet for a covert message based on identifying a prime node in the network path information.

In accordance with one or more preferred implementations not yet illustrated, a first device at an origin node utilizes a route identifier in a packet to determine a symbol (or sequence of symbols) signaled by that packet, wherein the route identifier identifies a network pathway comprising a prime combination of nodes or prime sequence of nodes; and a second device at a destination node utilizes network path information appended to a packet, e.g., path information contained in a network watermark, to determine the symbol (or sequence of symbols) signaled by that packet for a covert message based on identifying a prime combination of nodes or prime sequence of nodes in the network path information. In this respect, the entire network path or portion thereof signals one or more symbols for a covert message.

Figure 53:
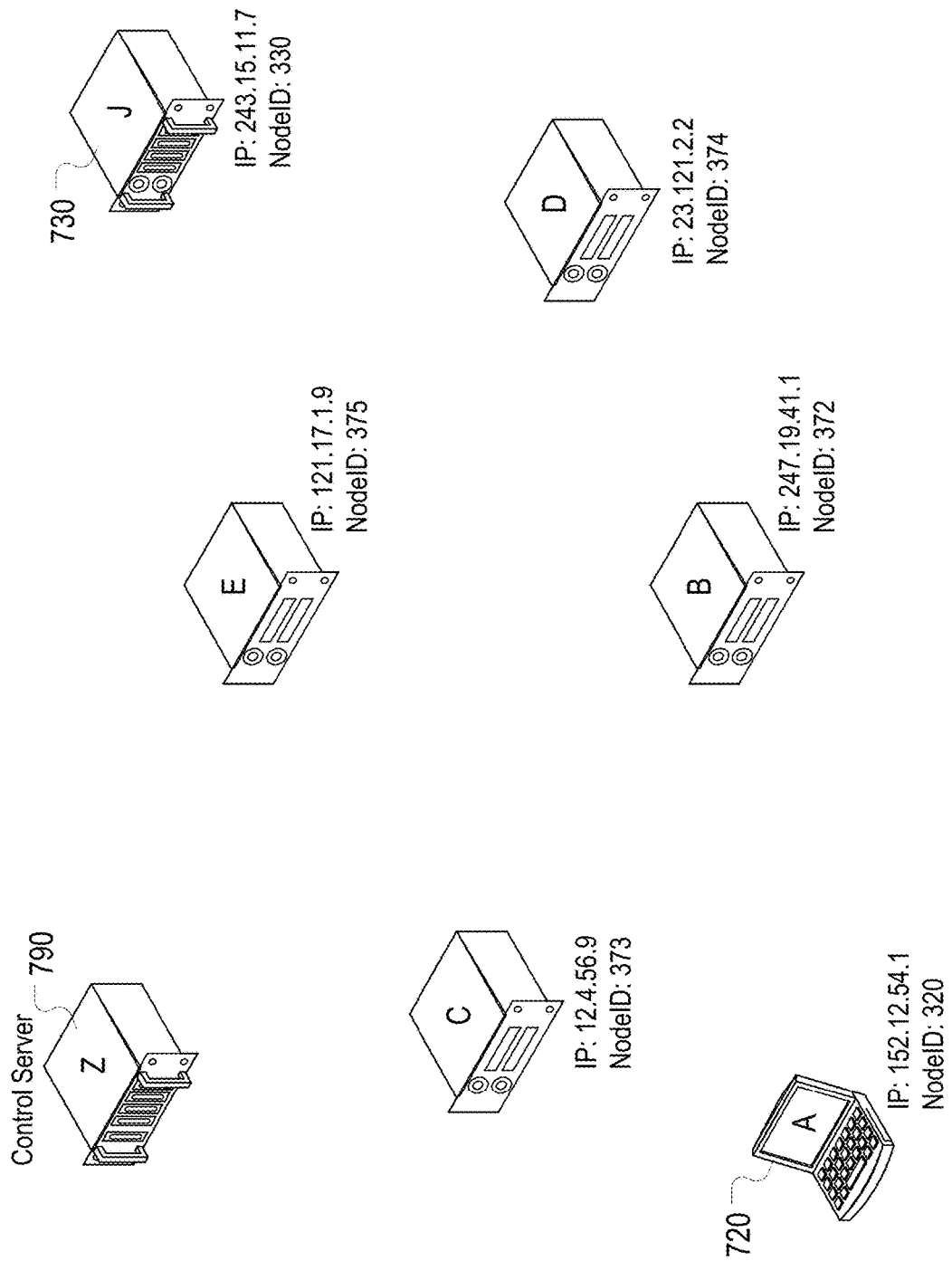
FIG. 53 illustrates an exemplary system comprising a first device at an origin node "A", a second device at a destination node "J", a plurality of overlay servers at nodes "B", "C", "D", and "E" configured to also function as storage servers, and a control server at node "Z" configured to control communications between the devices and provide information regarding the overlay network and potential routes therethrough between the first and second devices.
Figure 54:
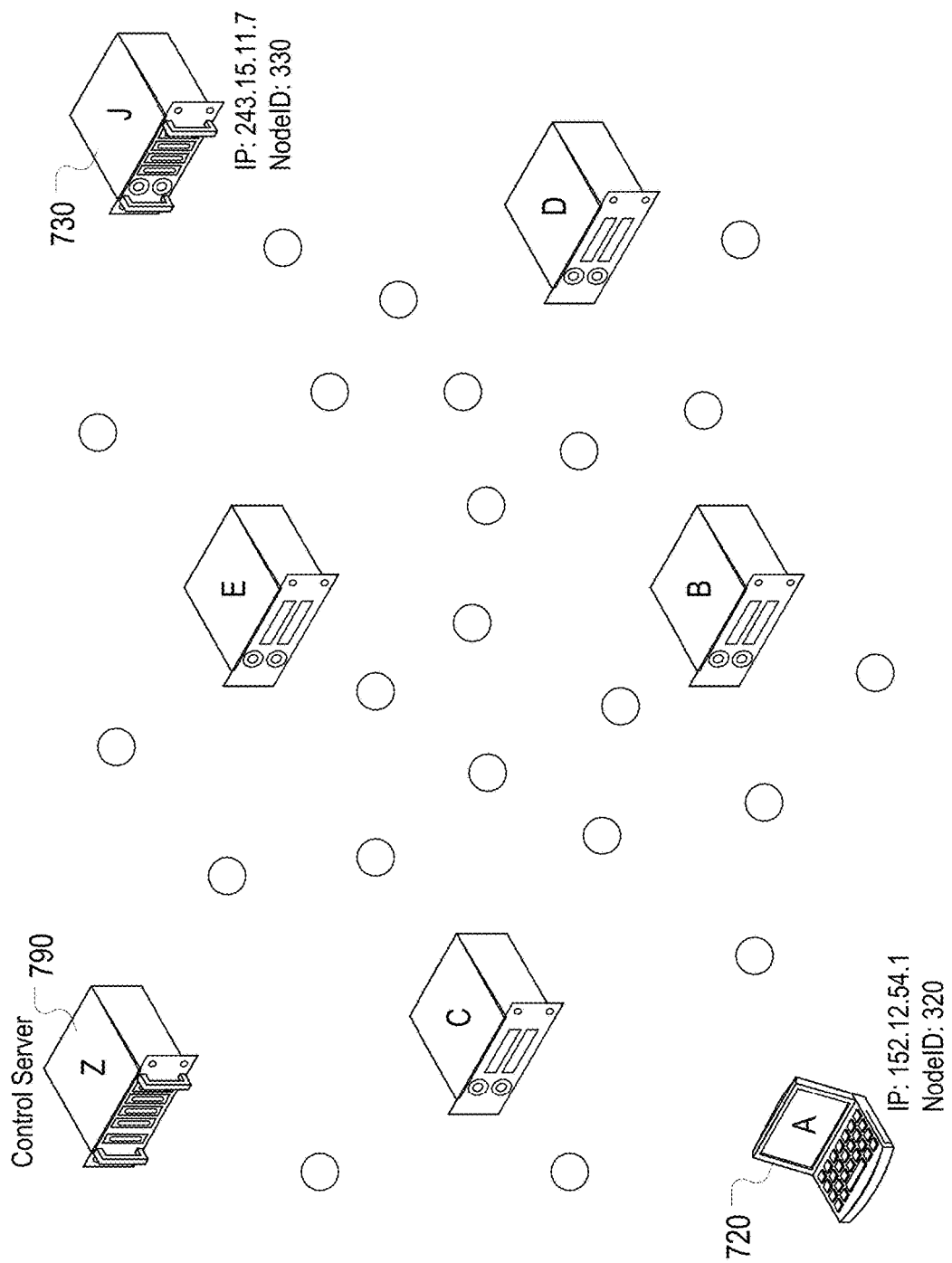
FIG. 54 illustrates additional nodes in a network in which the overlay network exists but which nodes do not form part of the overlay network.

FIG. 53 illustrates an exemplary system comprising a first device 720 at an origin node "A", a second device 730 at a destination node "J", a plurality of overlay servers at nodes "B", "C", "D", and "E" configured to also function as storage servers, and a control server 790 at node "Z" configured to control communications between the devices and provide information regarding the overlay network and potential routes therethrough between the first and second devices 720,730. Communications between the first and second devices 720,730 may involve communication through other nodes not shown (e.g., routers) that are not part of the overlay network. FIG. 54 illustrates exemplary such other nodes that do not form part of the overlay network.

Figure 55:
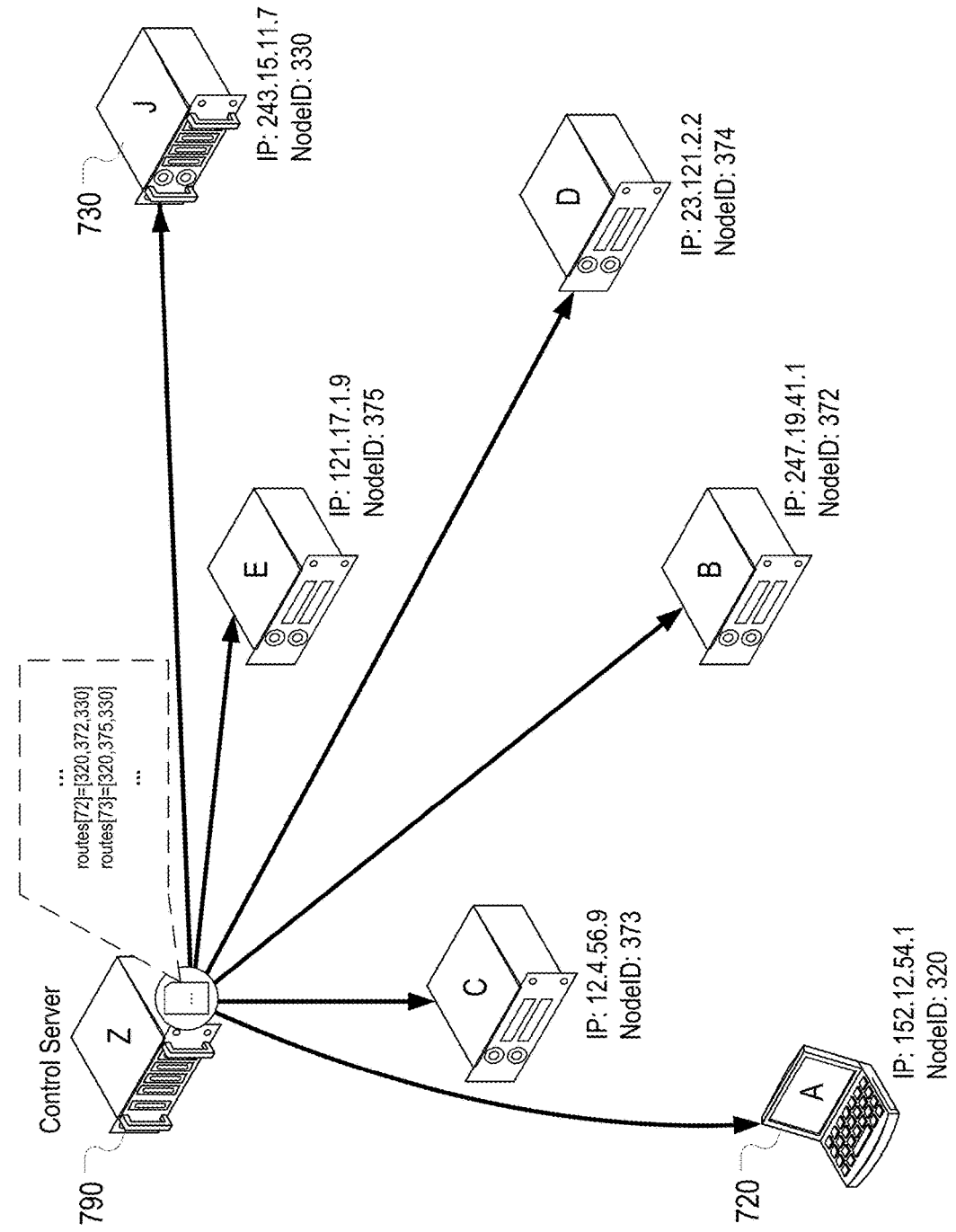
FIG. 55 illustrates communication from the control server to the devices in the overlay network of FIG. 53, which communication includes route control information.
Figure 56:
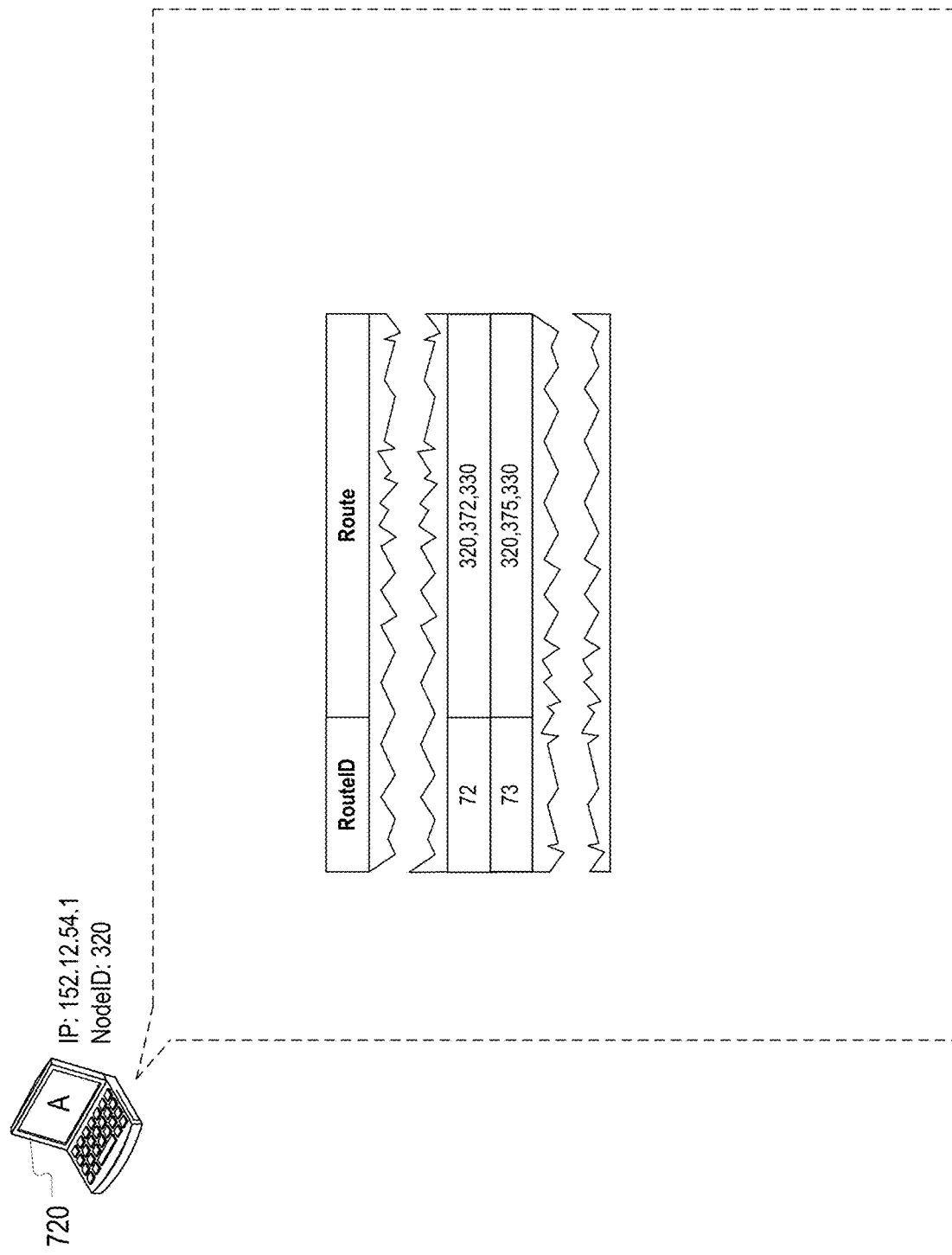
FIG. 56 illustrates storage of the communicated route control information of FIG. 55 at the first device.

In accordance with one or more preferred implementations, the control server 790 communicates route control information to all the devices including the overlay servers, as illustrated in FIG. 55. This route control information may comprise, for example, an indication of particular routes and, for each particular route, an indication of the devices in the overlay network to utilize for that particular route. For example, FIG. 56 illustrates storage of that route control information at the first device 720.

Figure 57:
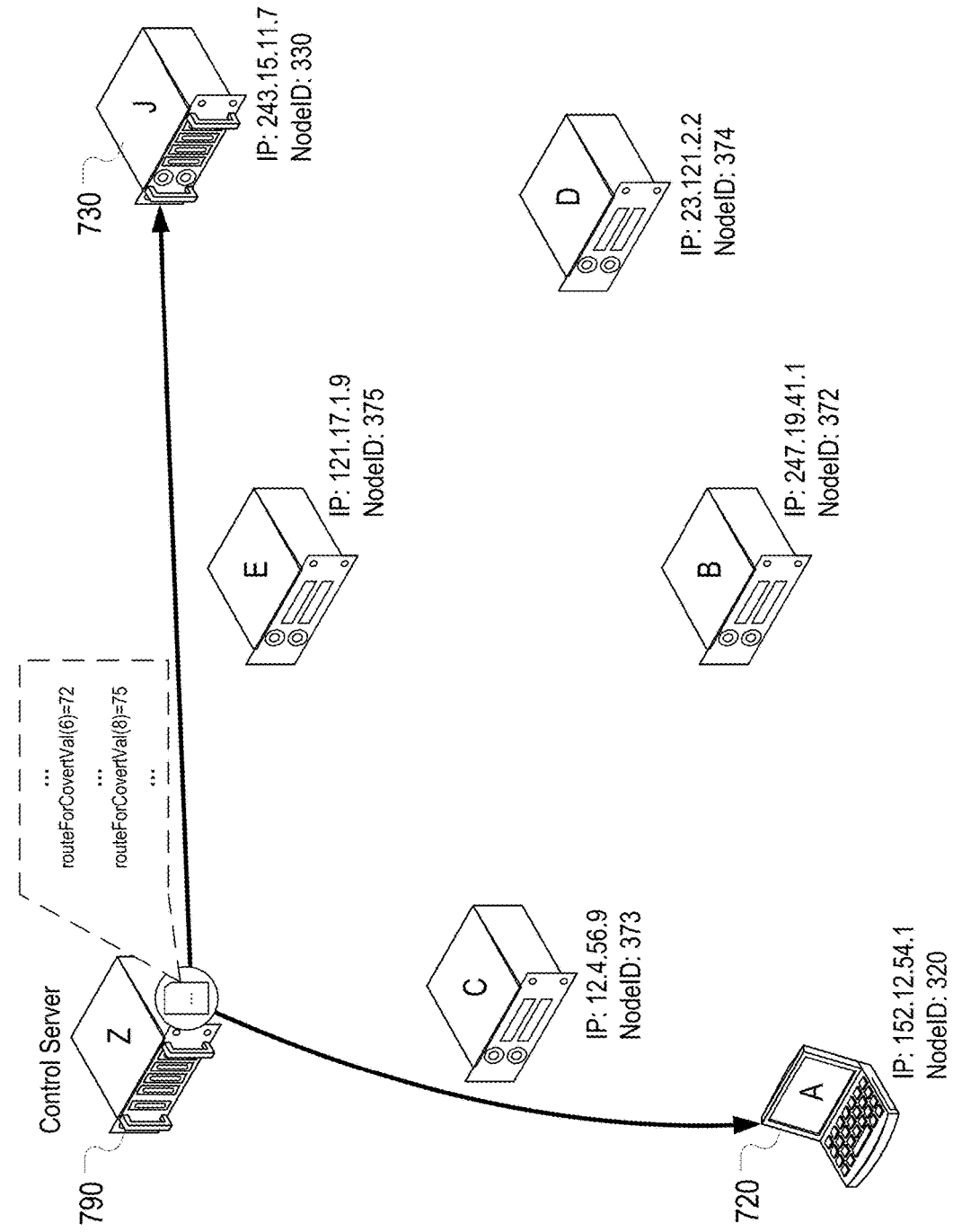
FIG. 57 illustrates communication of covert message control information from the control server to the first and second devices in the overlay network of FIG. 53.
Figure 58:
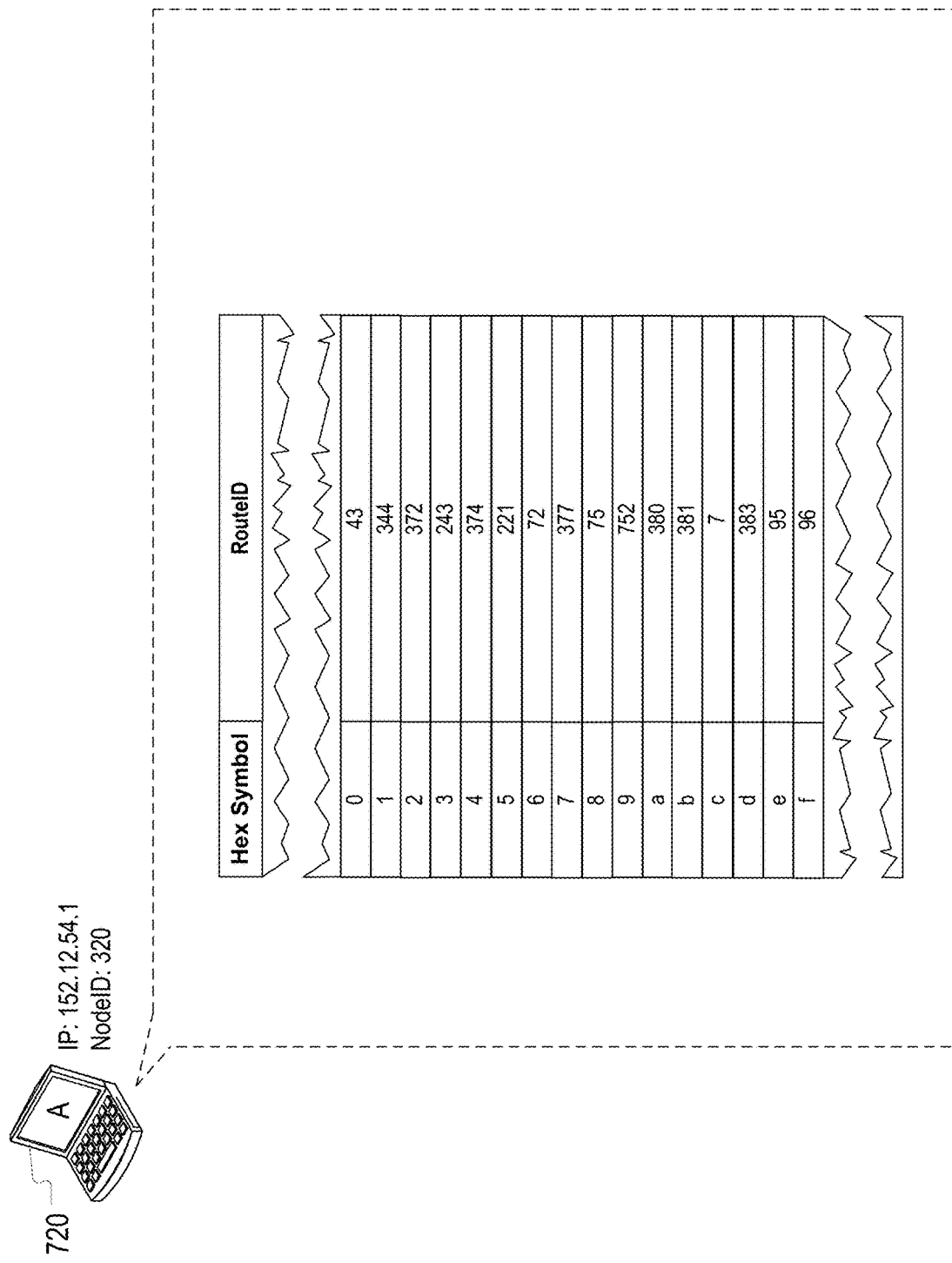
FIG. 58 illustrates storage of covert message control information at the first device, wherein hex symbols are associated with route identifiers.

In accordance with one or more preferred implementations, the control server 790 communicates covert message control information to the first and second devices 720,730, as illustrated in FIG. 57. This covert message control information may comprise, for example, an indication of a particular route to utilize to signal a symbol in the n-based number system utilized. For example, FIG. 58 illustrates storage of that covert message control information at the first device 720, wherein the symbols of a hexadecimal number system are shown.

Figure 59:
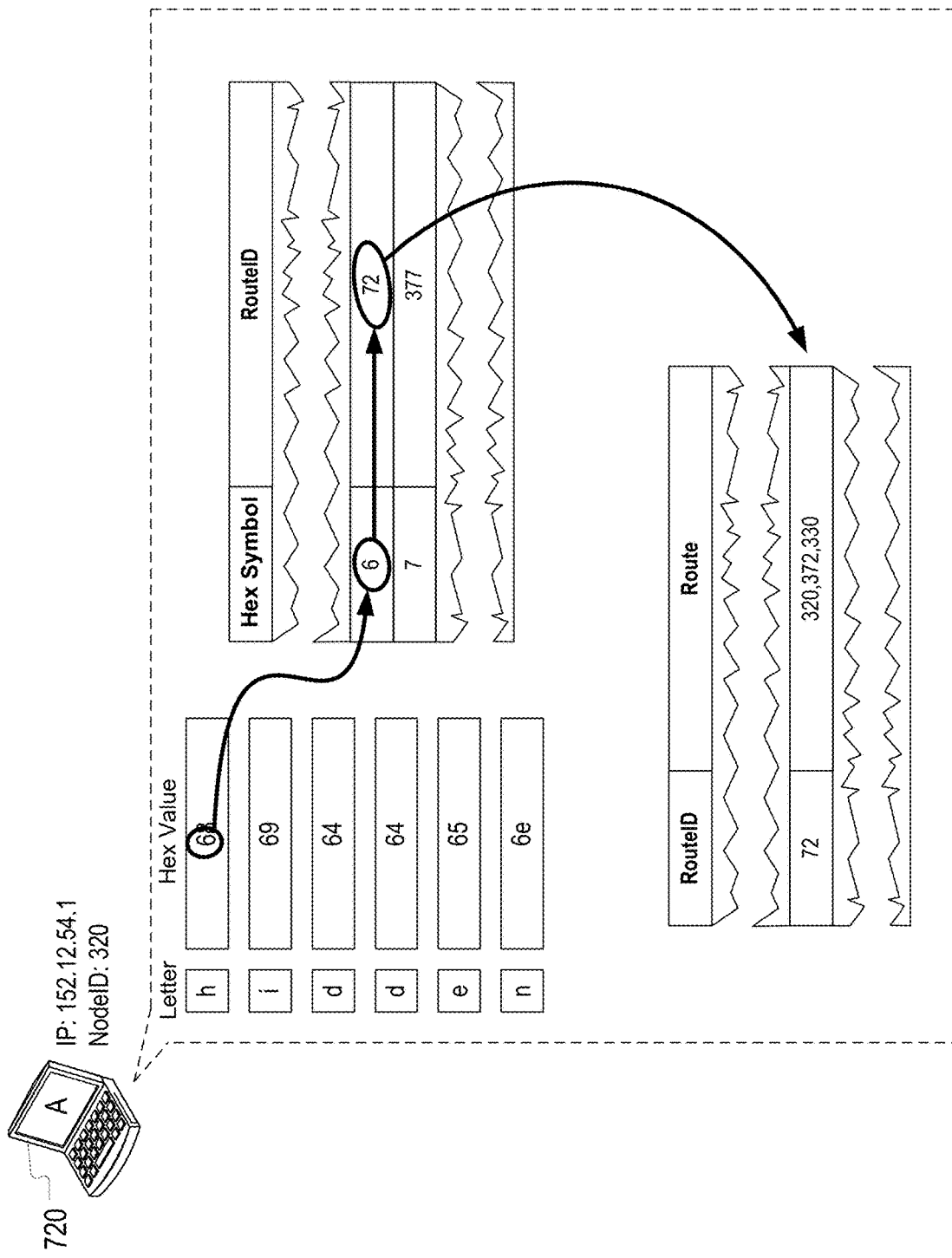
FIG. 59 illustrates mappings of letters of a covert message to hex values, mapping of hex values to route identifiers, and mappings of route identifiers to network pathways by which to send packets for transmitting the covert message.
Figure 60:
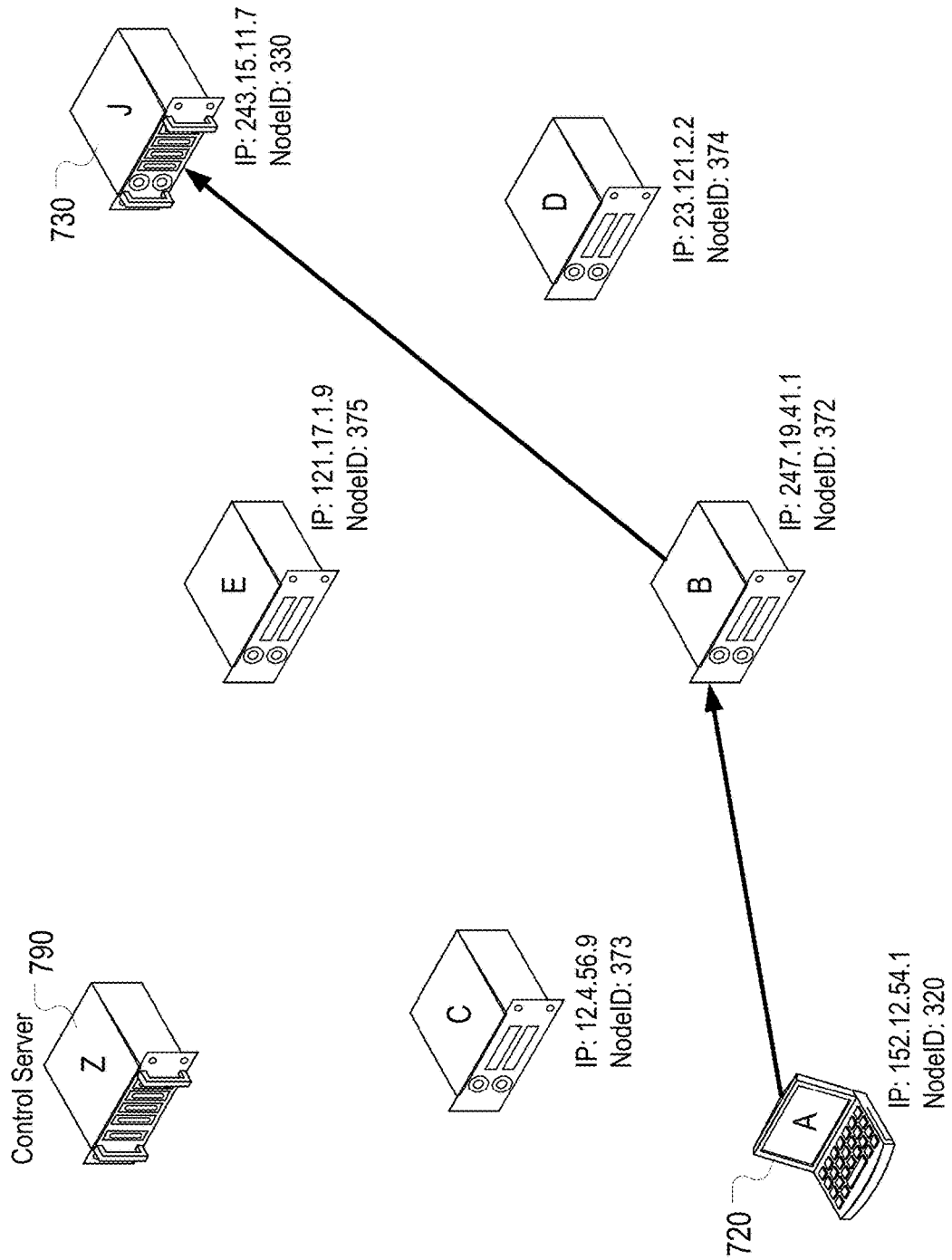
FIG. 60 illustrates communication of a packet from the first device for communication to the second device along an identified network pathway.

To transmit the covert message, the first device 720 determines a first hex symbol of "6" to be signaled by a packet, and then determines a route (in this case the route corresponding to the route identifier "72") by which to send the packet for signaling such symbol, as illustrated in FIG. 59. The first device 720 then prepares a packet to effect routing along the pathway identified by route identifier "72", e.g., by setting or updating a route identifier field or parameter of the packet or by specifying the pathway information associated with the route identifier. The packet is then communicated from the first device 720 for communication to the second device 730 along the identified pathway, as illustrated in FIG. 60. The first device 720 continues to transmit data of the covert message by repeating this process.

Figure 61:
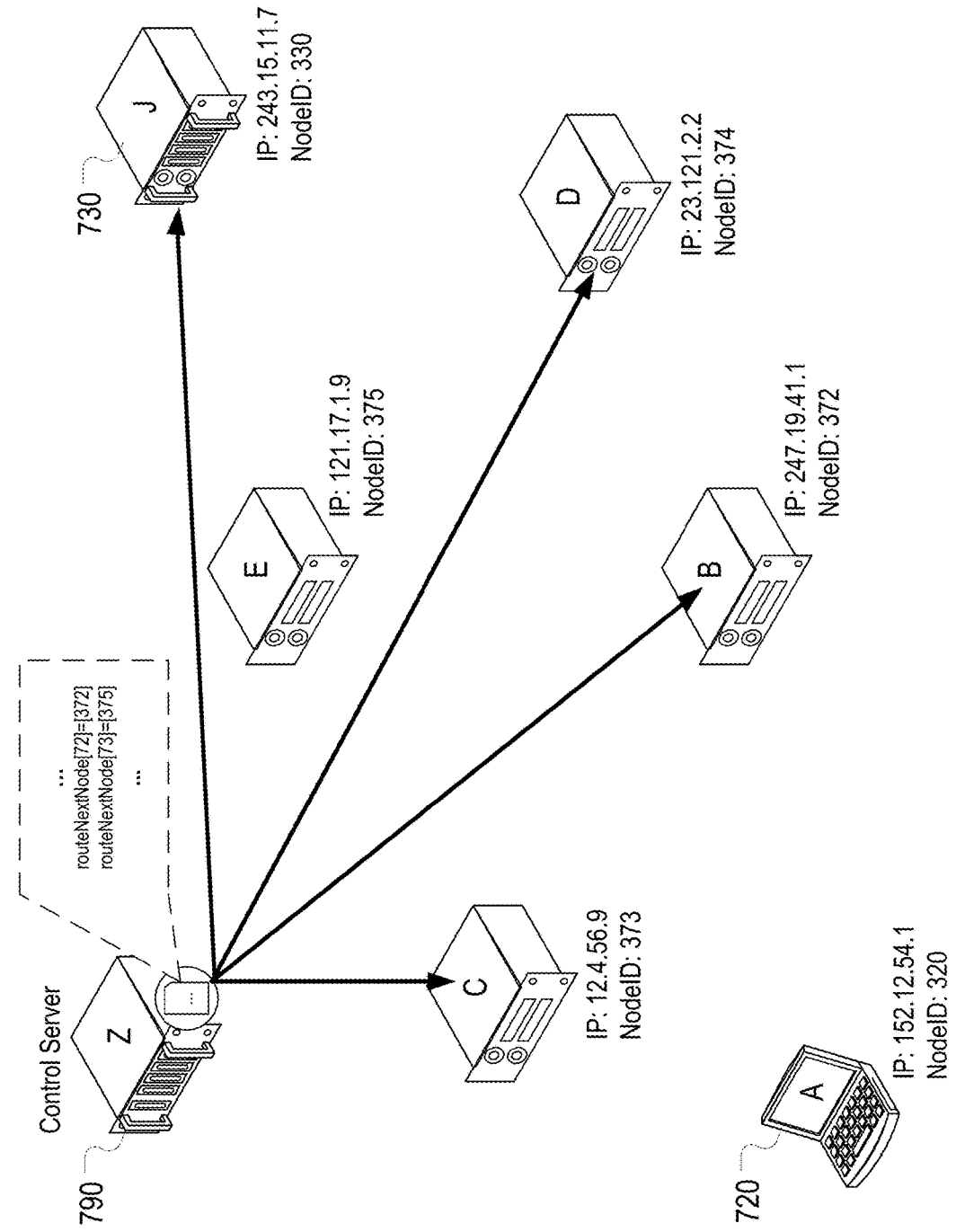
FIG. 61 illustrates the control server communicating route control information to the overlay servers, which information comprises an indication of a respective next node for one or more particular identified routes.

It will be appreciated that the control server 790 communicates route control information to the overlay servers, which information comprises an indication of a respective next node for one or more particular identified routes. This is illustrated in FIG. 61.

In brief recap, a message is covertly transmitted utilizing an overlay network comprising overlay servers that are configured to provide routing functionality for the overlay network, and more specifically in this example, a message is covertly transmitted utilizing an overlay network comprising storage servers that are configured to allow the overlay network to also function as a storage area network, with the storage servers providing routing functionality for the overlay network.

In accordance with one or more preferred implementations, a message is covertly transmitted utilizing electronic devices configured to construct a digital fingerprint for a packet or data block. This digital fingerprint may be constructed, for example, by electronic devices along a communication path of the packet by appending data to the packet. The digital fingerprint is a unique or nearly unique tag, e.g., representing a combination of information from a data packet's origination, pathway taken, time of creation, errors encountered, and location and final destination of storage and use.

In accordance with one or more preferred implementations, a message is covertly transmitted utilizing an overlay network comprising overlay servers configured to provide routing functionality for the overlay network, wherein the overlay servers are further configured to construct a digital fingerprint for a packet or data block communicated over the overlay network, e.g., by overlay servers along a communication path of the packet appending data to the packet or data block.

In accordance with one or more preferred implementations, a message is covertly transmitted utilizing an overlay network also functioning as a storage area network comprising storage servers configured to provide routing functionality for the network, wherein the storage servers are further configured to construct a digital fingerprint for a packet or data block communicated over the network, e.g., by storage servers along a communication path of the packet appending data to the packet or data block.

In accordance with one or more preferred implementations, a digital fingerprint is calculated independently by both a first device at an origin node (e.g., based on data appended to an acknowledgement or response) and a second device at a destination node (e.g., based on data appended to a communicated packet or data block). In accordance with one or more preferred implementations, digital fingerprints calculated at the first device and second device will not be identical, but will "match" in the validation of the included data and dimensions of the system at that millisecond in time from their perspective.

In accordance with one or more preferred implementations, a device or system authenticates a received packet, data block, transaction, or message based on comparing a digital fingerprint for the received packet, data block, transaction, or message to digital fingerprints for the last "n" received packets, data blocks, transactions, or messages, e.g., the last two received packets, data blocks, transactions, or messages.

In accordance with one or more preferred implementations, software for an overlay server or storage server is configured to be installed on public, private, and hybrid cloud servers, and run as drivers or background services on edge devices such as laptops, desktops, tablets, and mobile phones.

In accordance with one or more preferred implementations, software creates and controls multiple connections for network sessions. In some cases, multiple connections are direct device to device; however, in accordance with one or more preferred implementations, other paths are provided by leveraging other storage or overlay servers to forward data to the destination. Such alternative routing provides a mechanism to mitigate or avoid congestion. These paths may be partially or completely independent paths, allowing for maintenance of path independence.

In accordance with one or more preferred implementations, software providing communication utilizing an overlay network operates at the driver level and runs on most edge device operating systems. Further, because the client runs as a driver, user applications operate normally. Devices can communicate with other trusted devices, but can also communicate, without disruption, with any resources outside of the overlay network. The overlay routing provides an independent spread of packets across the individual system components.

In accordance with one or more preferred implementations, overlay routing leverages layer 2 (the data link layer) and layer 3 (the network layer) portions of the OSI layers of the network. By leveraging parts of both layers, the network is able to connect two endpoints virtually and create a tunnel with characteristics that leverages parallelization to improve network performance, reliability, and control. The variability of the network paths help to introduce more entropy into the possible network paths that are used to calculate a digital fingerprint.

In accordance with one or more preferred implementations, software drivers install and reside on the network access layer, between the host's operating system and network interface hardware. Running in these layers, in the OSI stack, enables the overlay driver to communicate directly to the network interface hardware so that the overlay driver can take control of routing and network communications on behalf of the host. The overlay driver then helps its system components with other overlay-enabled devices to move traffic across managed routes rather than surrendering routing control to non-overlay devices, essentially directing the routes.

Packets flow through the overlay drivers in response to requests and commands from user-facing applications (e.g., a word processing application, mobile device apps, etc.) running at the application layer. An additional advantage the overlay driver gains by operating at the bottom of the network stack is that it controls packet traffic at the most efficient point on the host, so there is no perceptible added latency from the application or user's perspective.

Figure 62:
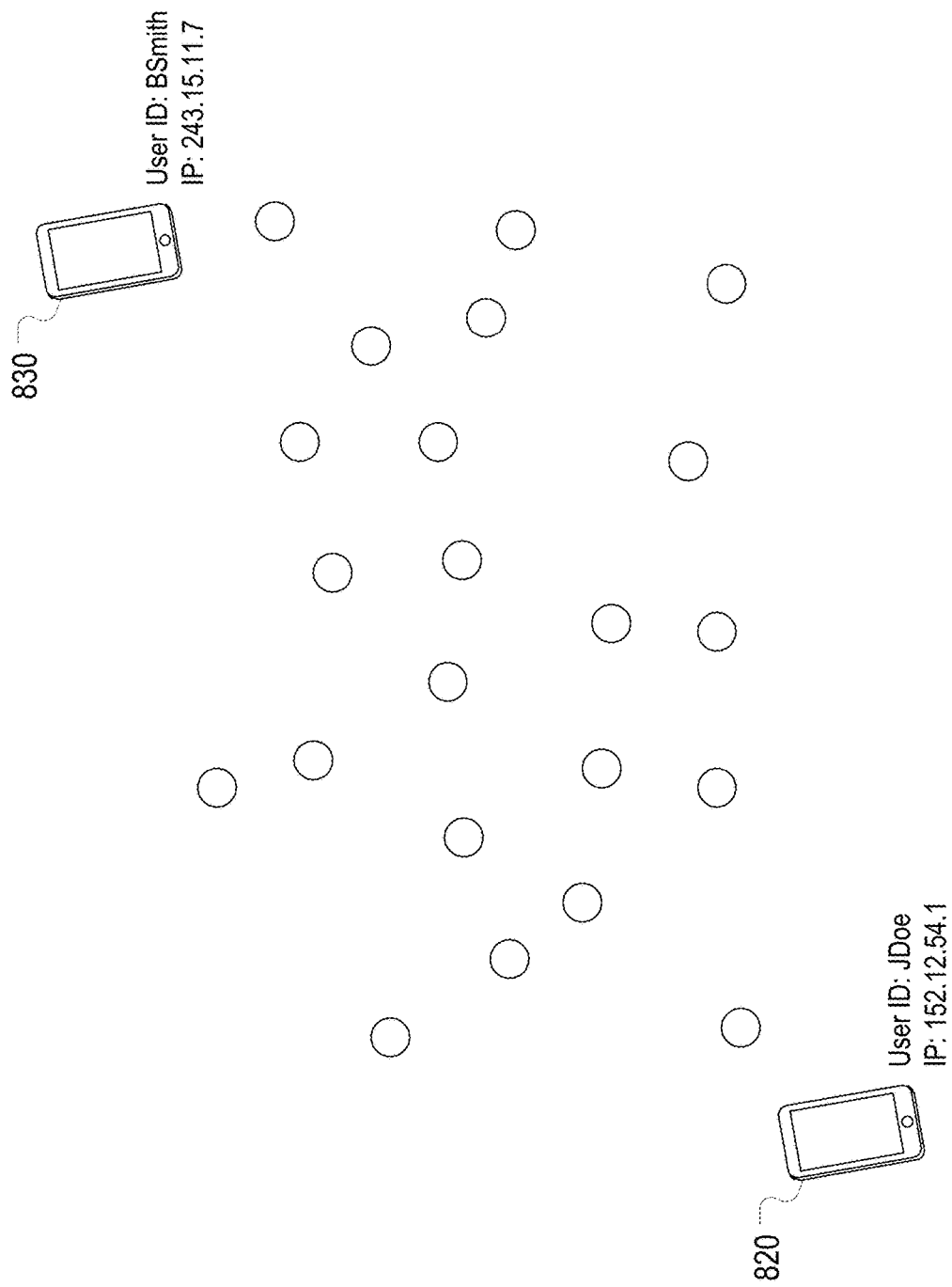
FIG. 62 illustrates an exemplary system involving a first mobile phone, a second mobile phone, and a plurality of network nodes configured for network communications over which the first and second phones may communicate.
Figure 63:
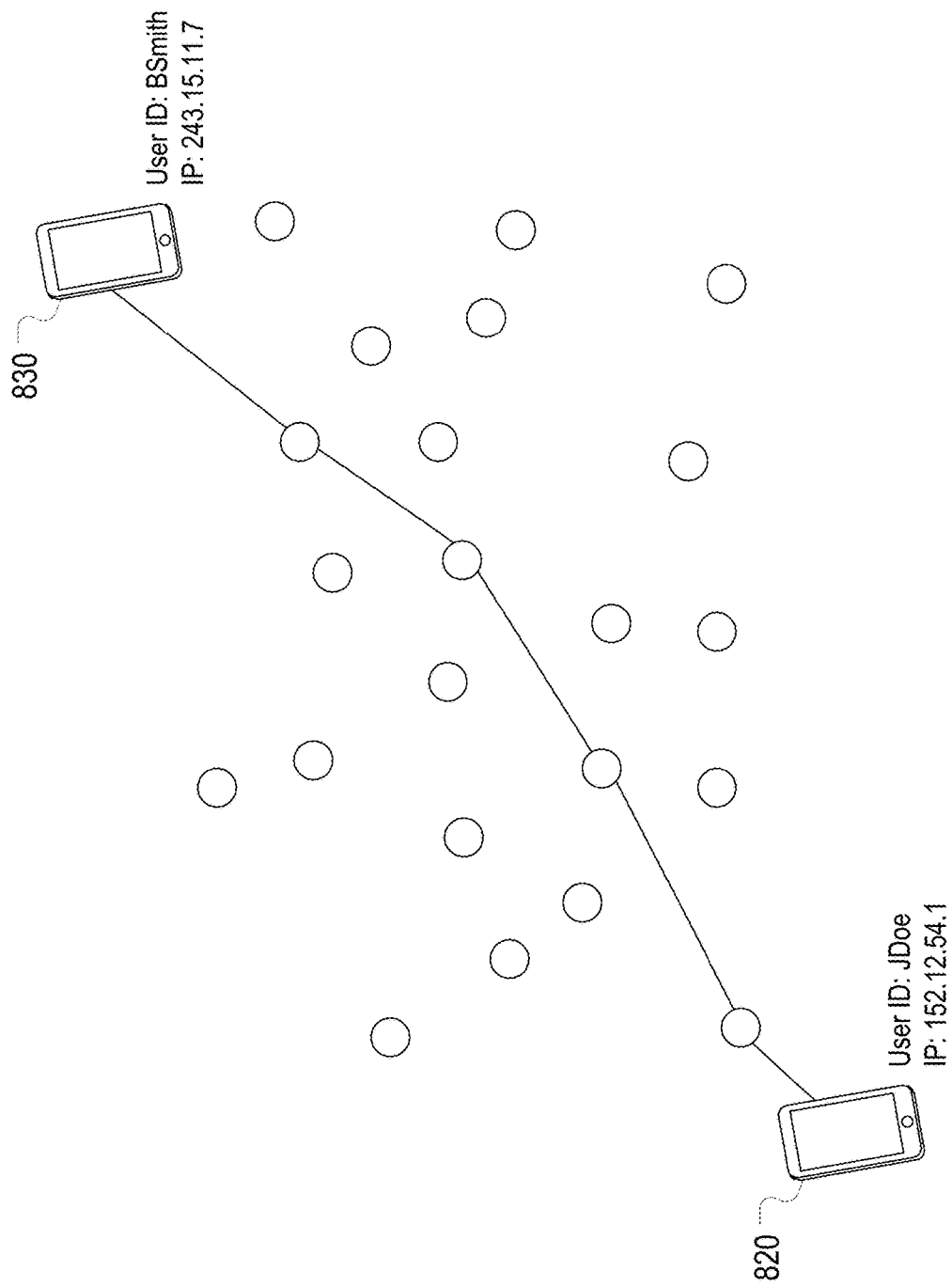
FIG. 63 illustrates communications between the first mobile phone and the second mobile phone over the network nodes of FIG. 62.

It will be appreciated that communications between mobile devices are increasingly ubiquitous, and that such communications frequently pass through one or more network nodes that are not under the control of a user of a mobile device, and that such communications are capable of interception by actors with malicious intent. For example, FIG. 62 illustrates an exemplary system involving a first mobile phone 820, a second mobile phone 830, and a plurality of network nodes configured for network communications over which the first and second phones 820,830 may communicate. Communications between the mobile phone 820 and the mobile phone 830 are generally routed over these nodes, as illustrated for example in FIG. 63.

Figure 64:
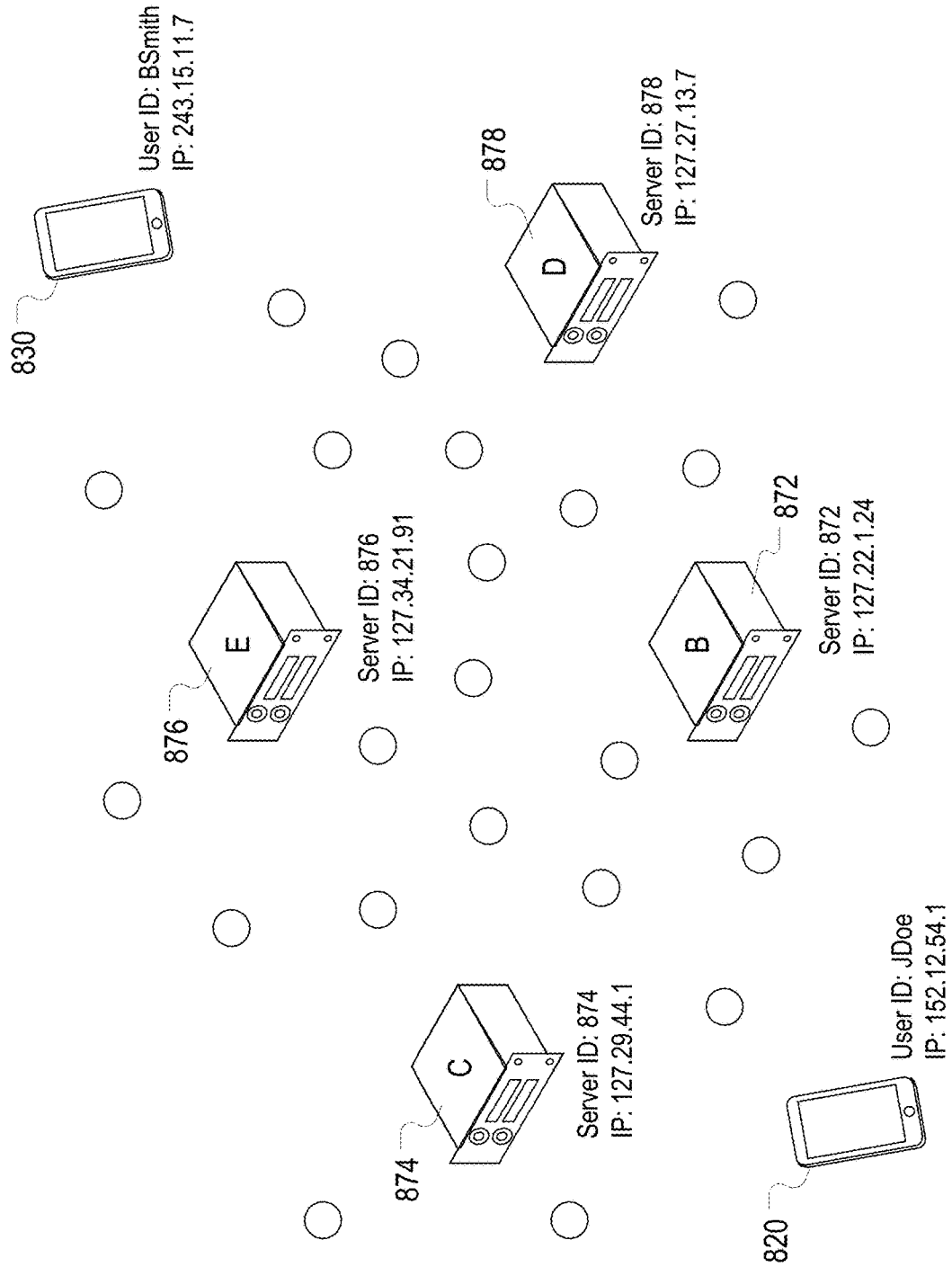
FIG. 64 illustrates use of exemplary servers for redirects in the network of FIG. 62.
Figure 65:
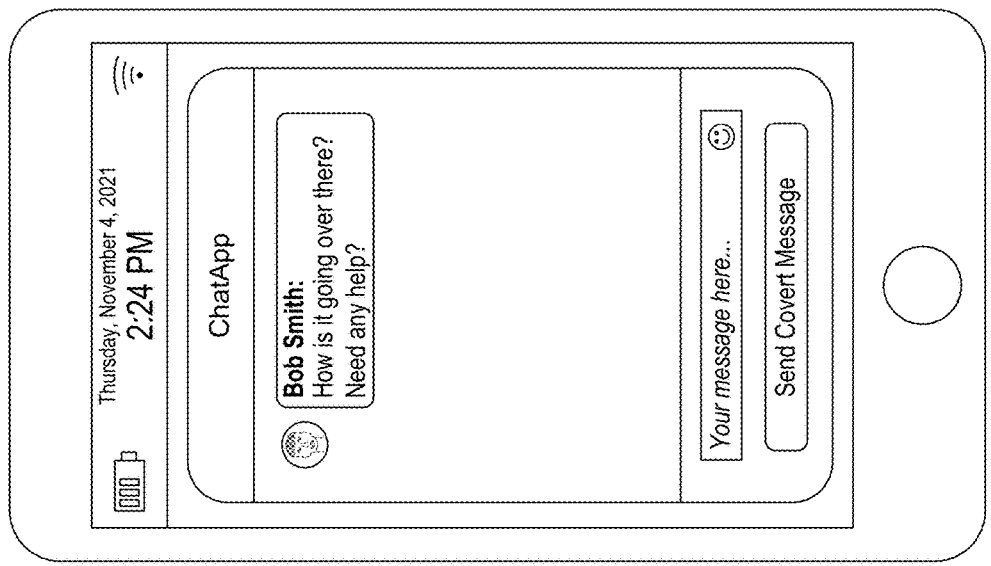
FIG. 65 illustrates an exemplary interface of a chat app configured to enable a user to send and receive messages as well as to allow a user to explicitly send a covert message in the network of FIG. 62.

In accordance with one or more preferred implementations, one or more servers are utilized as prime nodes to facilitate covert communications between the first and second phones 820,830 in a manner designed to prevent interception of the covert communications by a malicious actor with access to communications over the network. FIG. 64 illustrates use of exemplary such servers 872,874,876,878. In accordance with one or more preferred implementations, a mobile application, such as a chat app, is configured to send and receive covert messages via use of these servers. For example, FIG. 65 illustrates an exemplary interface of a chat app configured to enable a user to send and receive messages as well as to allow a user to explicitly send a covert message over the network of FIG. 62. When sending a covert message, the chat app utilizes packets sent for communicating data for that app or application, or for another app or application, to communicate the covert message. In FIG. 62, the illustrated interface shows that the user "Bob" has used the second mobile phone 830 to send a message to the user "Jane" inquiring whether Jane needs any help, which message is not covert.

Figure 66:
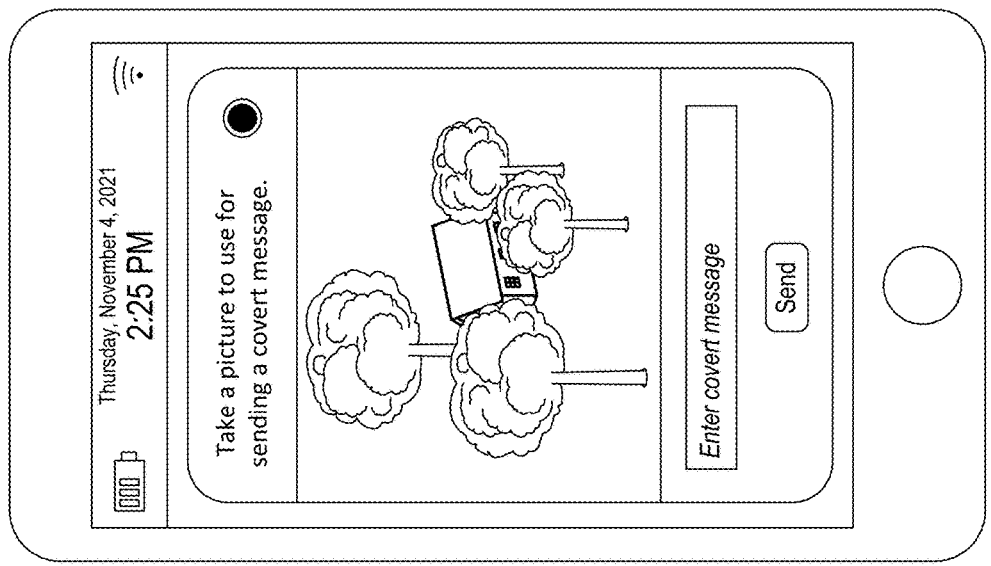
FIG. 66 illustrates an exemplary interface for a chat app, which allows a user to take a picture to be communicated in a manner such that a covert message is communicated.
Figure 67:
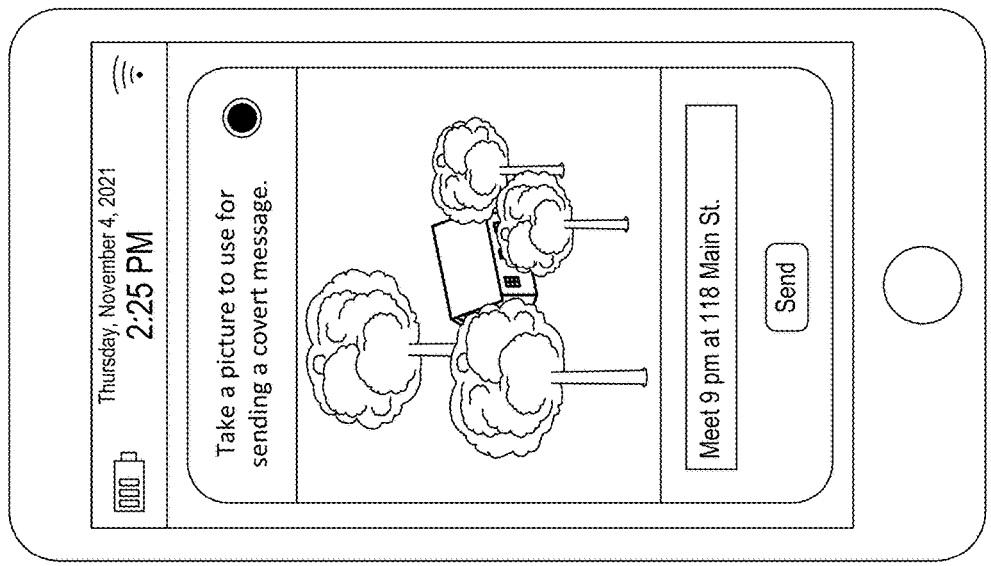
FIG. 67 illustrates use of the interface to send a covert message of "Meet 9 pm at 118 Main St."
Figure 68:
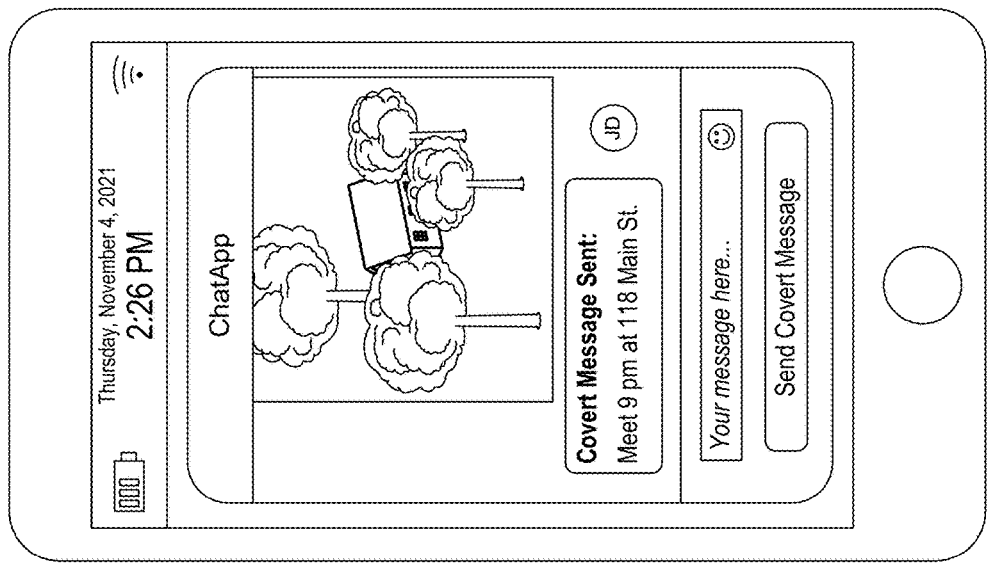
FIG. 68 illustrates an exemplary interface of the chat app showing that the covert message that is sent.
Figure 69:
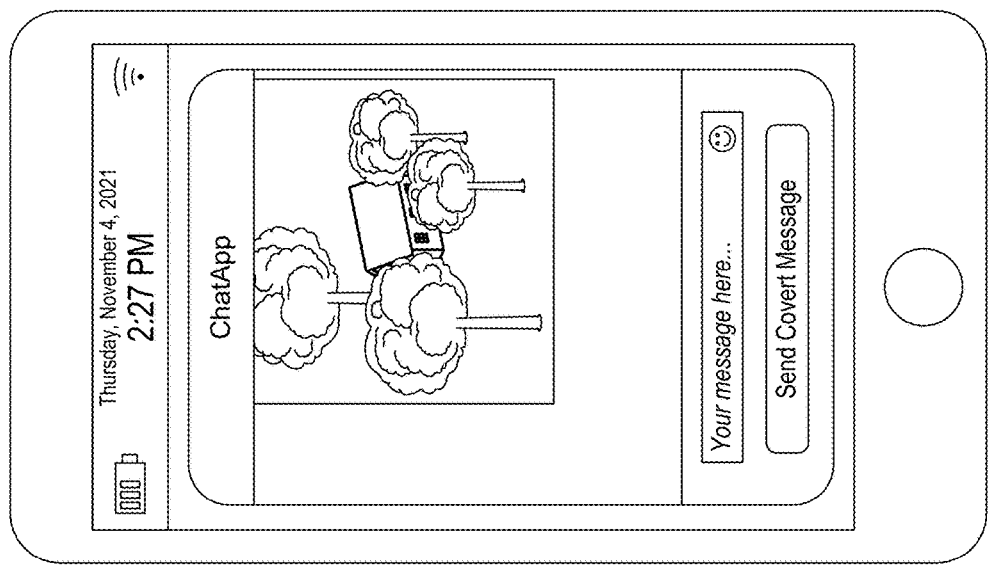
FIG. 69 illustrates the temporary displaying of the covert message that is sent, wherein the covert message has disappeared from the display.

FIG. 66 illustrates an interface for the chat app on the first mobile phone 820 of Jane, which allows a user to take a picture to be used for sending a covert message. FIG. 67 illustrates use of the interface to send a covert message of "Meet 9 pm at 118 Main St." from the first mobile phone 820 of Jane to the second mobile phone 830 of Bob. FIG. 68 illustrates an exemplary interface of the chat app showing sending of the message. In accordance with one or more preferred implementations, the covert message may disappear from the interface after a set or user-configured period of time (e.g., ten seconds, one minute, one day, etc.), as illustrated in FIG. 69. In accordance with one or more preferred implementations, the covert message may never be displayed in the chat interface at all after being input.

As previously noted, in accordance with one or more preferred implementations, a packet includes a route identifier which is configured to control a network path of the packet. FIG. 70 illustrates maintenance at the first mobile phone 820 (e.g., by the chat app or an overlay networking app) of routes which correspond to hexadecimal symbols to be signaled. The first mobile phone 820 maintains information regarding a plurality of routes, including, for each route, a route identifier and an indication of the pathway by a sequence of node identifiers (note that combinations of node identifiers could be used rather than sequence of node identifiers since no combination is repeated in the table). Rather than using node identifiers, IP addresses, or media access control (MAC) addresses could be used. Some or all of the maintained information may be received from a control server, received from one of servers 872,874,876, 878, gathered by the first mobile phone 820 based on network monitoring and received communications, or received from another mobile phone or other device. Data is communicated from the first mobile phone 820 to the second mobile phone 830 by using path selection to signal hexadecimal symbols, with selection of a route to utilize for a packet being performed at the first mobile phone 830 based on the associations shown in FIG. 70.

Figure 71:
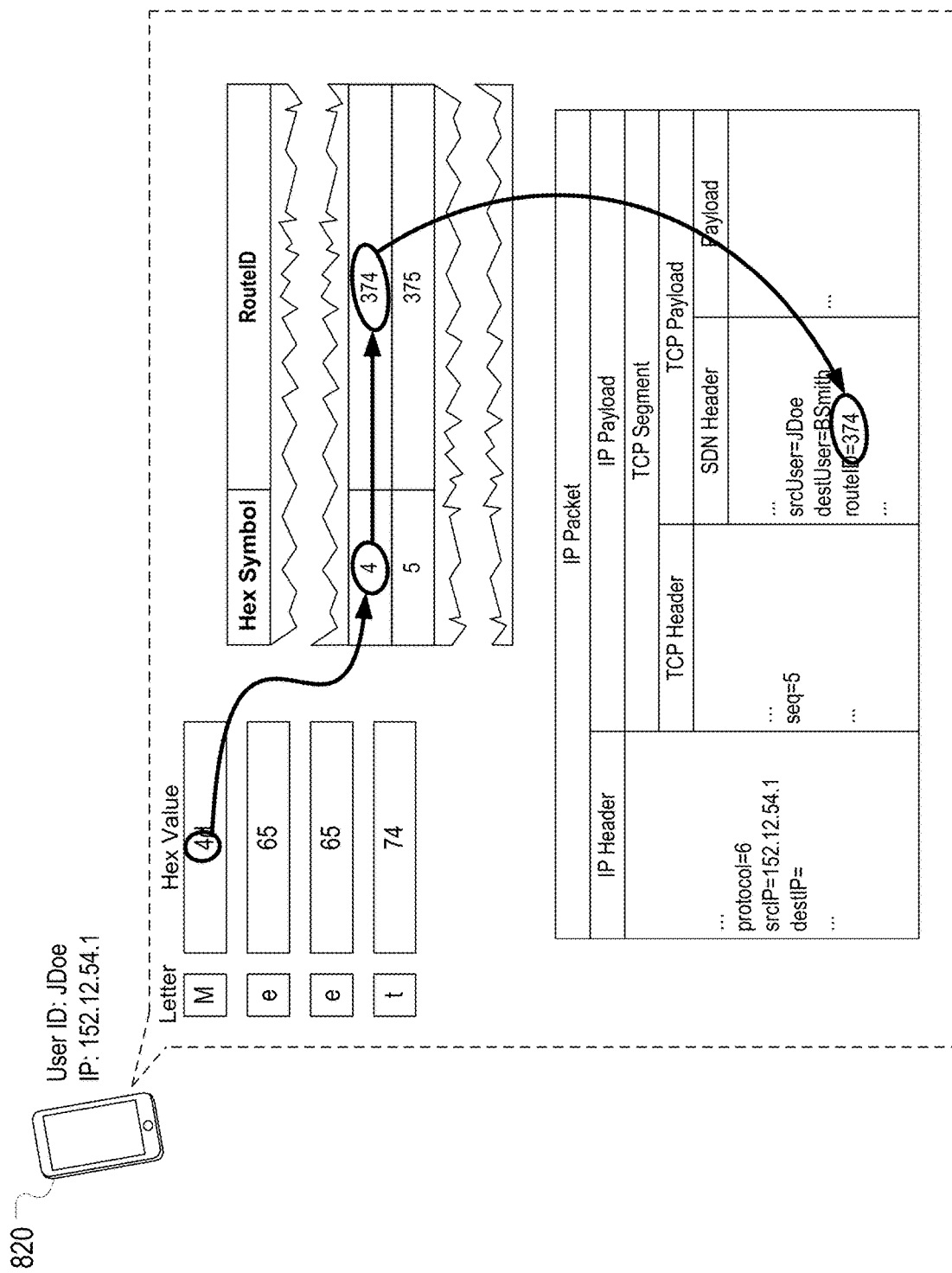
FIG. 71 illustrates hex values for letters of a first word in the covert message of FIG. 67, wherein "M" is associated with the hexadecimal value of "4d".

As an example, consider communication of the letters of the first word of the exemplary covert message illustrated in FIGS. 67, namely the letter of the word "Meet". FIG. 71 illustrates hex values for these letters, wherein "M" is "4d". In this example, the mobile phone 820 utilizes stored or received data to determine that communication over a network route corresponding to the route identifier of "374" signaling a hexadecimal symbol of "4". Thus, communication over a network path through the node "876" signals to the mobile phone 830 a hex symbol of "4".

The mobile phone 820 next looks up the route identifier to identify a node identifier for the first node in the specified route "374", which is node identifier "876". The mobile phone 820 then looks up the IP address for node identifier "876", which is "127.34.21.91" and includes this as the destination IP address in the IP Header of the IP Packet. This is all shown in FIG. 72.

Preferably text of the covert message is transmitted using hexadecimal encoding or "encoding Base16" in the transfer, in which each letter of the message is represented by two hexadecimal digits. In communicating bytes, each byte is broken into two 4-bit values and transmitted through the sending of eight packets along certain network paths. Thus, each byte of the message is transmitted through path signaling through sending eight packets from mobile phone 820 for receipt by mobile phone 830.

Figure 72:
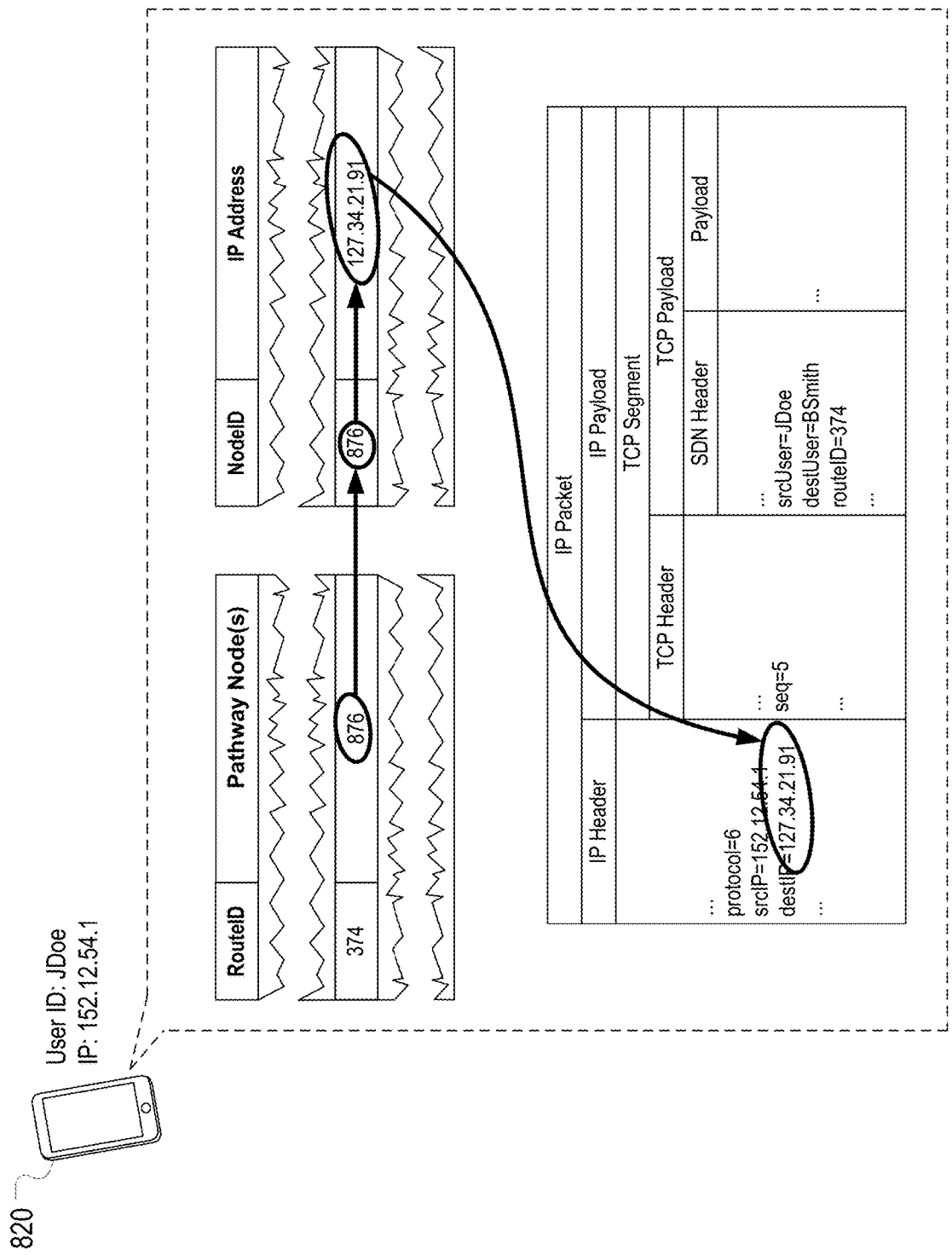
FIG. 72 illustrates the mobile phone of the network of FIG. 62 looking up the route identifier to identify a node identifier for the first node in the specified route "374", which is node identifier "876"; looking up the IP address for node identifier "876", which is "127.34.21.91"; and including this as the destination IP address in the IP Header of the IP Packet.
Figure 73:
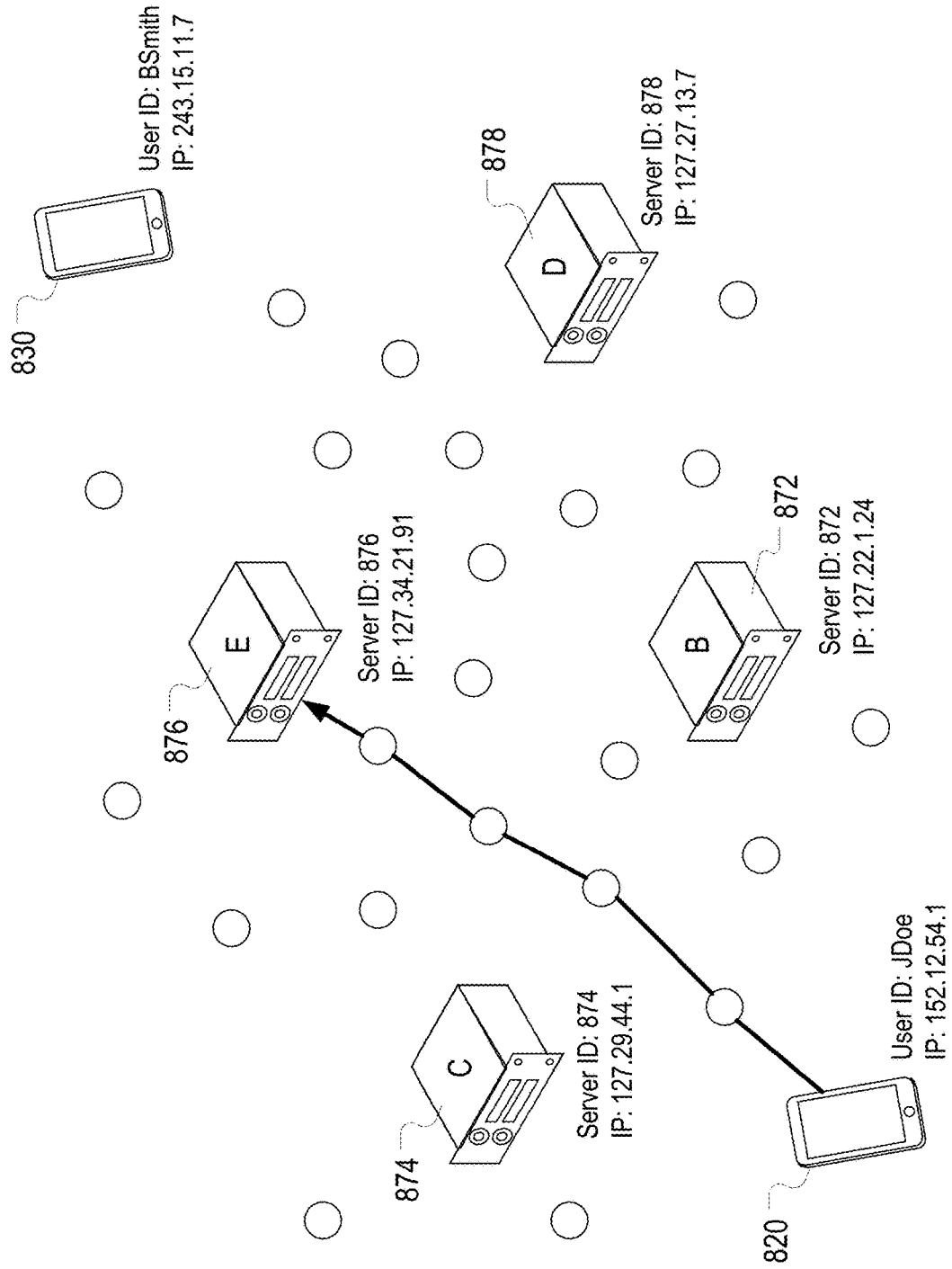
FIG. 73 illustrates the IP packet of FIG. 72 being sent from mobile phone to a redirect server at node "E" in the network of FIG. 62.

FIG. 73 illustrates the IP packet of FIG. 72 being sent from mobile phone 820 to server 876. This IP packet is communicated by the mobile phone 820 for communication to the second mobile phone 830 via server 876 at node "E", which has node identifier "876" and an IP address of "127.34.21.91".

It will be further appreciated that the actual network path of the communication of the IP packet comprises a number of intermediate nodes, but none of the intermediate nodes are nodes formed by servers 872,874,878. Indeed, if a server 872,874,876,878 is not identified in the pathway of a route identifier, then the communication preferably does not pass through that server. This may be accomplished by insuring that in the network topography servers 872,874,876,878 are not arranged along paths that a packet normally would take through the network between mobile phone 820 and mobile phone 830.

Figure 74:
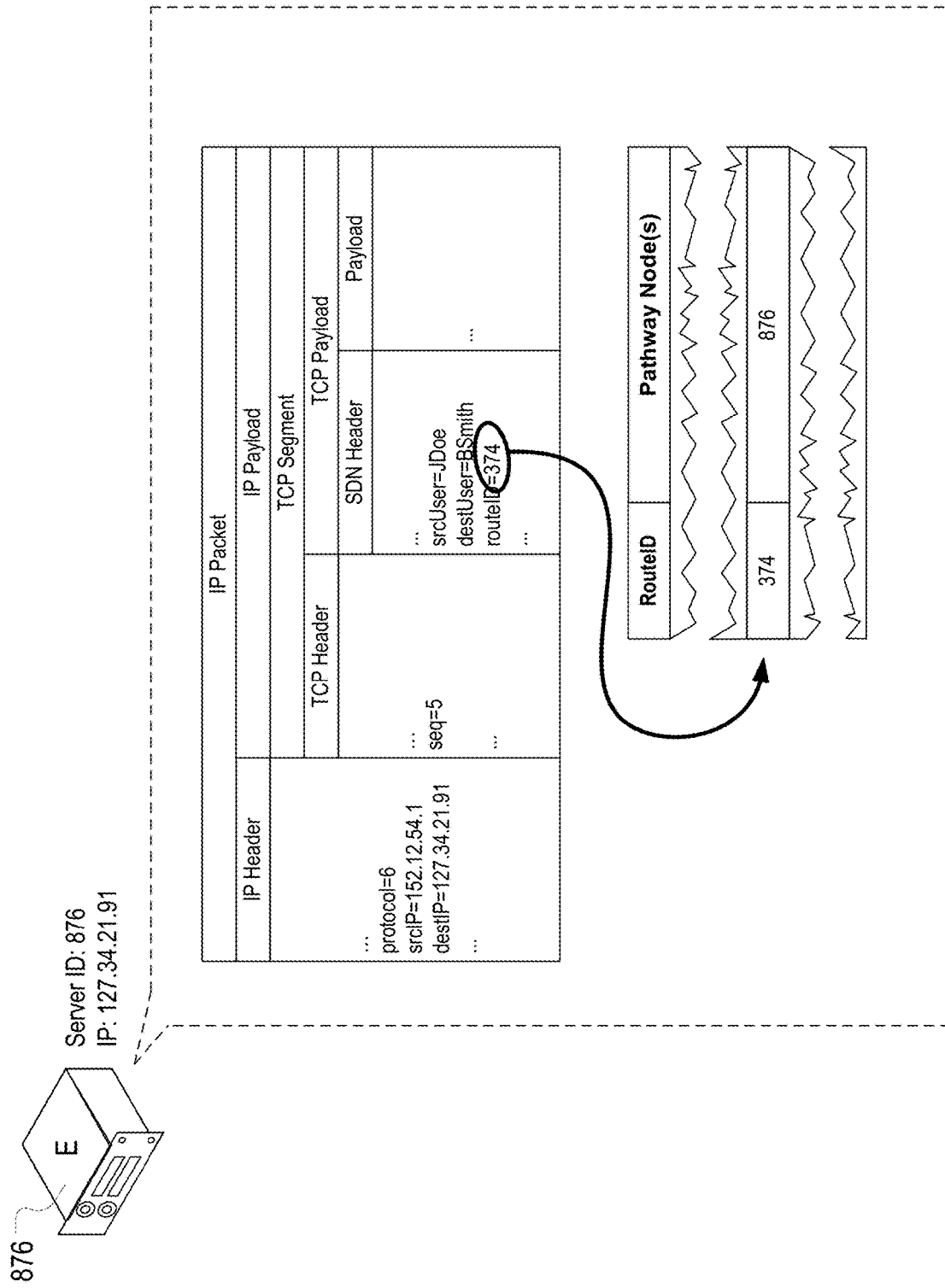
FIG. 74 illustrates server at node "E" parsing the packet to determine the route identifier for the route the packet is intended to utilize, in this case the route identifier of "374".
Figure 75:
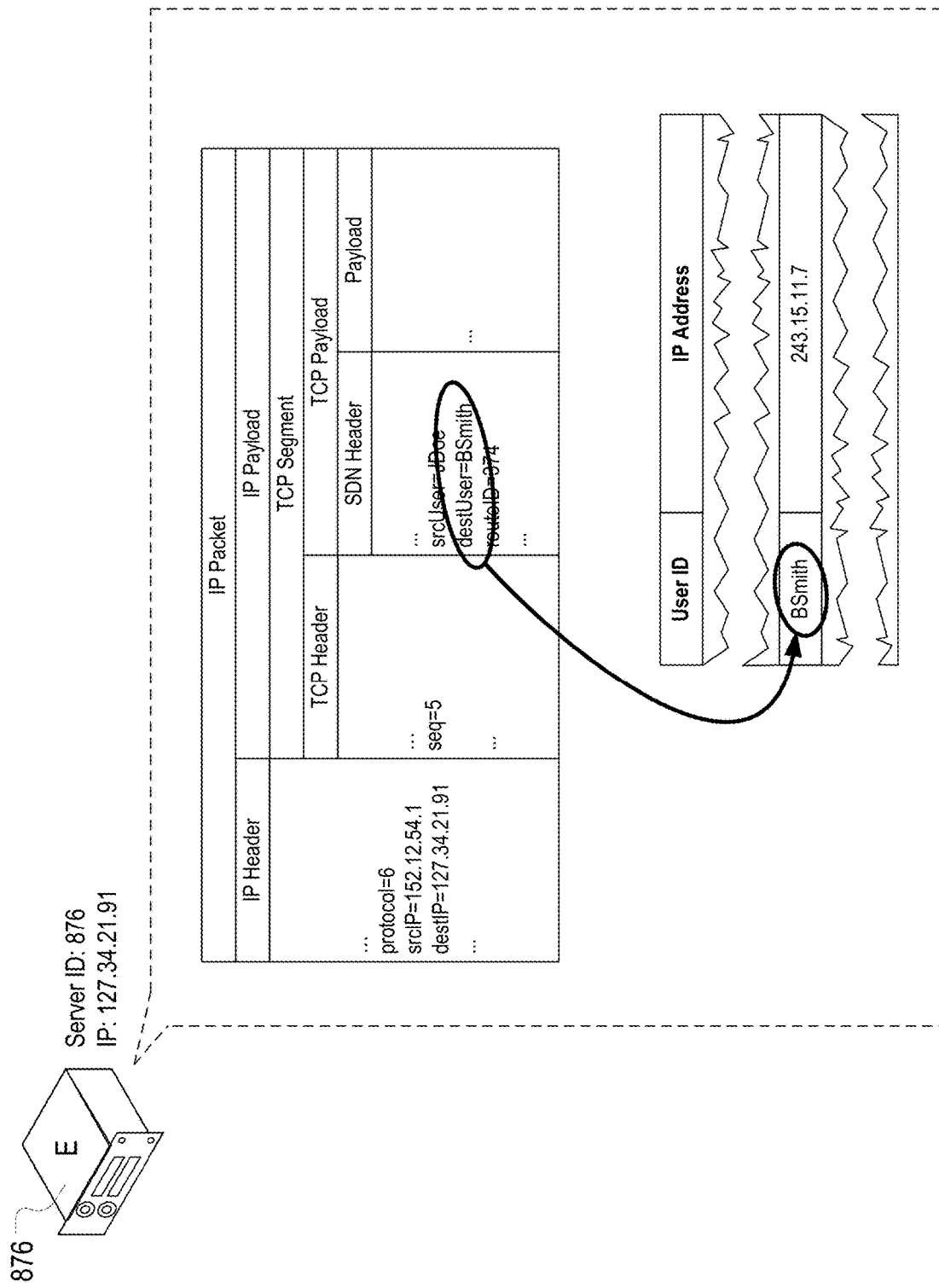
FIG. 75 illustrates the server at node "E" parsing the destination user from the destUser filed to identify "BSmith" and then looking up or otherwise obtaining the IP address of "BSmith".
Figure 76:
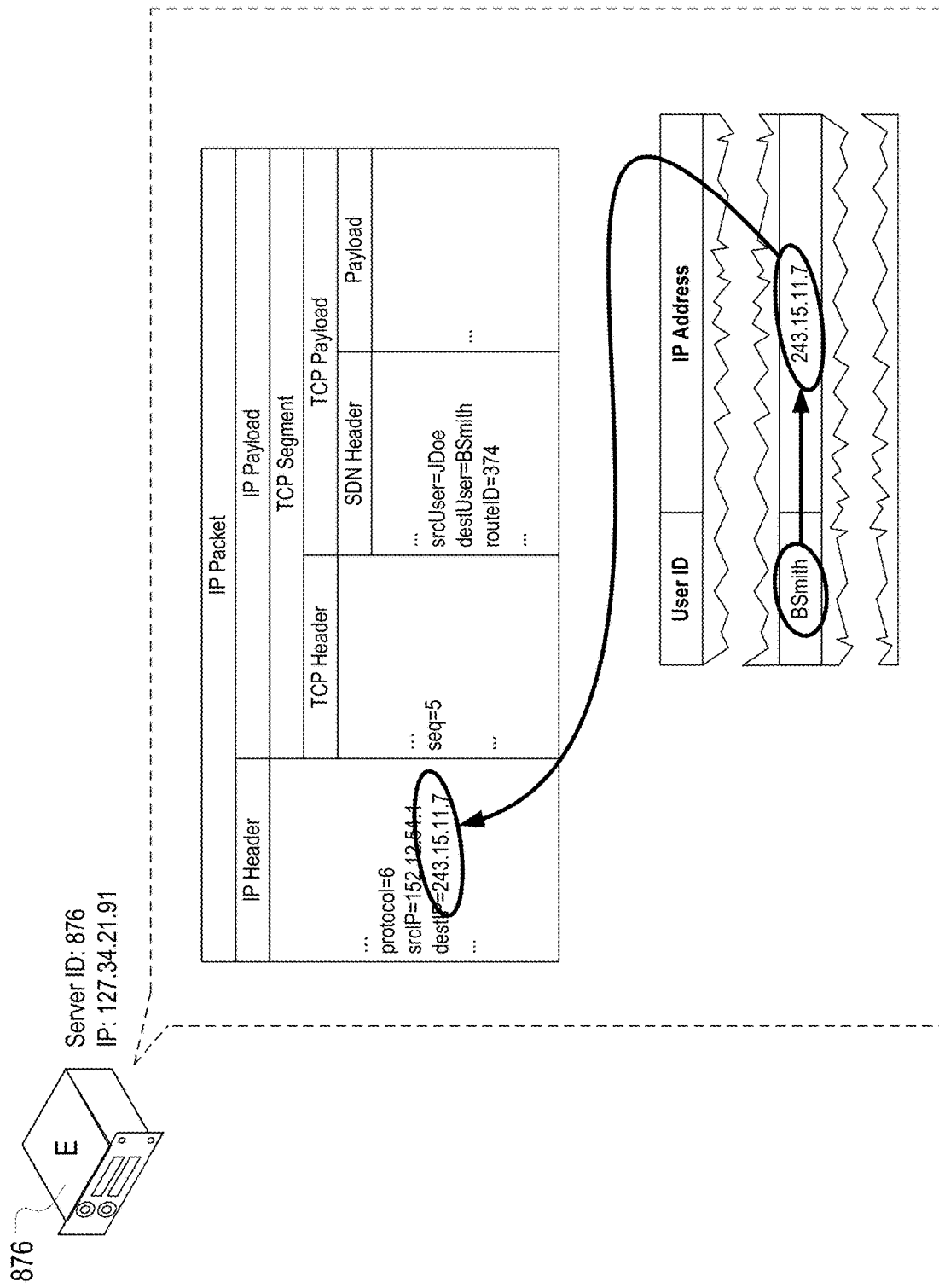
FIG. 76 illustrates the server at node "E" updating the destination IP address field of the IP header of the packet to identify the determined IP address of the destination user.
Figure 77:
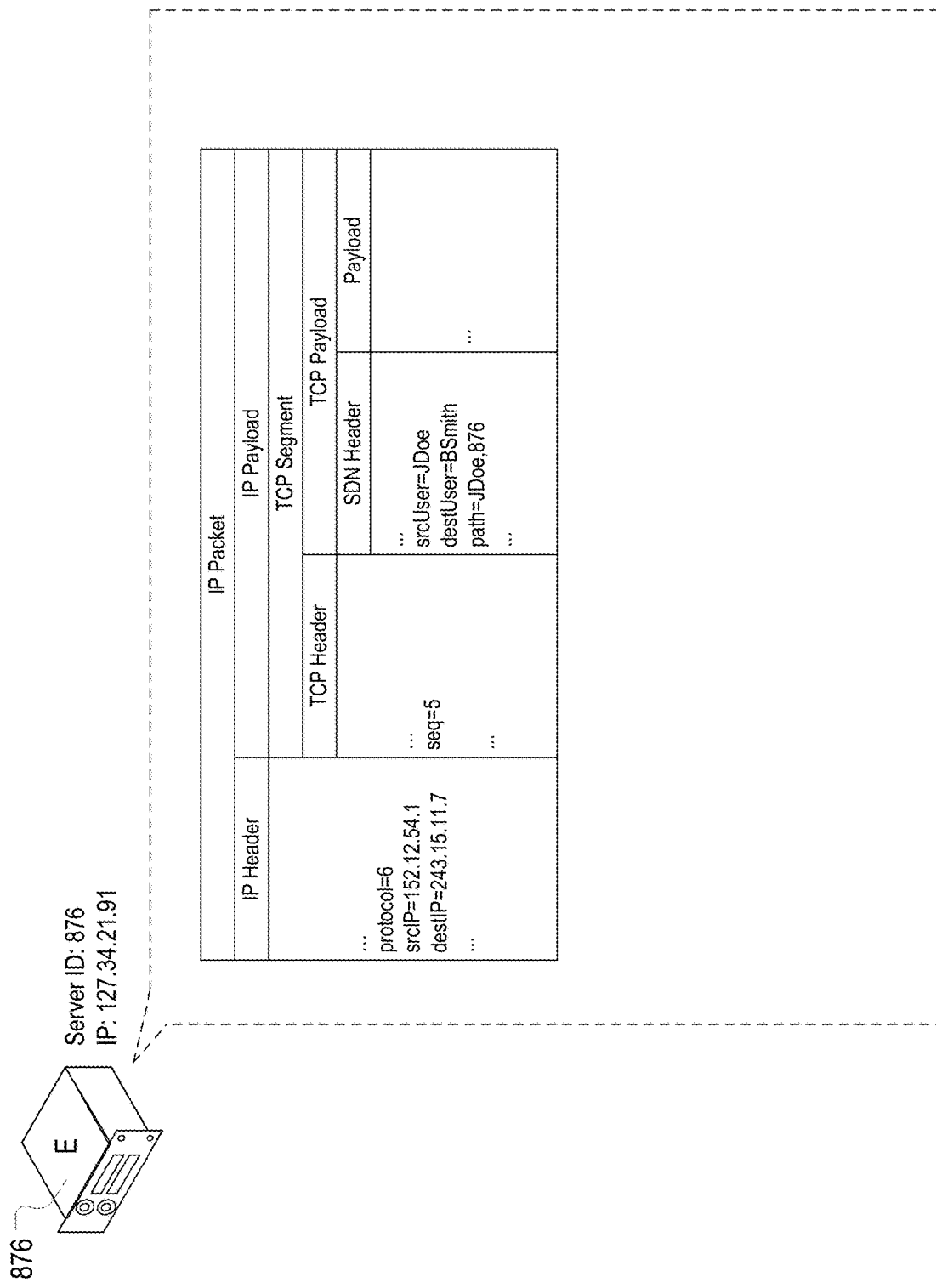
FIG. 77 illustrates the server at node "E" appending path information to the packet.
Figure 78:
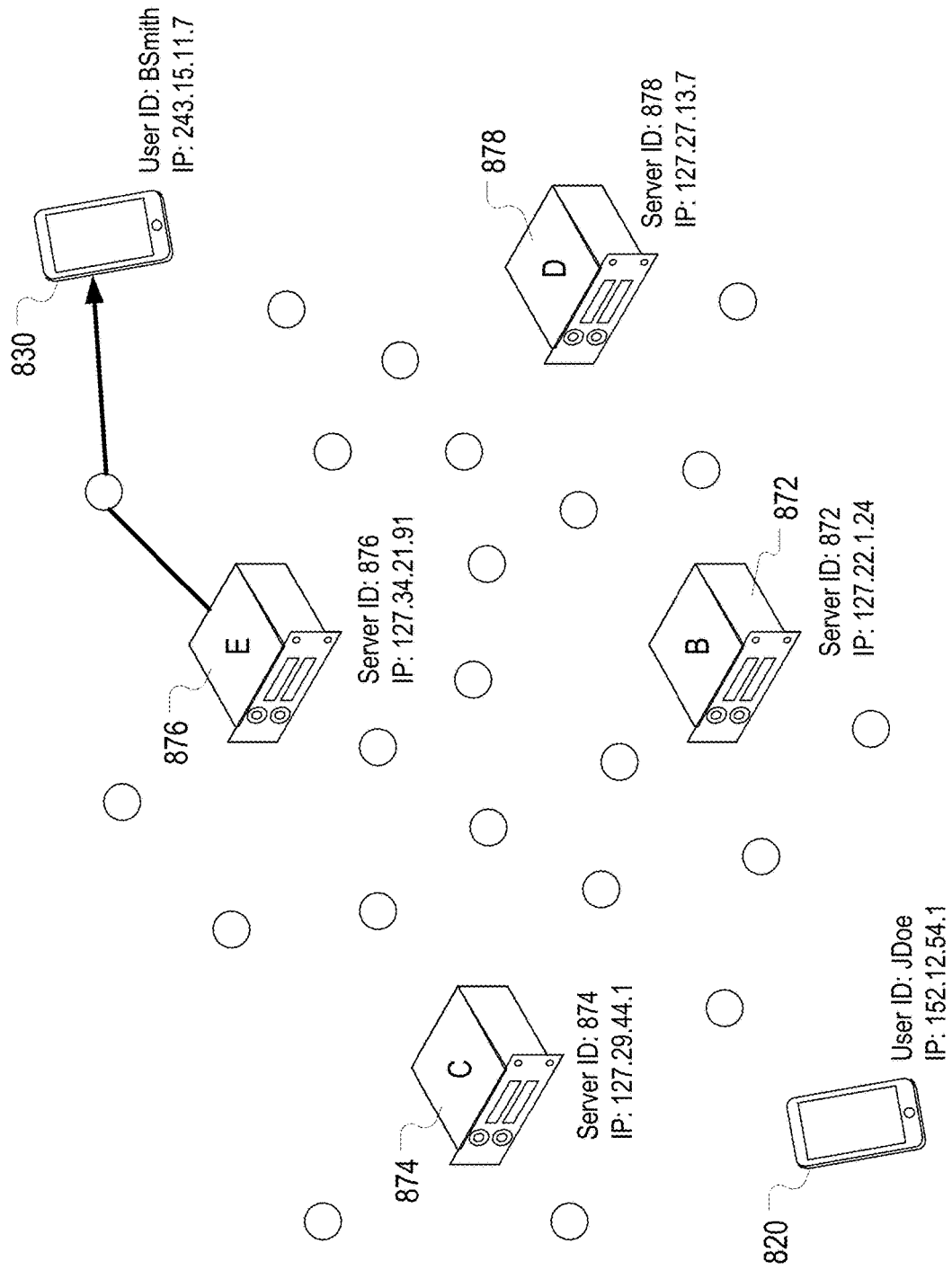
FIG. 78 illustrates the packet being communicated from the server at node "E" for delivery to the second mobile phone.

At node "E" server 876 parses the packet to determine the route identifier for the route the packet is intended to utilize, in this case the route identifier of "374", as illustrated in FIG. 74. Because server 876 is the last pathway node identified in the pathway of the specified route identifier, server 876 parses the destination user from the destUser filed to identify "BSmith" and then looks up or otherwise obtains the IP address of "BSmith", as illustrated in FIG. 75. The server 876 preferably maintains or has access to route identifiers and their pathways as well as destination users and their IP addresses in the system. The server 876 updates the destination IP address field of the IP header of the packet to identify the determined IP address of the destination user, as illustrated in FIG. 76, or constructs a new packet with this data; appends path information to the packet, as illustrated in FIG. 77; and communicates the packet for delivery to the second mobile phone 830, as illustrated in FIG. 78. At this endpoint in the identified path of the route identifier, the "pathID" field or value also preferably is removed from the IP packet.

The first mobile phone 820 continues to communicate the covert message by determining, for each additional hex symbol to be signaled, the appropriate route by which to send a sequential packet. Each constructed IP packet is communicated by the first mobile phone 820 for communication to the second mobile phone 830 via the respective identified route.

Figure 79:
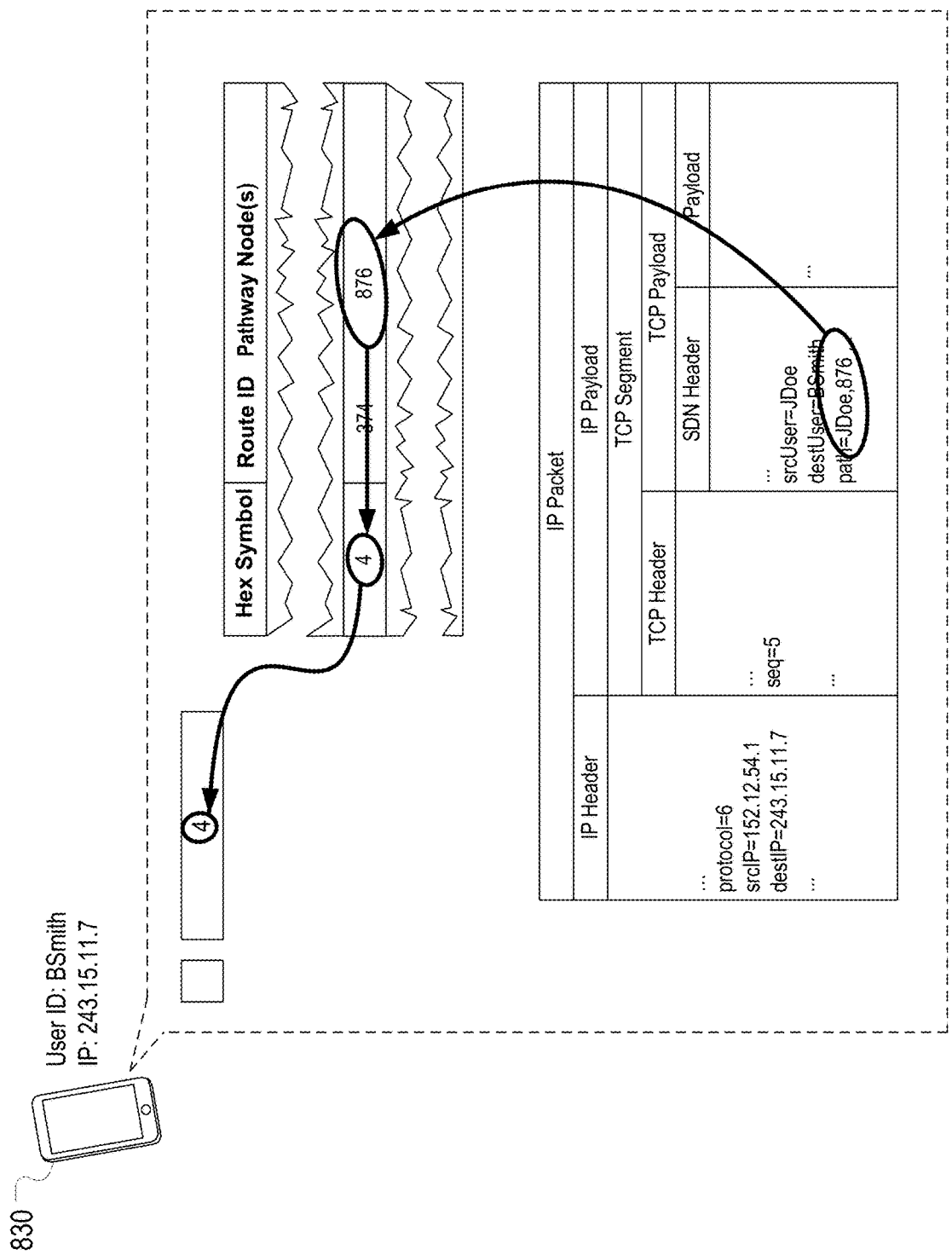
FIG. 79 illustrates the second mobile phone utilizing the path information in the form of appended node identifiers in each packet that is received to determine the hex symbols signaled by said path information.

The path information in the form of appended node identifiers in each packet that is received at the second mobile phone 830 is used by the second mobile phone 830 (e.g., by the chat app or a covert layer app) to determine the hex symbol signaled by said path information. This is done by cross-referencing the sequence of servers 872,874,876, 878 found in the path information with a table of route identifiers with, in turn, the hex symbols associated with the route identifiers. This is represented in FIG. 79.

In accordance with one or more preferred implementations, association of a pathway with a symbol may be based on inclusion of an origin device in the pathway as the first node, while in accordance with one or more other preferred implementations, the origin node is not included when evaluating the path information to determine the symbol that is signaled.

Figure 80:
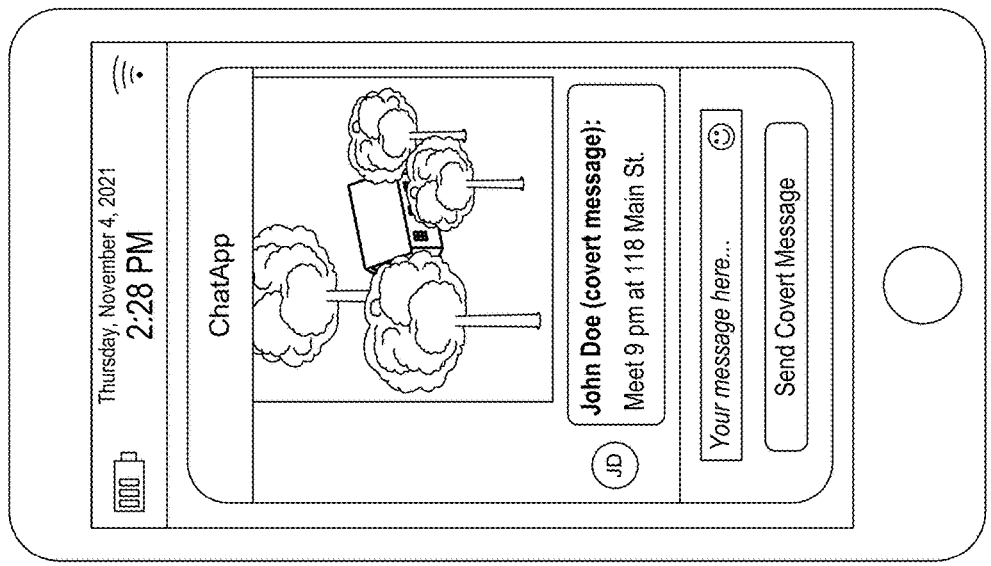
FIG. 80 illustrates the display of text information constituting the covert message that has been determined from the hex symbols signaled by the path information of the received packets.

The second mobile phone 830 orders the determined hex symbols based on the sequence numbers of the corresponding packets signaling those hex symbols, and converts the resultant hex string to text. This is then displayed as the covert message to a user in the chat app at the second mobile phone 830, as illustrated in FIG. 80.

In accordance with one or more preferred implementations, the covert message may disappear from the interface on the second mobile phone 830 after a set or user-configured period of time (e.g., ten seconds, one minute, one day, etc.). In accordance with one or more preferred implementations, the covert message may never be displayed in the chat interface at all, and may instead be displayed as a popup or be available for access otherwise.

It further will be appreciated that the covert message is communicated in packets that include the image data of the picture being communicated and that do not include the message. Furthermore, packets conveying image data that do not signal symbols of the covert message preferably are sent along routes that do not include any of the servers 872,874,876,878.

In accordance with one or more preferred implementations, a more complex encoding scheme, e.g., a hex encoding scheme, may itself be communicated via covert communications with a simpler encoding scheme, e.g., a binary encoding scheme. For example, encoding of an entry in a hex encoding table into a bit string capable of communication via communication of bit values could be utilized Such an approach can be utilized by a control server, overlay server, or even a user device to set up an encoding scheme for use in one or more communications.

In accordance with one or more preferred implementations, a covert data encoding and routing scheme is used bidirectionally for communicating covert data between two devices.

In accordance with one or more preferred implementations, a covert data encoding and routing scheme is used unidirectionally for communicating covert data between two devices.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention.

Thus, for example, instead of path selection, covert communication could be accomplished by network selection wherein a firsts device at an origin node and a second device at a destination node each is connected to a plurality of the same networks. In such scenarios, the MAC address or IP address of the first device from which a data packet is sent (and thus the network from which the packet is sent from the first device) may signal a symbol, irrespective of the network from which the second device receives the data packet, which may depend on whether said plurality of networks are bridged. Alternatively, if the plurality of networks are isolated, then the symbol may be determined by the network from which the second device actually receives the data packet, i.e., the network over which the packet is communicated.

It also will be appreciated that if MAC addresses of the first device is used to signal symbols, such MAC addresses may represent virtual network connections of the first device. If such virtual network connections are instantiated for a specific instance of communicating a covert message, then setting the appropriate table mappings for the first and second devices may be communicated in accordance with foregoing simpler methods and then communication of the covert message may be accomplished using the more complex methods in which selection of the temporary MAC addresses of the newly created virtual network connections of the first device signals the symbols to the second device.

Lastly, it will be appreciated that while intermediate endpoint nodes have been described herein as being nodes having redirect devices, it is further contemplated within the scope of the invention that an intermediate endpoint node may comprise a networked device, such as a server, at which two direct connections are established for providing a communications channel between the origin node and the destination node, whereby such device also functions as a redirect device. This preferably is accomplished by establishing two direction TCP connections, one between the origin node and the intermediate endpoint node, and one between the intermediate endpoint node and the destination node. Establishing such TCP connections may be a more efficient way of creating an indirect path between the origin node and destination node because fewer steps may be required.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A method of transmitting, over a plurality of different network paths, an encoded message from a first networked electronic device to a second networked electronic device, the method comprising the steps of:
   (a) encoding a message as a function of one or more network paths out of a plurality of network paths by which packets can be sent from a first networked electronic device for communication to a second networked electronic device; and
   (b) sending a sequence of packets from the first networked electronic device, each packet comprising a payload addressed for receipt by the second networked electronic device over said one or more network paths, a function of which the message is encoded;
   (c) wherein both
      (i) the sequence of the packets, and
      (ii) said one or more network paths, a function of which the message is encoded,
      signals to the second networked electronic device the encoded message.

2. The method of claim 1, wherein the message is encoded using an n-based number system, wherein n is not less than the number of network paths by which packets can be sent from the first networked electronic device for communication to the second networked electronic device.

3. The method of claim 1, wherein the message is encoded using a binary number system, there being at least two network paths by which packets can be sent from the first networked electronic device for communication to the second networked electronic device.

4. The method of claim 1, wherein the message is encoded using a hexadecimal number system, there being at least sixteen network paths by which packets can be sent from the first networked electronic device for communication to the second networked electronic device.

5. The method of claim 1, wherein the packet comprises a node identifier of an intermediate node to which the packet is addressed when communicated from the first networked electronic device, wherein the intermediate node is a redirect.

6. The method of claim 1, wherein sending a sequence of packets from the first networked electronic device comprises both sending one or more packets directly to the second networked electronic device and sending one or more packets indirectly to the second networked electronic device through a redirect.

7. The method of claim 1, wherein the packet comprises a route identifier when communicated from the first networked electronic device, the route identifier being associated with a pathway comprising one or more intermediate nodes, each intermediate node being a redirect.

8. The method of claim 1, wherein the payload of a packet of the sequence of packets is addressed for receipt by the second networked electronic device, whereby the payload is directly communicated to the second networked electronic device from the first networked electronic device.

9. The method of claim 1, wherein an encapsulated payload of a said packet of the sequence of packets is addressed for receipt by the second networked electronic device.

10. The method of claim 9, wherein said packet itself is addressed for receipt by a networked electronic device other than the second networked electronic device, whereby the encapsulated payload is indirectly communicated to the second networked electronic device from the first networked electronic device.

11. The method of claim 10, wherein said packet itself is addressed for receipt by a networked electronic device that performs redirects.

12. The method of claim 9, wherein a node identifier is included with the encapsulated packet received by the second networked electronic device, whereby the second networked electronic device determines the network path taken by the encapsulated payload.

13. The method of claim 9, wherein a route identifier is included with the encapsulated packet received by the second networked electronic device, whereby the second networked electronic device determines the network path taken by the encapsulated payload.

14. The method of claim 9, wherein a network watermark is received with the encapsulated payload, whereby the second networked electronic device determines the network path taken by the encapsulated payload.

15. The method of claim 1, wherein the plurality of network paths by which packets can be sent from the first networked electronic device for communication to the second networked electronic device comprises network paths in an overlay network.

16. The method of claim 1, wherein the plurality of network paths by which packets can be sent from the first networked electronic device for communication to the second networked electronic device comprises network paths in a software-defined network (SDN).

17. The method of claim 1, wherein the first networked electronic device has network connections to different networks, and wherein the plurality of network paths by which packets can be sent from the first networked electronic device for communication to the second networked electronic device comprises the different networks.

18. The method of claim 1, wherein a network watermark is received with the payload addressed for receipt by the second networked electronic device, whereby the second networked electronic device determines the network path taken by the payload.

19. A method of transmitting, over a plurality of different network tunnels, an encoded message from a first networked electronic device to a second networked electronic device, the method comprising the steps of:
(a) encoding a message as a function of one or more network tunnels out of a plurality of network tunnels by which packets can be sent from a first networked electronic device for communication to a second networked electronic device; and
(b) sending a sequence of packets from the first networked electronic device, each packet comprising a payload addressed for receipt by the second networked electronic device over said one or more network tunnels, a function of which the message is encoded;
(c) wherein both
(iii) the sequence of the packets, and
(iv) said one or more network tunnels, a function of which the message is encoded,
signals to the second networked electronic device the encoded message.

* * * * *